United States Patent
Dharmaji

(10) Patent No.: US 11,297,391 B2
(45) Date of Patent: Apr. 5, 2022

(54) TELEVISION INTERFACE FOR MULTI-PARTY SOCIAL MEDIA SESSIONS

(71) Applicant: Vyu Labs, Inc., Cupertino, CA (US)

(72) Inventor: Srinivasa M. Dharmaji, Cupertino, CA (US)

(73) Assignee: VYU LABS, INC., Cupertino, CA (US)

(*) Notice: Subject to any disclaimer, the term of this patent is extended or adjusted under 35 U.S.C. 154(b) by 0 days.

(21) Appl. No.: 15/908,510

(22) Filed: Feb. 28, 2018

(65) Prior Publication Data

US 2018/0255361 A1    Sep. 6, 2018

Related U.S. Application Data

(60) Provisional application No. 62/467,759, filed on Mar. 6, 2017.

(51) Int. Cl.

| | |
|---|---|
| *H04N 21/4788* | (2011.01) |
| *H04N 21/462* | (2011.01) |
| *H04N 21/2187* | (2011.01) |
| *H04N 21/475* | (2011.01) |
| *H04L 65/1069* | (2022.01) |
| *H04L 65/403* | (2022.01) |
| *H04L 65/611* | (2022.01) |

(52) U.S. Cl.
CPC ..... *H04N 21/4788* (2013.01); *H04L 65/1069* (2013.01); *H04L 65/403* (2013.01); *H04L 65/4076* (2013.01); *H04N 21/2187* (2013.01); *H04N 21/4622* (2013.01); *H04N 21/4753* (2013.01)

(58) Field of Classification Search
CPC ......... G06Q 50/01; H04L 51/32; H04L 51/04; H04L 65/403; H04L 12/1813; H04N 21/2187; H04N 21/4788; H04N 21/26258; H04N 21/4758
See application file for complete search history.

(56) References Cited

U.S. PATENT DOCUMENTS

| | | | | |
|---|---|---|---|---|
| 5,956,716 | A * | 9/1999 | Kenner | G06F 16/40 |
| 7,685,237 | B1 * | 3/2010 | Weaver | G06Q 10/10 |
| | | | | 709/205 |
| 8,942,995 | B1 * | 1/2015 | Kerr | G07C 9/00 |
| | | | | 705/14.67 |
| 9,277,179 | B1 * | 3/2016 | Fulay | H04N 7/15 |

(Continued)

*Primary Examiner* — Jason Salce
(74) *Attorney, Agent, or Firm* — Perkins Coie LLP; Andrew T. Pettit

(57) ABSTRACT

Introduced here are computer programs and associated computer-implemented techniques for broadcasting social media sessions via an entertainment platform, such as a broadcast television network. More specifically, the technologies described herein relate to broadcasting interaction sessions involving a host (also referred to as a "communicator") and one or more participants. An entertainment platform may contact the host or another person associated with the host, such as an agent, manager, family member, or friend, to seek permission to broadcast the session to its audience. An example of an entertainment platform is a broadcast television network. The host then closes a deal with the entertainment platform, whereby the entertainment platform has the rights to simulcast the session to its television viewers in real time, replay the session to its television viewers at later times, or both.

13 Claims, 55 Drawing Sheets

(56) References Cited

U.S. PATENT DOCUMENTS

| | | | |
|---|---|---|---|
| 2002/0016971 A1* | 2/2002 | Berezowski | G08B 13/19693 725/105 |
| 2005/0010961 A1* | 1/2005 | Hagen | H04N 7/165 725/119 |
| 2009/0094376 A1* | 4/2009 | Kosiba | H04L 65/607 709/231 |
| 2009/0112680 A1* | 4/2009 | Dovrath | G06Q 30/0215 705/26.3 |
| 2012/0022918 A1* | 1/2012 | Ross | G06Q 30/0201 705/7.32 |
| 2012/0159356 A1* | 6/2012 | Steelberg | G06Q 50/01 715/760 |
| 2013/0003579 A1* | 1/2013 | Lu | H04L 47/10 370/252 |
| 2013/0096985 A1* | 4/2013 | Robinson | G06Q 30/0203 705/7.32 |
| 2013/0103445 A1* | 4/2013 | Alonso Lord | G06Q 10/06311 705/7.14 |
| 2013/0144785 A1* | 6/2013 | Karpenko | G06Q 20/409 705/44 |
| 2014/0245334 A1* | 8/2014 | Belyaev | H04N 21/44222 725/9 |
| 2016/0037236 A1* | 2/2016 | Newell | H04N 21/4316 725/34 |
| 2016/0057083 A1* | 2/2016 | Ciofalo | H04L 51/02 |
| 2016/0366197 A1* | 12/2016 | Dharmaji | G06Q 50/01 |
| 2017/0048282 A1* | 2/2017 | Dharmaji | G06F 3/0482 |
| 2017/0076752 A1* | 3/2017 | Steward | H04N 21/854 |
| 2018/0255114 A1* | 9/2018 | Dharmaji | H04L 65/4015 |
| 2018/0255355 A1* | 9/2018 | Dharmaji | H04N 21/472 |
| 2020/0074777 A1* | 3/2020 | Deluca | G07C 13/00 |

\* cited by examiner

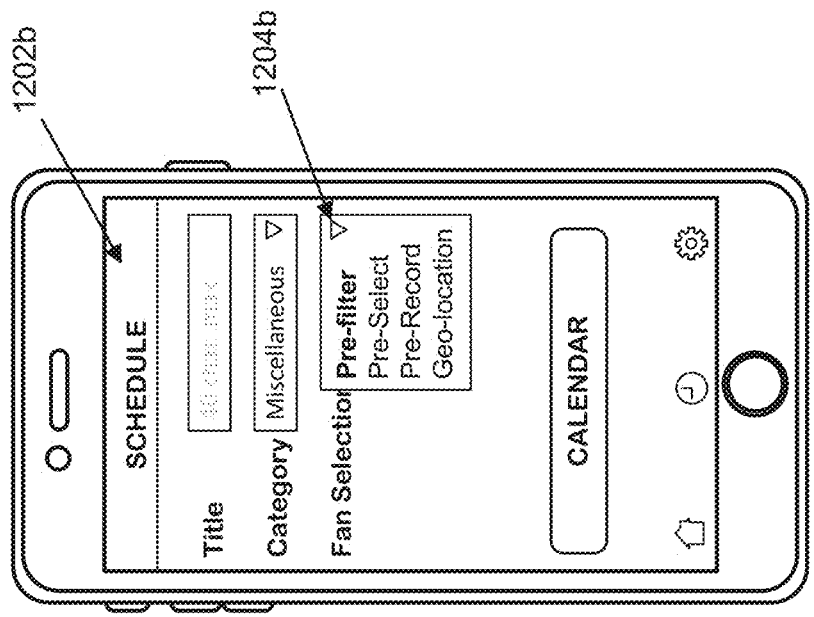
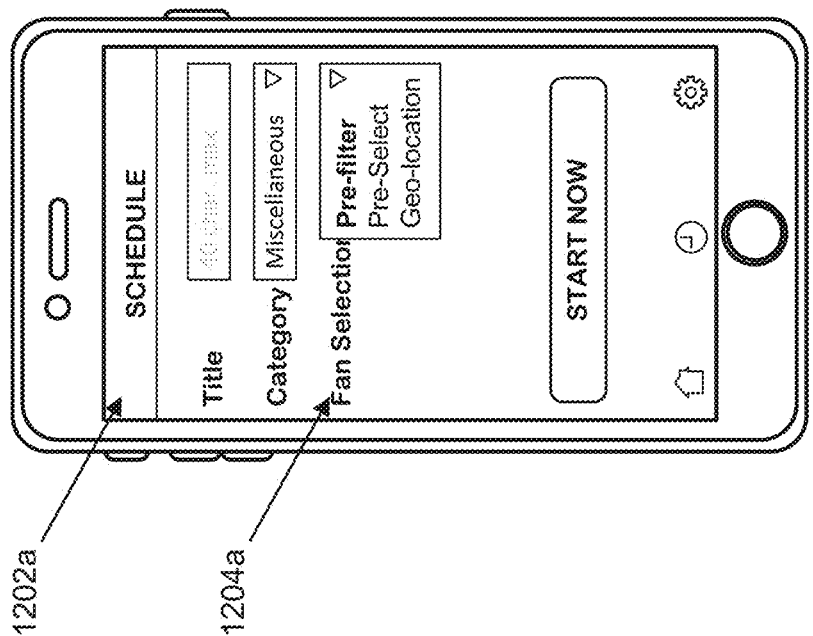
FIG. 12

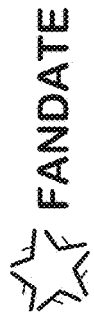 FANDATE

| | | | |
|---|---|---|---|
| Video Product | Multiple video products for celebrity to choose the right experience | Streaming / Mixing | Live video CDN for broadcasting multiple streams at different bitrates (e.g., television and mobile) |
| Celebrity Broadcast | Live and Pre-recorded. Retakes allowed! | Quality / Size | High-quality video streams from 200-500 Kbps depending on bandwidth |
| Fan Interaction | Live video or audio, one fan at a time | 1:1 / 1:Many Broadcast | Sequenced packets from multiple media streams rendered with precision on user devices |
| Video Stream(s) | Multi-stream broadcast of pre-recorded celebrity-fan interactions | Ad Campaign Manager | Integrated Ad Campaign Manager with multiple sponsorship and commerce units |
| Celebrity / Social Influencers | Premium platform available only for verified celebrities | Fan Selection | Push-to-video floor control and fan abuse prevention technology |
| Fan Abuse | Only pre-selected questions may be answered | Brand Safety | Questions can be pre-screened, and answers can be pre-recorded |
| Reputation Management | Agents can preview/approve answers before broadcast | Video Camera | Front- or rear-facing camera can be used. Celebrity can seamlessly interact while hearing audio |
| Session Granularity | In-venue, town, state, county, or global | | |

FIG. 20

TELEVISION INTERFACE FOR MULTI-PARTY SOCIAL MEDIA SESSIONS

CROSS-REFERENCE TO RELATED APPLICATIONS

This application claims priority to U.S. Provisional Application No. 62/467,759 titled "BROADCASTING STREAMED VIDEO" and filed on Mar. 6, 2017, which is incorporated herein by reference in its entirety.

TECHNICAL FIELD

Various of the disclosed embodiments concern computer programs and associated computer-implemented techniques for broadcasting social media sessions via an entertainment platform, such as a broadcast television network.

BACKGROUND

Social interactions between two or more individuals can, and often do, improve the relationships between those individuals. In fact, social relationships are often strongest between those individuals who interact with one another the most (e.g., family members and friends).

Social relationships may be central to the success of certain individuals. For example, popular individuals who have attained success in sports, entertainment, or business (also referred to herein as "celebrities") may be paid more for advertising or endorsing a product if they have a significant following on social media services or a large number of fans in particular marketing segments. However, it is often difficult for celebrities to have meaningful interactions with fans for a variety of reasons.

Some celebrities interact with fans via social media services, such as Facebook Live™. For example, a celebrity may announce to fans that she will be involved in an interactive session via a streaming platform (e.g., Facebook Live) at a certain time on a certain date. Once the interactive session begins, the celebrity can ask the fans to submit questions, some of which the celebrity may answer. Hundreds of questions are typically received by the celebrity on the computing device being used for the interactive session, and the celebrity will normally select at least one question to answer. Because the celebrity often does not have time to adequately pre-screen questions due to the live nature of the interactive session, the fan could ask a question that is embarrassing to the celebrity.

Confronted with an embarrassing question, the celebrity may abruptly end the interactive session. Video of the embarrassing interaction may go viral, and the celebrity's reputation may suffer significant damage as a result. However, the owner of the streaming platform is quite happy as significant revenue (e.g., advertising revenue) is generated from original views of the interactive session and subsequent views of the interactive session due to its viral popularity.

SUMMARY

Introduced here are computer programs and associated computer-implemented techniques for broadcasting social media sessions via an entertainment platform, such as a broadcast television network. More specifically, the technologies described herein relate to broadcasting media (e.g., video), via an entertainment platform, that was initially streamed over the Internet. The media may be related to an interaction session involving a host (also referred to as a "communicator") and one or more participants. The term "host" could refer to several different types of individuals. One example of a host is a celebrity or another person who communicates on behalf of the celebrity, such as an agent, manager, family member, friend, etc. Another example of a host is a team leader (e.g., an executive) who is responsible for managing a team (e.g., employees of a company). The term "participants" refers to those individuals who are interested in participating in the session involving the host. As such, participants may also be referred to as "audience members" of the interactive session. If the host is a celebrity, then the participants are generally fans of the host in a general sense. Note, however, that in such embodiments the participants need not necessarily be officially characterized as a fan via inclusion in a fan club, social media group, etc., though participants are often involved in such activities. If the host is a team leader, then the participants are generally members of the team. In general, participants are typically individuals who are interested in interacting with the host in some form.

In an example, a host logs into an interaction management platform (also referred to as the "FanDate™ platform" or "Vydeo™ platform") to announce to participants that she will be involved in a session at 5 PM on Saturday. In some embodiments the interaction management platform is able to stream media directly to viewers (e.g., the host and participants), while in other embodiments the interaction management platform broadcasts the media via a social media service, such as Facebook Live. The host may ask the participants to register for the session, and the interaction management platform provides a calendar event for the calendar tool residing on each participant's computing device. The calendar event serves as a reminder of the session. The interaction management platform may also cause an announcement to be posted to various social networking services, such as Facebook™, Instagram™, Twitter™, Snapchat™ etc. Participants can then log into the interaction management platform and register for the session.

An entertainment platform may contact the host or another person associated with the host, such as an agent, manager, family member, or friend, to seek permission to broadcast the session to its audience. An example of an entertainment platform is a broadcast television network, such as ABC, CNN, etc.). The host then closes a deal with the entertainment platform, whereby the entertainment platform has the rights to simulcast the session to its television viewers in real time, replay the session to its television viewers at later times, or both.

At the scheduled time, the host can initiate the session via a streaming platform, such as the interaction management platform, a social media platform (e.g., Facebook Live), or another streaming platform. The streaming platform can stream media recorded by the host to all participants who registered for the session. Additionally or alternatively, the streaming platform may send the recorded media to the entertainment platform, which can simulcast the session to its television viewers via a broadcast network. In some embodiments, the streaming platform converts the recorded media into a format compatible with the broadcast network before sending the recorded media to the entertainment platform. For example, the streaming platform may convert audio and visual (AV) digital data into the MPEG-4 format, and then send the encoded AV digital data to the entertainment platform for transmission via the broadcast network. Upon receiving the encoded AV digital data, the entertainment platform can broadcast the media to its television viewers via the broadcast network. In some instances the media is transmitted as a full screen view, while in other instances the media is transmitted as a picture-in-picture view (e.g., when a network commentator in the main picture is commenting on the session, which appears as the secondary picture).

BRIEF DESCRIPTION OF THE DRAWINGS

Various features and characteristics of the technology will become more apparent to those skilled in the art from a study of the Detailed Description in conjunction with the drawings. Embodiments of the technology are illustrated by way of example and not limitation in the drawings, in which like references may indicate similar elements.

FIG. 12 shows example interfaces for defining a participant selection criterion.

FIG. 20 shows features of a platform for monetizing interaction sessions.

Figure 1:
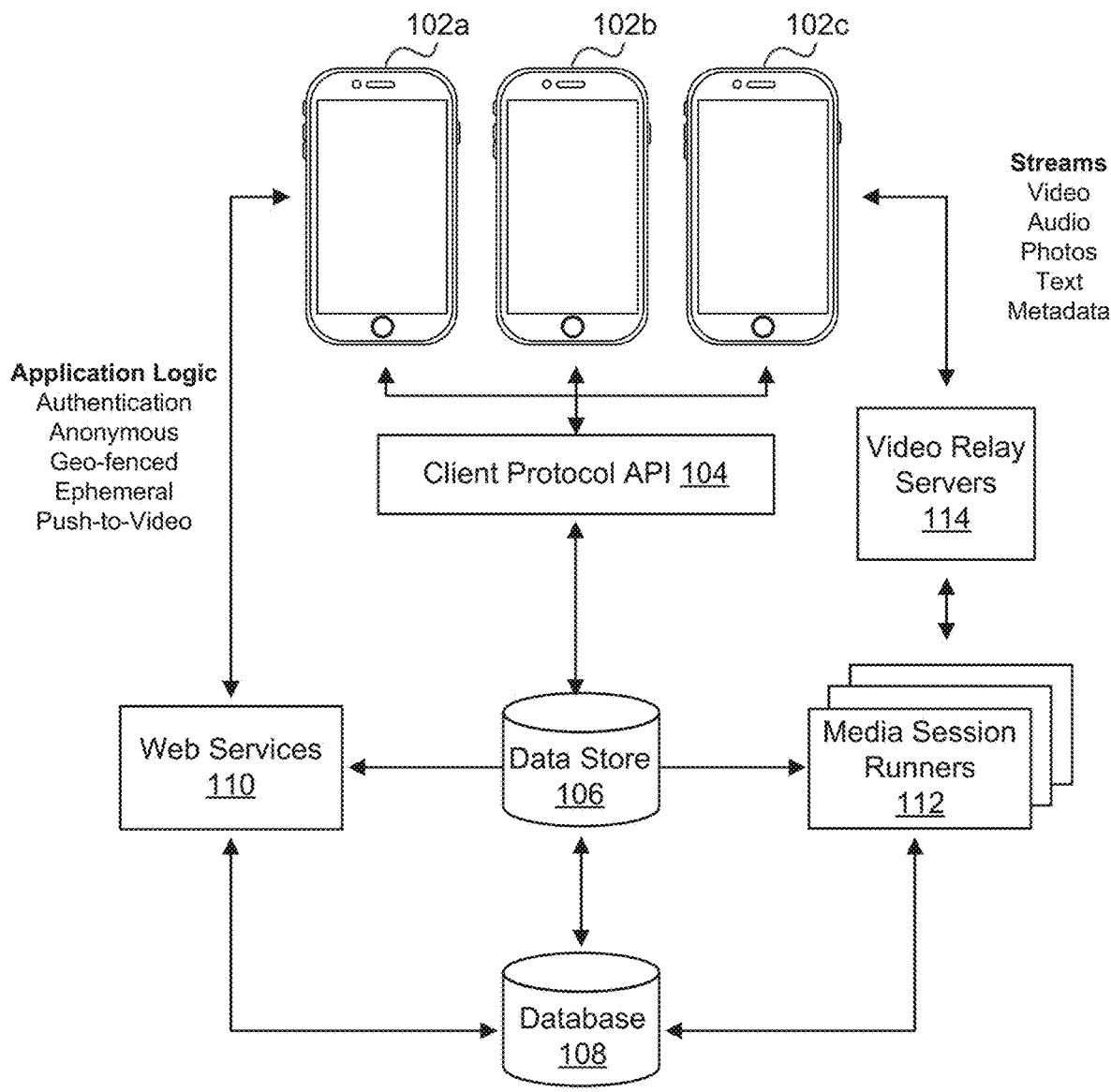
FIG. 1 is a generalized block diagram illustrating the architecture of an interaction management platform that facilitates interactions between a host and one or more participants.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

Introduced here are systems and techniques for providing an effective communication mechanism through which hosts (also referred to as "communicators") can connect with participants (also referred to as "audience members") during interaction sessions. In some embodiments the interaction sessions include live media content that is broadcast in real time, while in other embodiments the interaction sessions include pre-recorded media content that is broadcast following a post-processing procedure. While the embodiments introduced here are often described in the context of video media, those skilled in the art will recognize that media recorded by hosts and participants could include text media, audio media, video media, or any combination thereof.

High-profile individuals, such as celebrities and politicians, are often concerned with the brand image they convey. Live interactions with participants via interaction sessions can introduce content that may not be conducive to the brand image that a high-profile individual wishes to convey. For example, live interactions with unknown participants can lead to questions or comments that may be inappropriate, offensive, or that may otherwise cause embarrassment on the part of the high-profile individual. Accordingly, mechanisms are needed that enable a host responsible for hosting an interaction session to select/screen the participants with whom the host interacts during the interaction session. Enabling this level of control for the host provides a brand-safe environment that in turn encourages further direct interaction between the host and the participants. As further described below, these mechanisms may include pre-filtering, pre-selecting, pre-recording, geotagging/geo-targeting, blacklisting, or any combination thereof.

More specifically, computer programs and associated computer-implemented are described herein for facilitating paced, synchronous interactions between a host (e.g., a team leader, a celebrity, or someone who communicates on behalf of the celebrity) and one or more participants (e.g., team members or fans of the celebrity). Oftentimes, the participant(s) have limited and qualified participation capabilities. For example, some participants may only be able to watch a live video stream of the host, while other participants may be able to initiate a live video stream in which they ask the host questions, answer questions posed by the host, etc.

As further described below, the host and the participant(s) can participate in an interaction session via a computer program running on a computing device. Examples of computer programs include web browsers, mobile applications, desktop applications, and over-the-top (OTT) applications. For example, the host may, via a computer program running on her computing device, initiate a live video stream that is broadcast to the participant(s). Similarly, each participant may, via a computer program running on a corresponding computing device, observe the live video stream, submit questions, provide feedback, etc. These computer programs may all be supported by the interaction management platform that facilitates exchanges between the host and the participant(s). In some embodiments, a participant is permitted to initiate a second live media stream in which the participant can pose a question, submit a response, etc. Thus, the interaction management platform may permit full-duplex communications between the host and some or all of the participant(s).

While the drawings may depict certain computing devices, the technology described herein can be used with any electronic device (also referred to herein as a "computing device") that is capable of displaying and/or capturing media content, such as personal computers, tablets, personal digital assistants (PDAs), mobile phones, game consoles, mobile gaming devices, music players, wearable electronic devices (e.g., fitness trackers and watches), network-connected ("smart") devices (e.g., televisions and home assistant devices), etc.

Moreover, those skilled in the art will recognize that pre-recorded and live streamed media content could include text media, audio media, video media, or any combination thereof. The use of any type of media content with respect to specific examples provided below is intended to be illustrative only.

Terminology

References in this description to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to"). The terms "connected," "coupled," or any variant thereof are intended to include any connection or coupling between two or more elements, either direct or indirect. The coupling/connection can be physical, logical, or a combination thereof. For example, devices may be electrically or communicatively coupled to one another despite not sharing a physical connection.

The term "based on" is also to be construed in an inclusive sense rather than an exclusive or exhaustive sense. Thus, unless otherwise noted, the term "based on" is intended to mean "based at least in part on." Moreover, the terms "based on at least" and "at least based on" includes, in some cases or embodiments, based only on. Said another way, a criterion calculated based on at least a certain feature may be based only on that feature.

When used in reference to a list of multiple items, the word "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here.

Similarly, steps could be replaced or reordered. Thus, descriptions of any processes are intended to be open-ended.

Operating Environment—Example Computing Platform

FIG. 1 is a generalized block diagram illustrating the architecture of a computing platform 100 (also referred to as an "interaction management platform") that facilitates interactions between a host and one or more participants. The term "host" could refer to several different types of individuals. One example of a host is a celebrity or another person who communicates on behalf of the celebrity, such as an agent, manager, family member, friend, etc. Another example of a host is a team leader (e.g., an executive) who is responsible for managing a team (e.g., employees of a company). The term "participants" refers to those individuals who are interested in participating in an interaction session involving the host. As such, participants may also be referred to as "audience members" of the interaction session.

The interaction session represents a forum through which the host can establish a paced, synchronous session with the participant(s). For example, each participant may interact with the host via a computer program that is executed by a corresponding computing device 102a-c. "Users" of the platform 100 include both hosts and participants. Note, however, that hosts and participants may be able to access different interfaces through the computer program.

Each of the computing devices 102a-c could be associated with either a host or a participant. Here, for example, three computing devices 102a-c are executing the computer program, which implements a client protocol application programming interface (API) 104. The client protocol API 104 monitors user interactions with the computer program to control distribution, publication, subscription, etc., of media streams including video, audio, photos, text, metadata, or any combination thereof. For example, the client protocol API 104 may process inputs received at an interface presented on the display of the computing devices 102a-c.

The client protocol API 104 serves as an interface between the computing devices 102a-c and a data store 106 (e.g., an in-memory data store, such as Redis). The data store 106, which supports certain utilities (e.g., the publish and subscribe commands or "pub/sub"), could store content required for initiating the media streams, information relevant to the users (e.g., registration information or usage statistics), etc. In some embodiments, the data store 106 is connected to a database 108 that is responsible for storing metadata, media content (e.g., audio and visual (AV) digital data), etc. For example, the database 108 may include an archive of previously recorded interaction sessions that can be replayed at the computing devices 102a-c through the computer program. Moreover, the database 108 may be an open-source cross-platform document-oriented database, such as MongoDB. In such embodiments, the database 108 could use dynamic schemas and/or JavaScript Object Notation (or JSON-like) documents.

Logic in the computer program executing on each computing device 102a-c can control user authentication. For example, the computer program may be synced with one or more social media accounts of the user (e.g., a host or participant) corresponding to the computing device. Thus, a platform account used to access the computer program may be digitally linked to social media accounts for Facebook, Twitter, Snapchat, etc. The computer program may also maintain user anonymity, provide geofencing, and implement the ephemeral nature of the media content and push-to-video mechanism. Control information and/or other user information can then be provided to a web service 110, which is a collection of protocols or standards that are used to exchange data between the computer program and the data store 106/database 108. More specifically, the web service 110 can effect redistribution and publication/subscription in connection with the content of the database 108 and/or data store 106. The web service 110 could be, for example, Node.js, a JavaScript-based framework.

The user(s) are able to control and/or access various media streams presented on the interfaces generated by the computer program. As noted above, the media stream(s) can include video, audio, photos, text, metadata, or any combination thereof. The media is provided via media session runners 112 through video relay servers 114. The video relay servers 114 may be a Transmission Control Protocol (TCP)—Live Vydeo content delivery network (CDN) video relay server, a User Datagram Protocol (UDP) video relay server, etc. These techniques allow stream control and access to be maintained as further described below.

Examples of computer programs include a web browser, mobile application, desktop application, and OTT application. Thus, the interfaces may be accessed using any appropriate computing device, such as a mobile phone, tablet, personal computer, game console, music player, wearable electronic device (e.g., a fitness tracker or watch), network-connected ("smart") device (e.g., a television or home assistant device), virtual/augmented reality system, or some other electronic device.

The following classes of individuals could use the application to establish an interactive session with participants:

Top-class Celebrities (e.g., those with millions of followers): These celebrities are often very conscious about their brand image and may only provide answers to pre-approved questions. Said another way, these celebrities may not take live questions. Such sessions may proceed as follows:

The celebrity user sets a limit on the maximum number of fan questions allowed (e.g., a default value of 100) while scheduling a session;

One or more fans record questions (e.g., in 15 second video recordings) for the celebrity and submit the questions;

A service stores the questions on a server, which is typically only associated with that session;

The celebrity reviews the questions before the session and selects a few of them;

The server streams the questions, for example one by one, in the order chosen by celebrity, when the celebrity taps on a question button that is presented on the display of the celebrity's user device; and When the celebrity completes answering the question, the celebrity taps on the question button again for the next question.

Politicians, YouTube Personalities, Journalists, etc.: These individuals may prefer to initiate an interaction session with their followers that supports live interactions. In such embodiments, a push-to-control video floor scheme can be used as further described below.

Team Leaders: These individuals may prefer to initiate an interaction session with members of a team to discuss project development, status, etc. Examples of team leaders include product managers, lead engineers, and executives who are responsible for managing a group of employees of a company.

Note that top-class celebrities could also choose to participate in live interaction sessions, and other celebrities (e.g., politicians, YouTube personalities, journalists) could elect to participate in interaction sessions that include pre-recorded and/or vetted questions.

Operating Environment—Examiner User Interface Features

Figure 2:
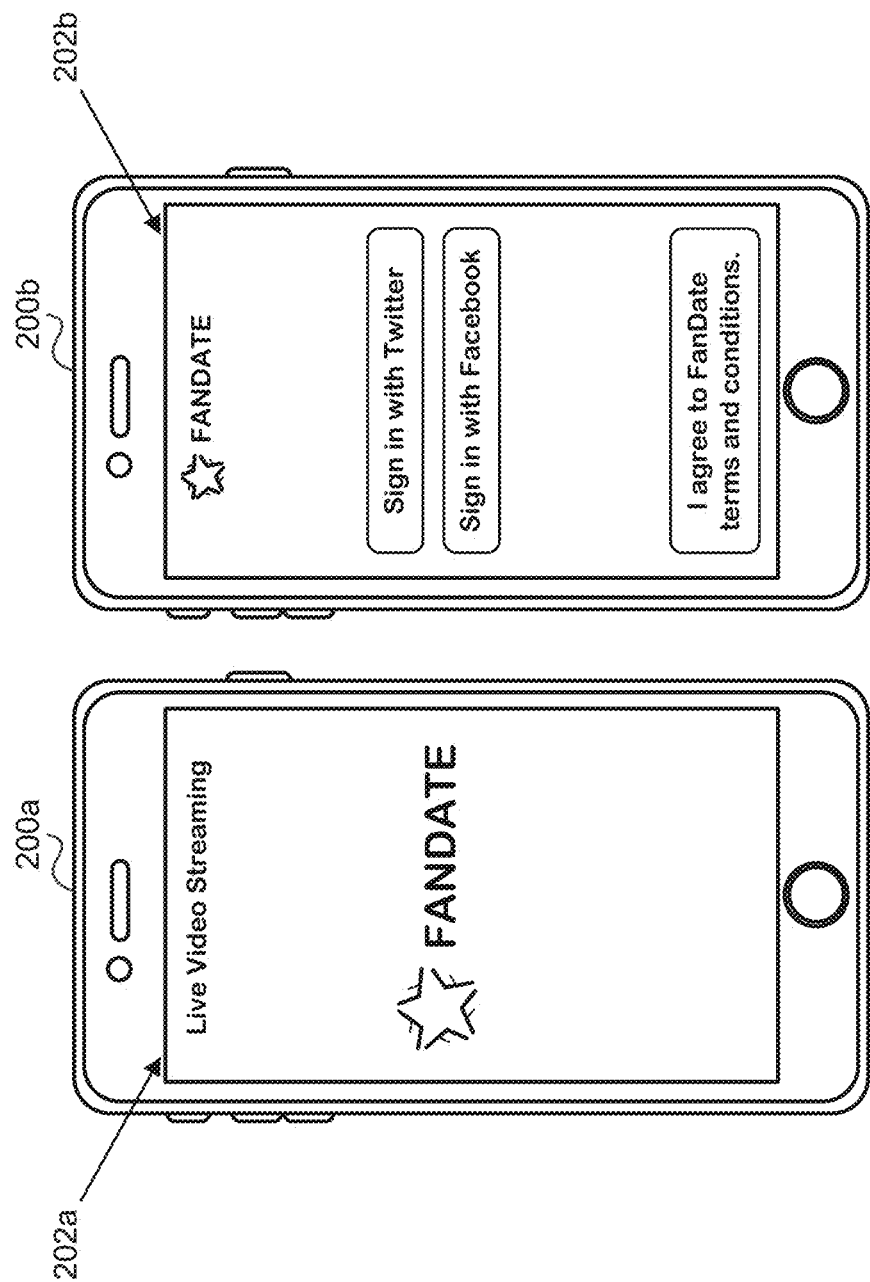
FIG. 2 includes screenshots of interfaces that can be used to register with a service that facilitates paced, synchronous interactions between a host and one or more participants.

FIG. 2 includes screenshots of interfaces 202*a-b* that can be used to register with an interaction management service that facilitates paced, synchronous interactions between a host and one or more participants. The user interfaces 202*a-b* may be accessible to computing devices 200*a-b* through a web browser, mobile application, software program, or an OTT application.

In some embodiments, a user registers for the service (also referred to as the "FanDate™ service" or "Vydeo™ service") by signing into to a social media account. Here, for example, interface 202*b* permits the user to sign in with a Twitter account or a Facebook account. The term "user" can refer to any individual (e.g., a host or participant) who accesses the computer program. Such an action may link the user's account with the service (also referred to as a "platform account") to one or more social media accounts. Consequently, the user may not need to complete a tedious registration process in order to participate in interaction sessions. Instead, user information could be pulled from the social media account(s). For example, the underlying platform 100 could extract the user's name, location, a count of the user's fans or followers, other social media presences associated with the user, etc.

In other embodiments, the service may require the user manually complete a registration form or simply confirm that information extracted from a social media account is indeed correct. For example, the user may elect to associate a platform account with a particular social media account, and then the service may request additional information.

Figure 3A:
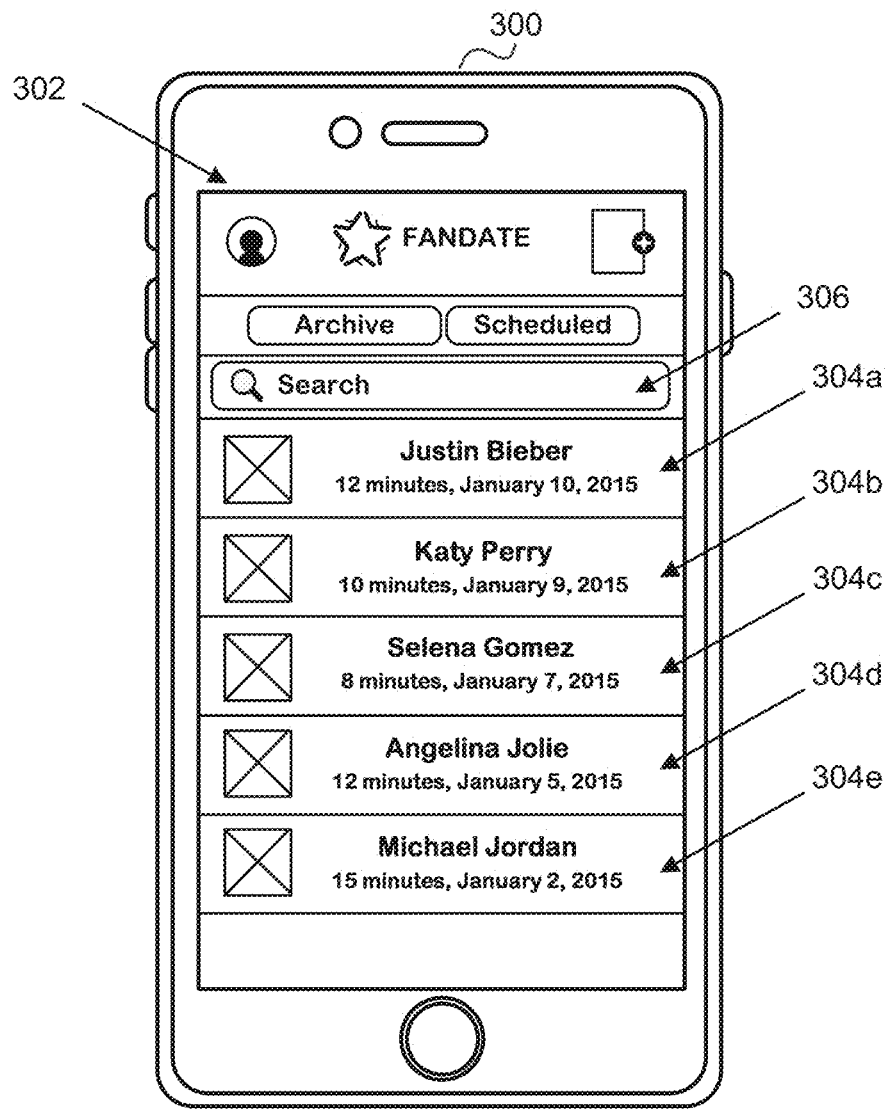
FIG. 3A shows an example interface that includes a list of interaction sessions accessible to a participant.

FIG. 3A shows an example interface 302 that includes a list of interaction sessions 304*a-e* to be facilitated by the platform 100. The list of interaction sessions may include pending/scheduled sessions, in-progress sessions, archived session, or any combination thereof. Each of the interaction sessions is a paced, synchronous interaction between a host, such as a celebrity (here, Justin Bieber, Katy Perry, etc.), and one or more participants. Each participant interacts with the host via an interface that is presented on the display of a corresponding computing device 300.

The list of interactive sessions may be searchable by various criteria. For example, a prospective participant may be able to search for the name of a particular host or a keyword (e.g., "sports," "music," or "politics") that is associated with individual interaction sessions by entering these terms within a search bar 306. The participant could also filter the sessions by recording date, session duration, etc. In some embodiments, participants are able to browse archived sessions and/or scheduled sessions.

Figure 3B:
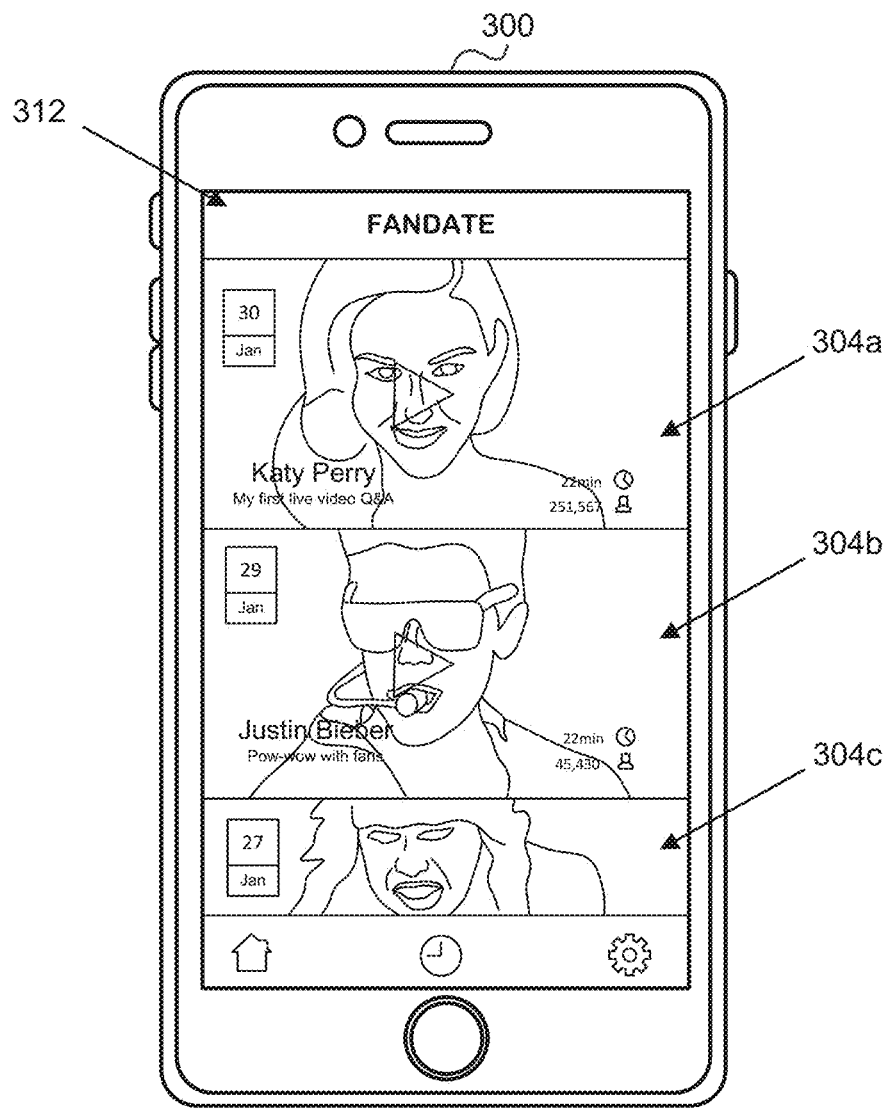
FIG. 3B shows an example interface that includes multiple interaction sessions displayed as multiple graphical elements.

FIG. 3B shows an example interface 312 that is similar to interface 302 except that each session in the list is displayed as a separate graphical element 304*a-c*. Similar to interface 302 of FIG. 3A, each of the sessions can be facilitated by the platform 100. Each of the sessions is a paced, synchronous interaction between a host and one or more participants. Each of the graphical elements 304*a-c* can include an image and/or video of the host involved in the interaction session, information regarding the interaction session (e.g., scheduled start, number of participants, title, category of discussion), etc. A prospective participant can elect to join one of the interaction sessions by, for example, interacting with (e.g., touching, tapping, or swiping) one of the graphical elements 304*a-c*.

Figure 3C:
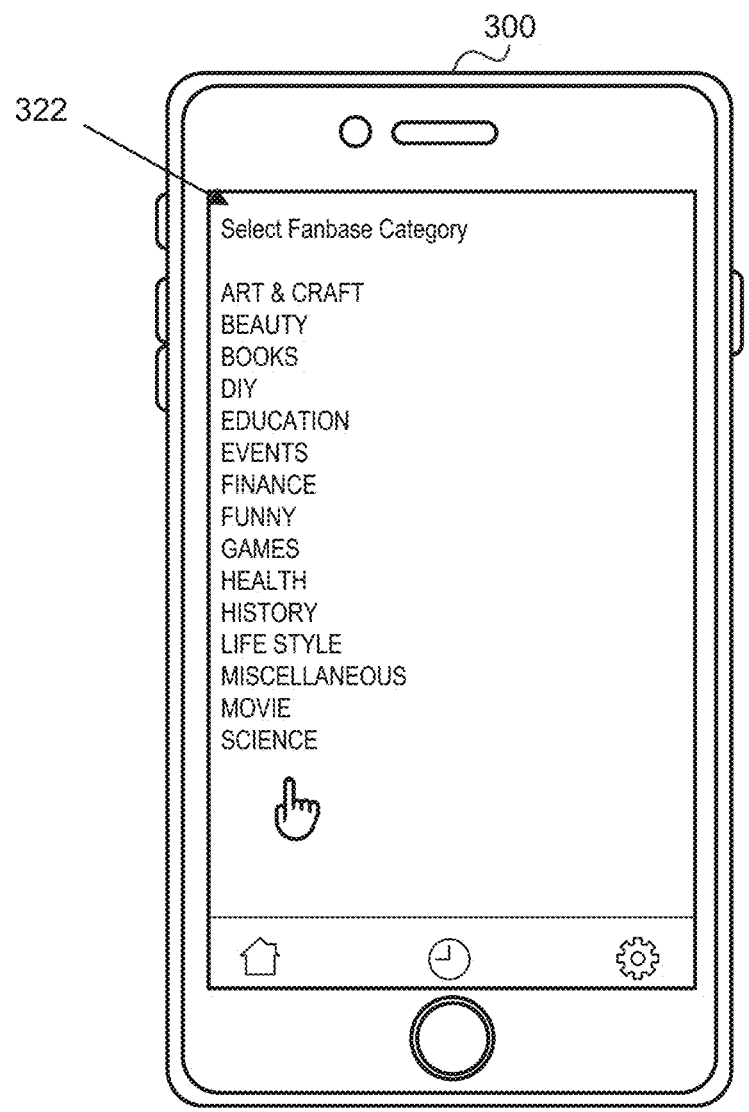
FIG. 3C shows an example interface including a list of categories of interaction sessions.

FIG. 3C shows an example interface 322 showing a list of categories of interaction sessions to be facilitated by the platform 100. The interaction sessions associated with the categories may include pending/scheduled sessions, in-progress sessions, archived session, or any combination thereof. Participants may be able to browse interaction sessions to be facilitated by the platform 100 by selecting one or more of the categories (e.g., art & craft, beauty, books, etc.). In response to receiving a selection of a category, a participant may be presented with an interface (e.g., interface 302 of FIG. 3A or interface 312 of FIG. 3B) that includes a list of interaction sessions that fit the selected category. For example, the user-selectable categories may pertain to a topic of discussion set up for the various interaction sessions.

Figure 3D:
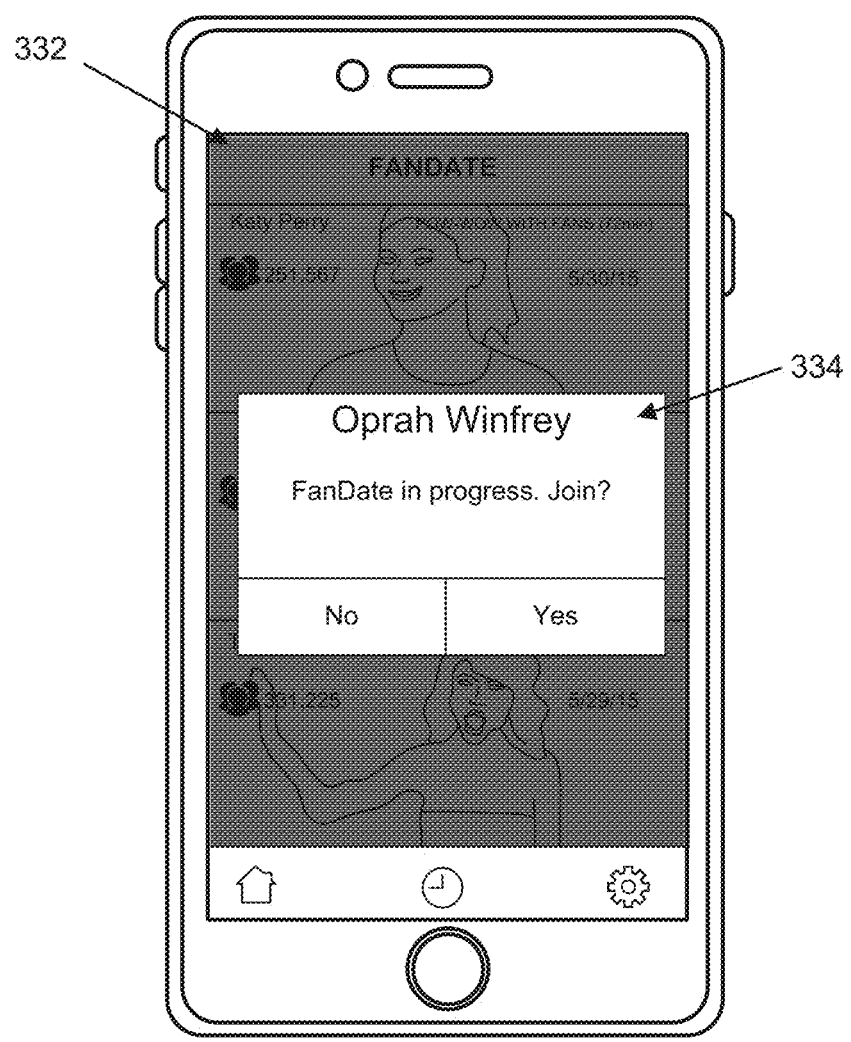
FIG. 3D shows an example interface for joining an interaction session that is already in progress.

FIG. 3D shows an example interface 332 showing an interactive graphical element 334 that prompts a user to join an interaction session hosted by a host (here, Oprah Winfrey). In some embodiments the interaction session may already be in progress, while in other embodiments the interaction session may be starting soon (e.g., in the next 5, 10, or 15 minutes). In response to opting to join the interaction session (e.g., by selecting yes), the user may be placed into the interaction session as an audience member.

Figure 4A:
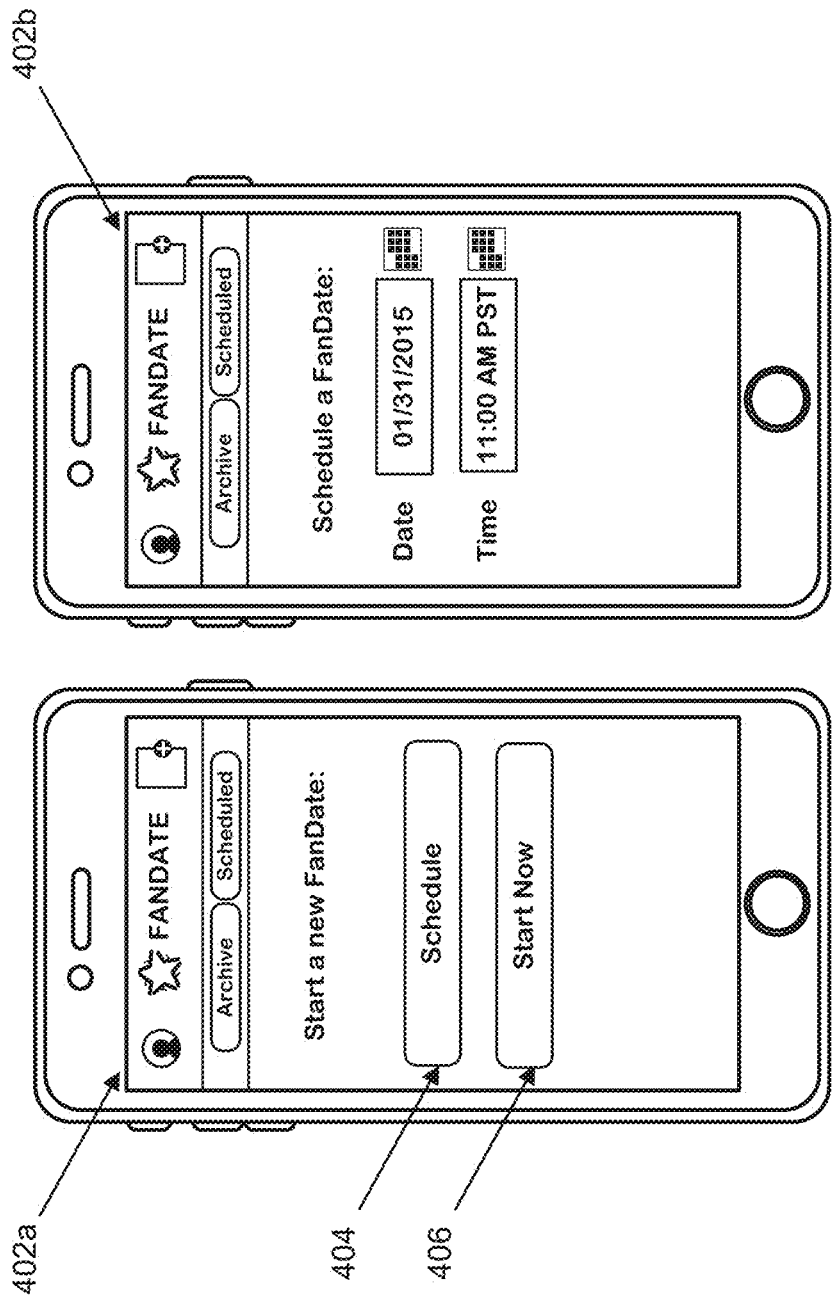
FIG. 4A shows example interfaces for creating an interaction session.

FIG. 4A includes example interfaces 402*a-b* that can be used by a host to create an interaction session. For example, a host may be able to schedule a session for a later time by selecting a schedule button 404 and specifying a date and/or time. A scheduled session can then be added to the host's calendar and/or the calendar of some other individual associated with the host user, such as a secretary, manager, or agent. In some embodiments, the host must be a celebrity or represent the celebrity to qualify to initiate an interactive session. The qualification of a host to initiate an interactive session may be based on a level of notoriety of the host. For example, the platform 100 may require that the host have a minimum number of followers/fans (e.g., at least 100,000, 500,000, or 1,000,000) on a social media service (e.g., Twitter followers or Facebook fans) to qualify as a celebrity and be granted permission to initiate an interaction session.

Figure 5:
FIG. 5 shows example interfaces through for users (e.g., hosts and participants) can log into other social media accounts.

In order to establish a given user's qualification as a celebrity, the given user may link her platform account with corresponding account(s) for other social media service(s), such as Twitter, Facebook, Snapchat, etc. FIG. 2, for example, includes screenshots of an interface 202*b* through which a user can sign into the platform account (e.g., via interfaces 202*a-b*) using login information for a third-party social media service, thereby providing access to certain information regarding the user managed by the third-party social media service. Examples of such information include the number of friends/followers/fans, performed activities, activity frequency, scheduled events, etc. Alternatively or additionally, a user who is already logged into the platform account may log into another social media account directly from the interface. For example, FIG. 5 shows example interfaces 502*a-b* through which a user can log into other social media accounts from within an interface generated by the platform 100.

In some embodiments, scheduled sessions are activated before the scheduled session start time. For example, sessions could be activated 10 or 15 minutes before the scheduled start time. Once a session has been activated, participants may be permitted to interact with (e.g., tap or click) a link and access the session through the computer program.

The host can also elect to commence an interaction session immediately by selecting a start now button 406. The host may answer questions as they are submitted by one or more participants, answer a predetermined set of questions, or simply record media content without any audience participation (e.g., a statement or performance). The host may also be able to specify whether an interaction session is presented in real time or recorded and stored by the platform 100 for subsequent viewing.

Figure 4B:
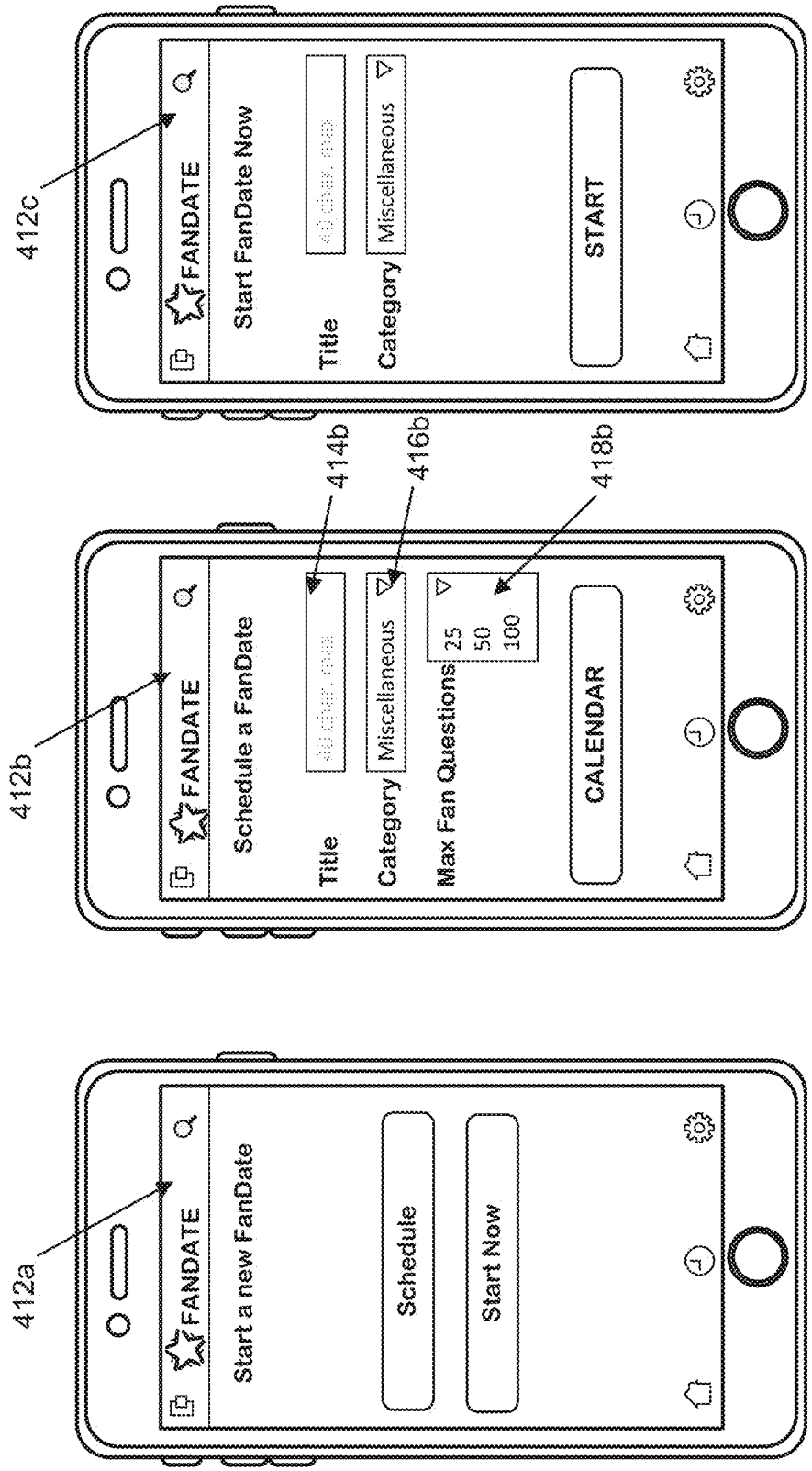
FIG. 4B shows example interfaces for creating an interactive session that include user-selectable options for specifying parameters, characteristics, restrictions, etc.

FIG. 4B shows example interfaces 412a-c for creating an interaction session. The interfaces 412a-c can include user-selectable options through which a host can select options for the interaction session. The user-selectable options may be in the form of text fields, pull-down menus, radio buttons, etc. For example, interface 412b includes a text field 414b in which a host can enter a title for the interaction session, a pull-down menu 416b through which the host can select from different pre-defined categories under which to list the interaction session, and a pull-down menu 418b through which the host can set a maximum number of questions to take during the interaction session. The example options 414b, 416b, and 418b in interface 412b are provided for illustrative purposes, and thus should not be construed as limiting. For example, a host may enter participant selection criteria through similar interfaces to facilitate selecting participants from whom to take questions or comments during the interaction session.

Figure 4C:
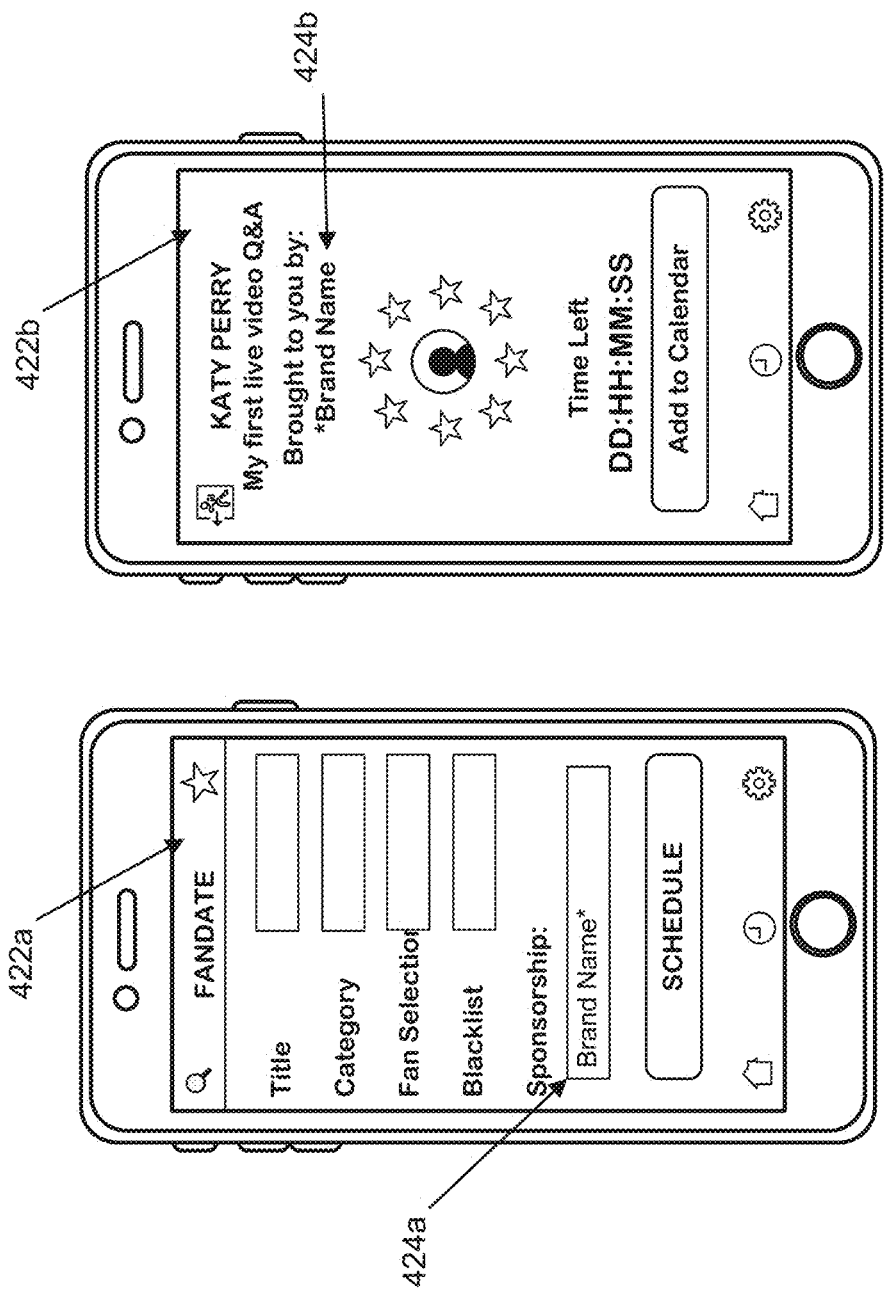
FIG. 4C shows example interfaces for setting up sponsorship for an interaction session.

FIG. 4C shows example interfaces 422a-b for setting up sponsorship of an interaction session. Similar to the user-selectable options 414b, 416b, and 418b in interface 412b of FIG. 4B, interface 422a can include a user-selectable option 424a for setting up sponsorship of an interaction session. For illustrative purposes, option 424a is shown in interface 422a as a text field through which a host can enter a brand name. However, in other embodiments, option 424a may include other input mechanisms such as a list of specified sponsors from which the host can select (e.g., via a drop-down menu), an option to upload media (e.g., an advertisement associated with the sponsor), an option to link to a social media account associated with the sponsor, etc. After the host has set up the interaction session with a sponsor via interface 422a, interface 422b may display information about the interactive session that includes sponsorship information 424b. Again, for illustrative purposes, sponsorship information 424b is shown in interface 422b as a text string reading "Brought to you by: *Brand Name." However, in other embodiments, the sponsorship information 424b may include images, videos, links, interactive elements, etc.

FIG. 5 shows example interfaces 502a-b that illustrate how a host may readily log into a social media account directly from the interfaces 502a-b. When the host has linked a platform account with one or more social media accounts, any interaction sessions that are scheduled by the host may be announced across the corresponding social media channel(s). For example, an upcoming interaction session may be automatically announced to the friends/followers/fans of a host via the host's Facebook account, Twitter account, etc.

Figure 6:
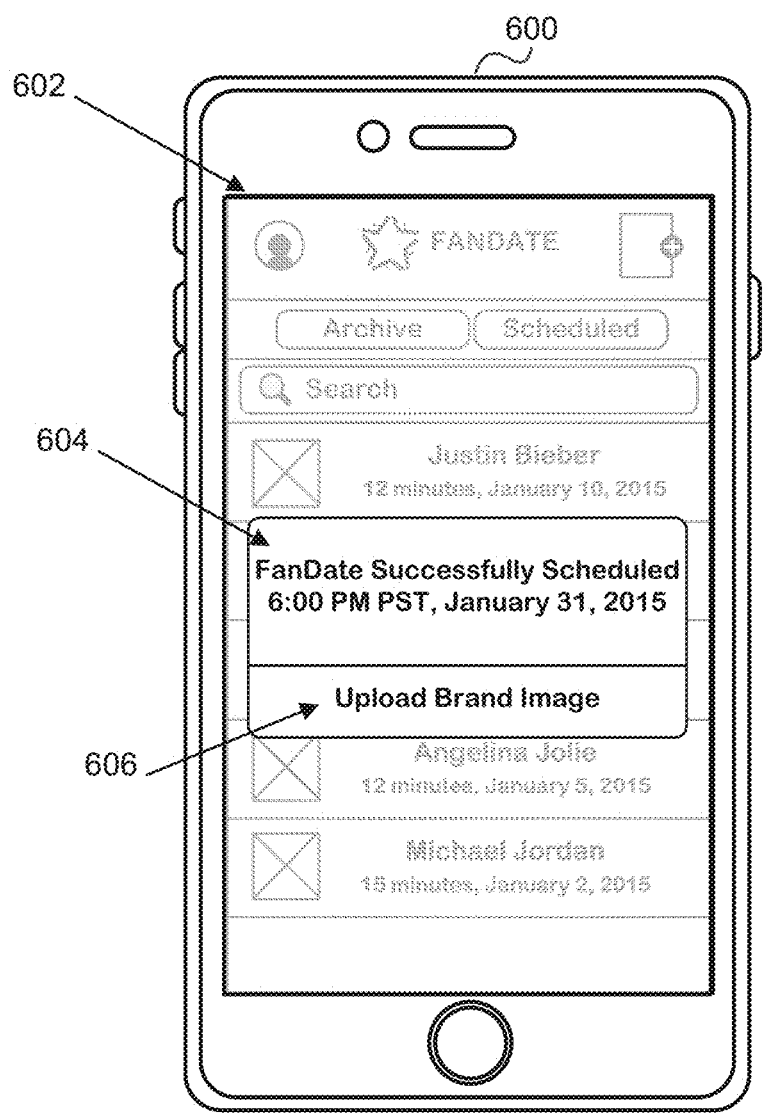
FIG. 6 shows an example \ interface for announcing that an interaction session has been successfully scheduled.

FIG. 6 shows an example interface 602 that includes a notification 604 announcing an interaction session has been successfully scheduled. In some embodiments, a host can upload a brand image, marketing information, etc., via an interface element 606 included in the notification 604. As noted above, the host may also be able to announce the interaction session by pushing the notification 604 out through one or more social media channels. For example, the host may choose to announce the interactive session on Facebook, Twitter, Snapchat, etc.

In some embodiments, the notification 604 automatically disappears after a predetermined interval of time has elapsed (e.g., three, five, or ten seconds) or after the host taps on the display of the user device 600 on which the notification 604 is presented. In other embodiments, the computer program requires that the host confirm the interaction session by interacting with a particular element on the interface (e.g., a confirmation button).

FIGS. 7A-E include example interfaces that depict various stages of an interaction session between a host (e.g., a celebrity) and one or more participants (e.g., fans of the celebrity). A session may initially begin with a start screen 702. During the broadcasting interval, the host may be able to stop video and/or mute audio at any time. In some embodiments, the host is also able to take questions from participants (i.e., "open the floor" to audience members) by tapping on a Q&A button 704.

Figure 7A:
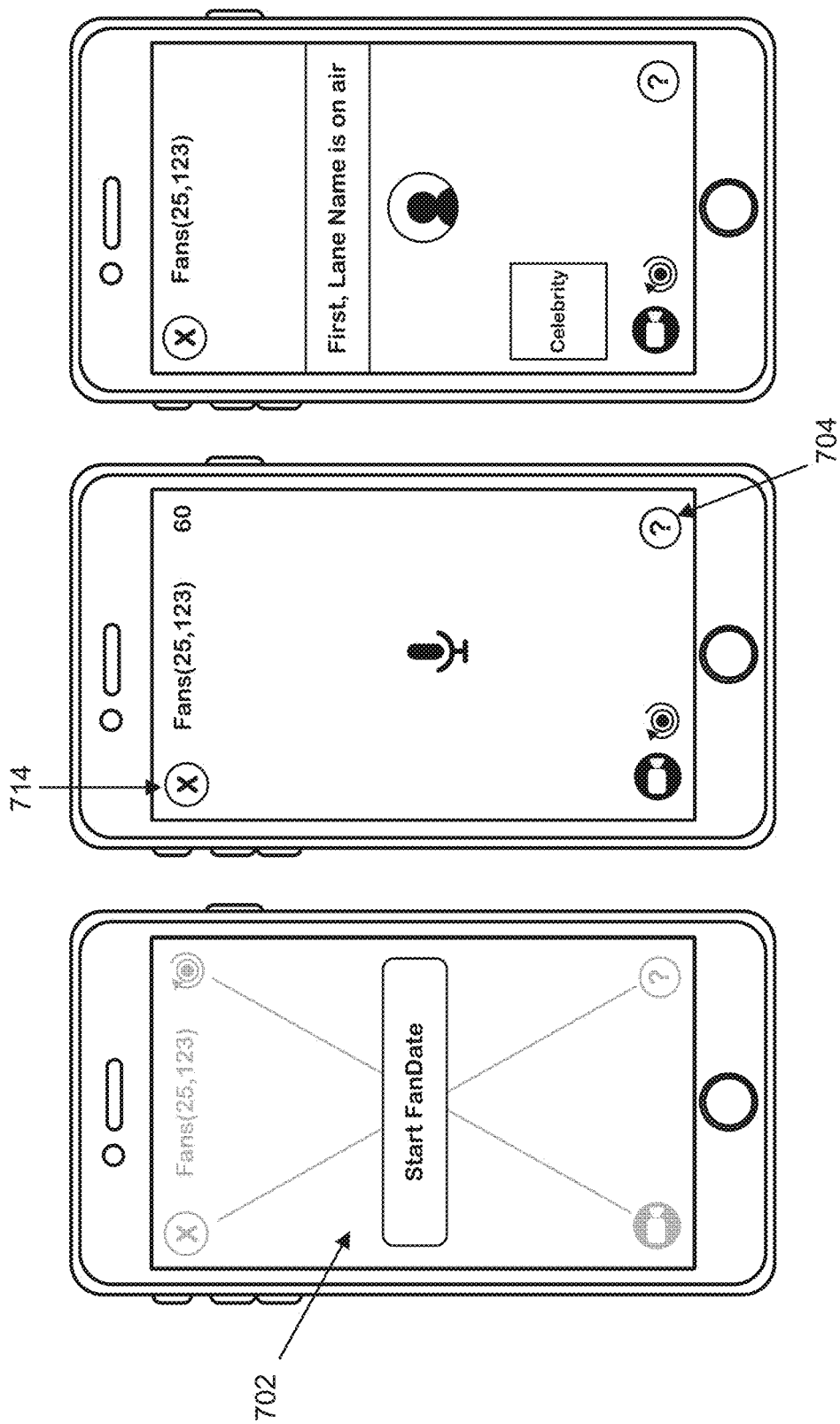
FIGS. 7A-E show example interfaces that depict various stages of an interaction session.
Figure 7B:
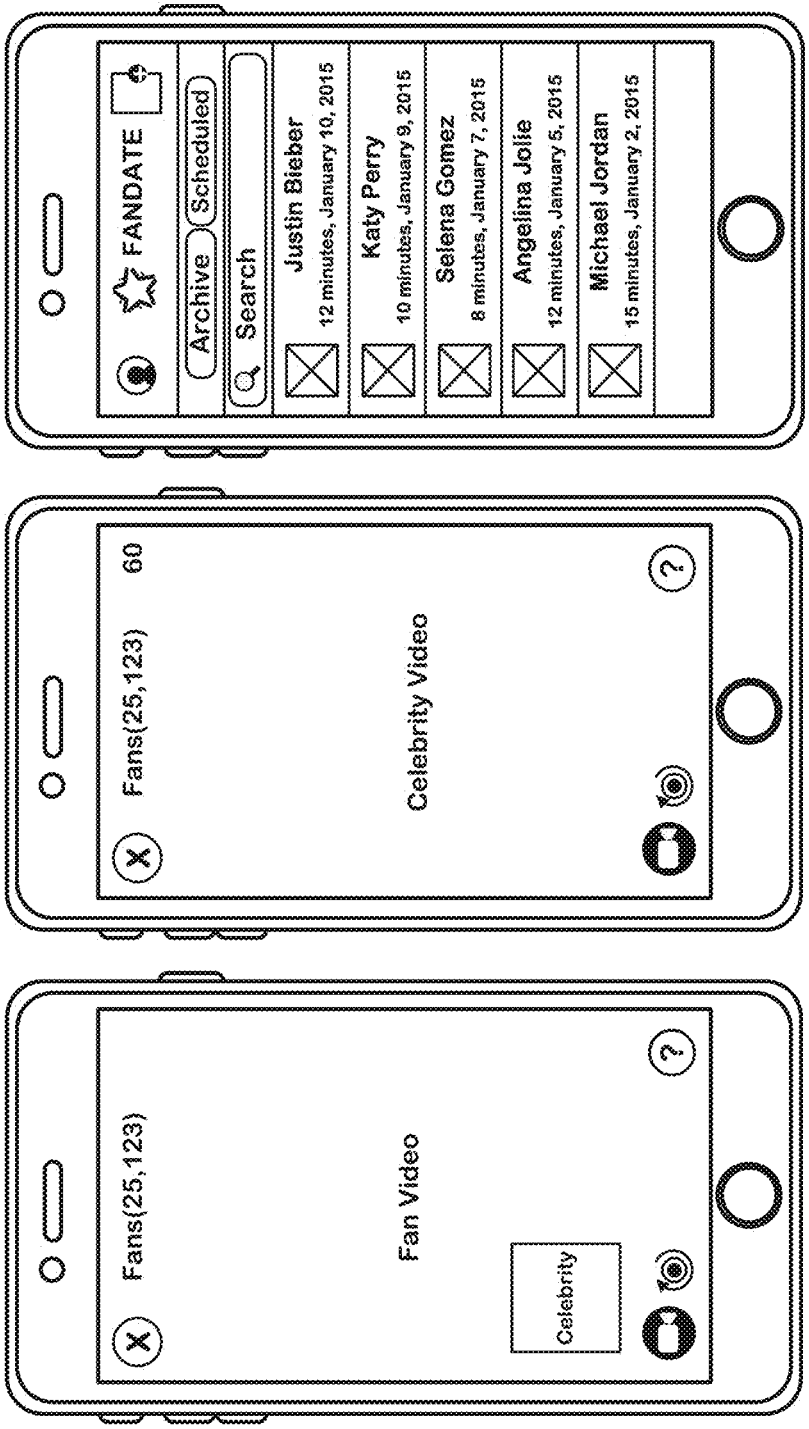
Figure 7C:
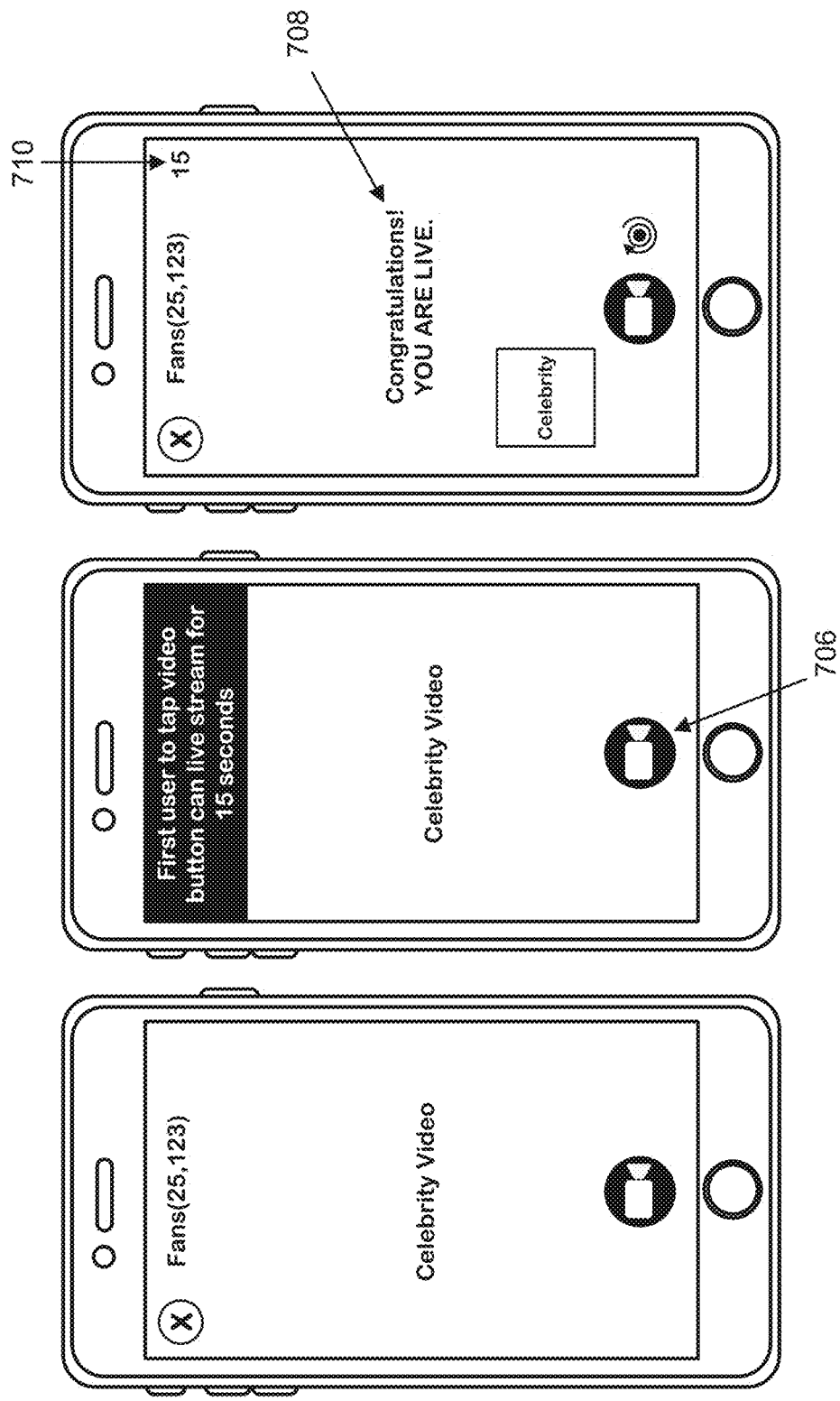

As shown in FIG. 7C, a video button 706 could be displayed to some or all of the participants that allows those participants to initiate the transmission of a media stream during the interaction session. For example, the video button 706 may be presented to a predetermined number of participants (e.g., the first ten participants to enter the interaction session) or a subset of the participants who satisfy a certain selection criterion (e.g., have an uplink speed of at least 500 Kbps or have a certain number of social media followers/fans).

Figure 7D:
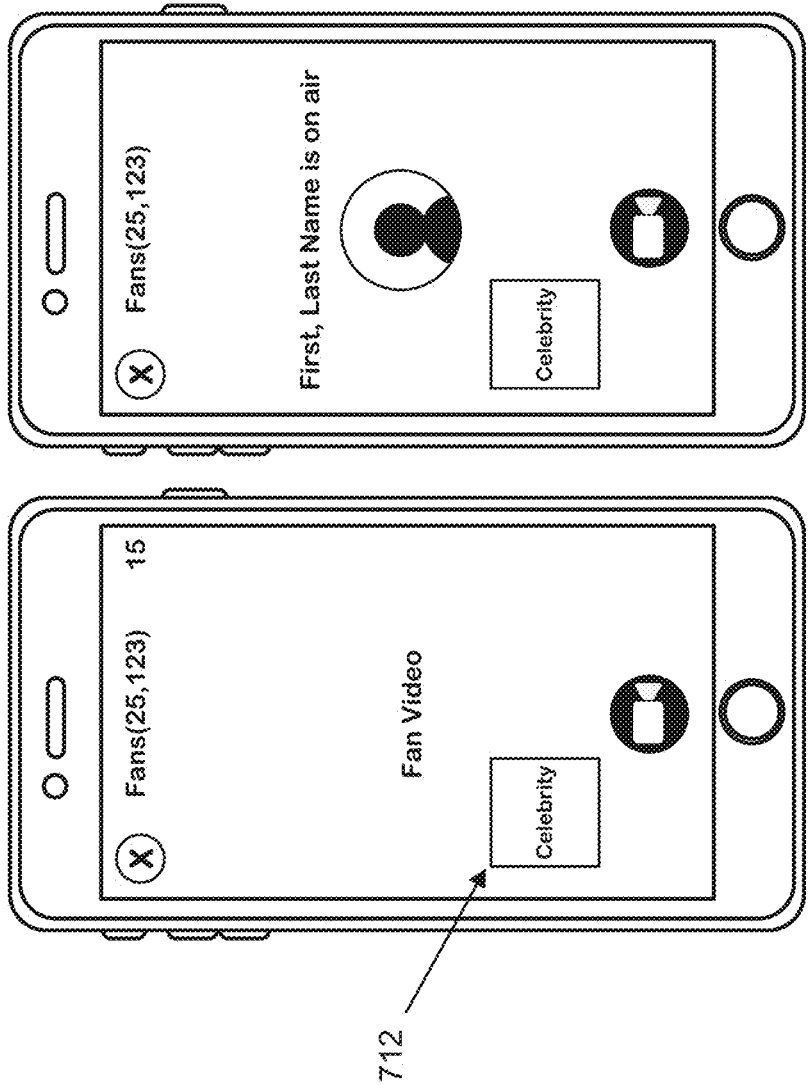
Figure 7E:
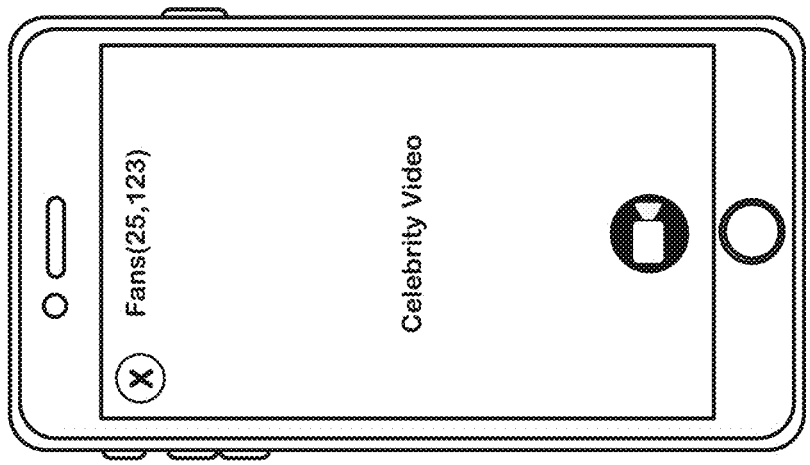

This may be necessary to provide a high-quality user experience, as well as keep mischief mongers with fake social media accounts from asking the host inappropriate questions. The first participant to tap on the video button 706 could be announced to all other participants involved in the session by displaying the selected participant's profile picture and name for a few seconds (as shown by FIG. 7D) or by audibly announcing the selected participant's name. In some embodiments, the host and/or an administrator who is responsible for managing the platform 100 are able to terminate the selected participant's media stream at any time.

As shown in FIG. 7C, a selected participant may be able to stream media to the host and the other participants. After tapping the video button 706, a notification 708 could be presented to the selected participant that indicates the selected participant's media stream is now live. In some embodiments the media stream includes audio recorded by the selected participant's computing device, while in other embodiments the media stream includes audio and video recorded by the selected participant's computing device. The interface may also display a countdown 710 (e.g., downward from 10 seconds, 15 seconds, or 30 seconds) that advises the selected participant of the time remaining before the media stream is terminated.

After the selected participant's broadcast automatically times out or is manually terminated, the floor button 712 is activated and the host's media stream is once again displayed. For example, the host's media stream may be automatically brought back to full screen on each participant's display when no participants are uttering questions (i.e., when the host "has the floor"). The selected participant's media feed could be manually terminated by the selected participant, the host, or an administrator responsible for managing the platform 100. The host can then continue the session by tapping on the Q&A button 704 or end the session by tapping on the close button 714.

As shown by in FIGS. 7C-D, an individual participant's perspective generally consists mainly of the host's media stream unless another participant is streaming media to the session (e.g., asking a question, submitting a comment, etc.). In some embodiments, those participants who are eligible to ask questions (and thus record themselves in real time) are visually notified on the display (e.g., by a blinking video button that appears on the display).

When a participant is selected (e.g., by being the first participant user to push the video button), the selected participant may have the floor for a predetermined amount of time. The amount of time may be based on the expected length of the session, the length of the question submitted, or could simply be a specified duration (e.g., 10 seconds, 15 seconds, or 30 seconds). After the predetermined amount of time expires, the media stream is ended and the interface may automatically revert to a different layout. In some embodiments, the selected participant, the host, and/or the administrator may be able to prematurely terminate the media stream.

A splash screen could also be displayed to a selected participant that indicates the selected participant is able to ask a question. Moreover, when a participant has the floor, that participant may be granted video and/or audio control. For example, the participant may be able to stream a live video feed or record an utterance without streaming video. The host's media stream will typically continue to be streamed while the participant's media stream is broadcast. For example, the host's media stream may continue to be shown within another window in the interface. Consequently, other participants may simultaneously hear and/or see the participant asking a question and the host receiving/responding to the question. Said another way, the media streams during an interactive session may be full duplex.

Figure 8:
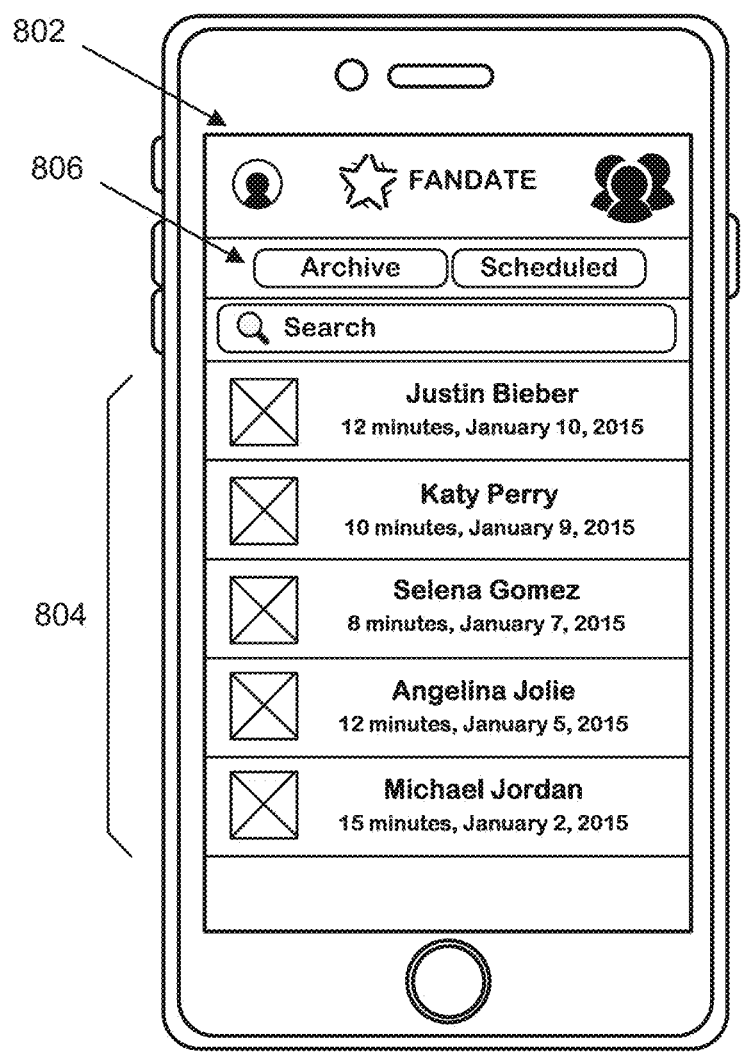
FIG. 8 shows an example interface including an archive of past interaction sessions.

FIG. 8 depicts an example interface 802 showing an archive of interaction sessions 804. The interaction sessions 804 could include sessions in which questions were asked by participants in real time, sessions in which pre-screened questions were read by the host, or sessions in which pre-recorded questions were streamed. Sessions in the archive may be replayed through the computer program as desired.

The interaction sessions could also be raw (i.e., unedited) recordings or processed (i.e., edited) recordings in which inappropriate questions, gaps of silence, etc., have been removed. Other media content (e.g., advertisements and audio files, such as music or sound effects) could also be added to processed recordings that are stored in the archive. As shown in FIG. 8, the archive may be readily accessible by tapping on an archive button 806 that is presented on some or all of the interfaces within the computer program.

Figure 9:
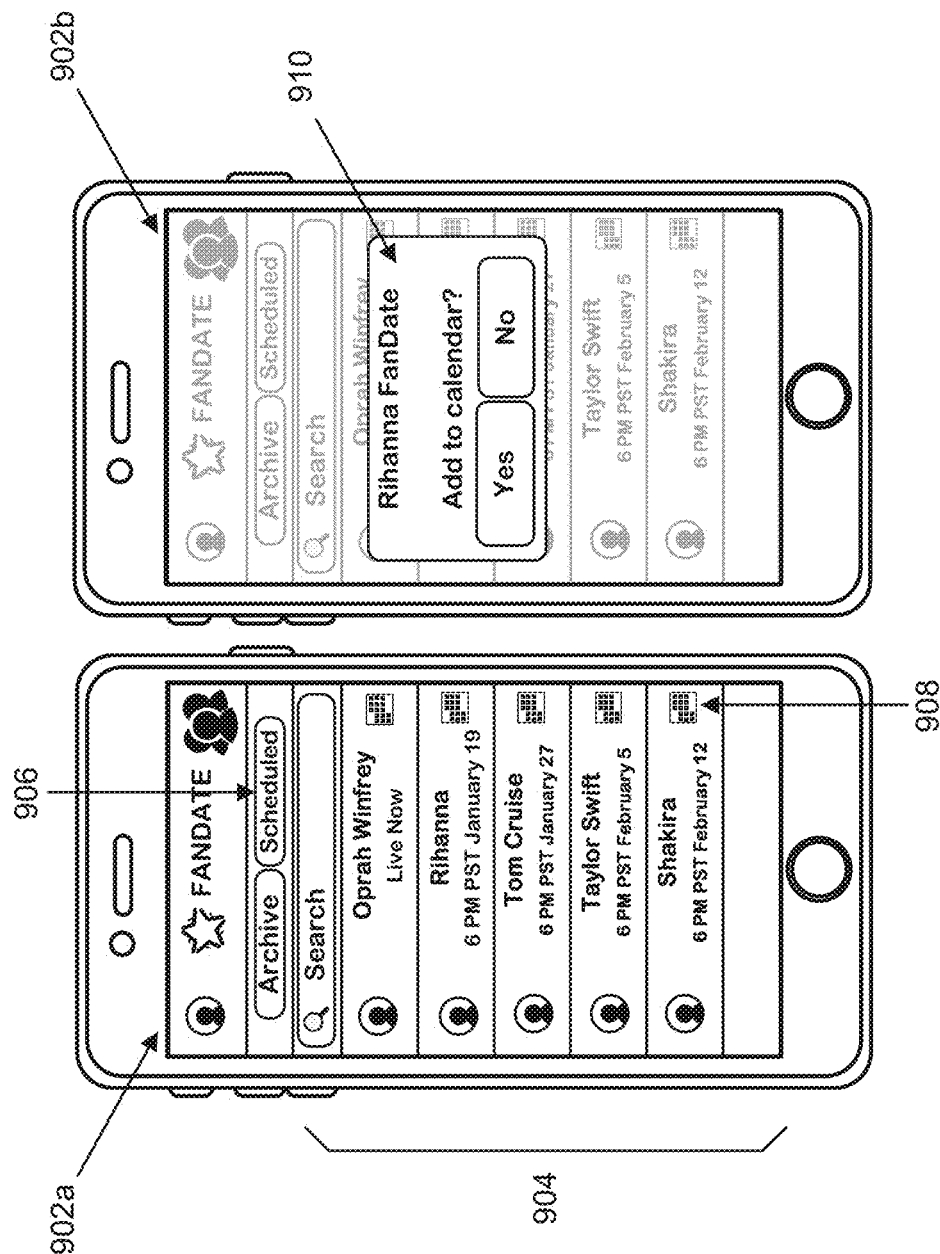
FIG. 9 shows example interfaces for adding scheduled interaction sessions to a calendar.

FIG. 9 shows example interfaces 902a-b that can be used to easily add scheduled sessions to a participant's calendar. More specifically, a list of scheduled sessions 904 can be shown to the participant upon selection of a scheduled button 906. The scheduled button 906 may be presented on some or all of the interfaces accessible through the computer program.

A calendar icon 908 may be displayed for each session that allows participants to easily add the scheduled sessions to a calendar program (e.g., Google Calendar, Microsoft Outlook, or Apple iCloud Calendar). In some embodiments, a notification 910 may be presented upon selection of the calendar icon 908 that prompts the participant to confirm whether the scheduled session should be added to a calendar. The notification 910 may also allow the participant to select which calendar program should be used, send information about the scheduled session to another participant (e.g., via text message, email, or social media), etc.

Figure 10:
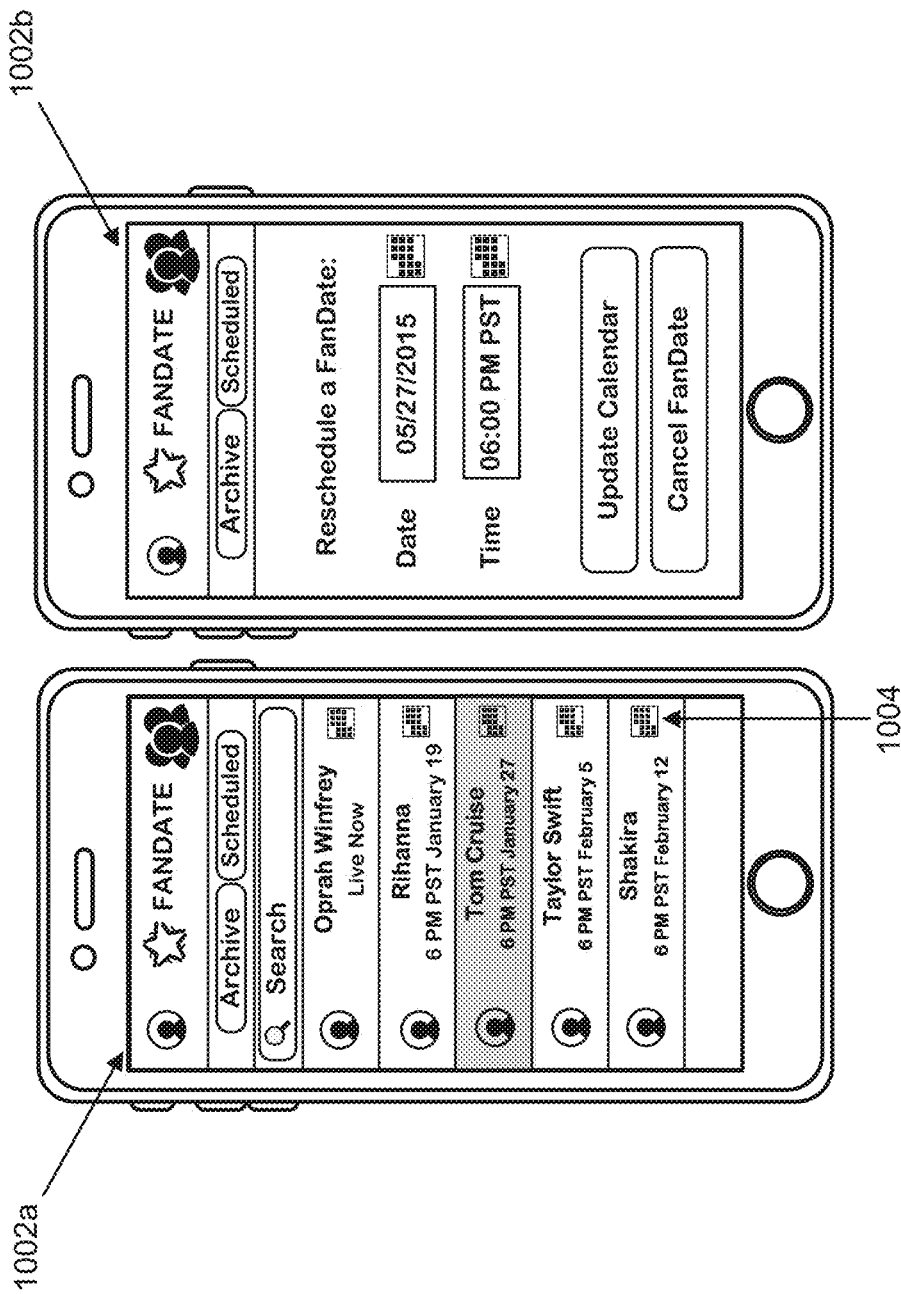
FIG. 10 shows example interfaces for rescheduling an interaction session.

FIG. 10 shows example interfaces 1002a-b that can be used to reschedule an interaction session through the computer program. More specifically, the computer program may allow a host and/or an administrator to readily reschedule an interaction session by clicking a calendar icon 1004.

In some embodiments, potential participants are also able to request that an interaction session be moved by selecting a desired time. If a sufficient number of potential participants request that the session be moved (e.g., a predetermined percentage of all social media fans or confirmed attendees), the host and/or the administrator may have additional motivation to move the session to a different date/time.

In such scenarios, the host can access the session schedule and set a new date and/or time for the interaction session. A notice of the new date/time could be broadcast to all potential participants (e.g., all fans of the host user on social media) or only those potential participants who have indicated an interest in attending the interactive session (e.g., registered through the computer program). The notice can be transmitted via text message, email, push notification, social media, etc. In some embodiments, the potential participants are able to specify (e.g., via a preferences menu accessible through the computer program) which of these communication channels should be used.

Participant Selection Mechanism—Example General Processes

As mentioned above, the platform 100 and various interface features provide for an effective communication mechanism through which hosts (e.g., celebrities and team leaders) can connect with participants (e.g., fans and team members), such as during an interaction session. Described herein are various participant selection mechanisms that enable a host of an interaction session to select or screen the participants with whom the host interacts during the interaction session. As will be described in greater detail below, these participant selection mechanisms can include pre-filtering, pre-selecting, pre-recording, geotagging, blacklisting, etc.

Figure 11A:
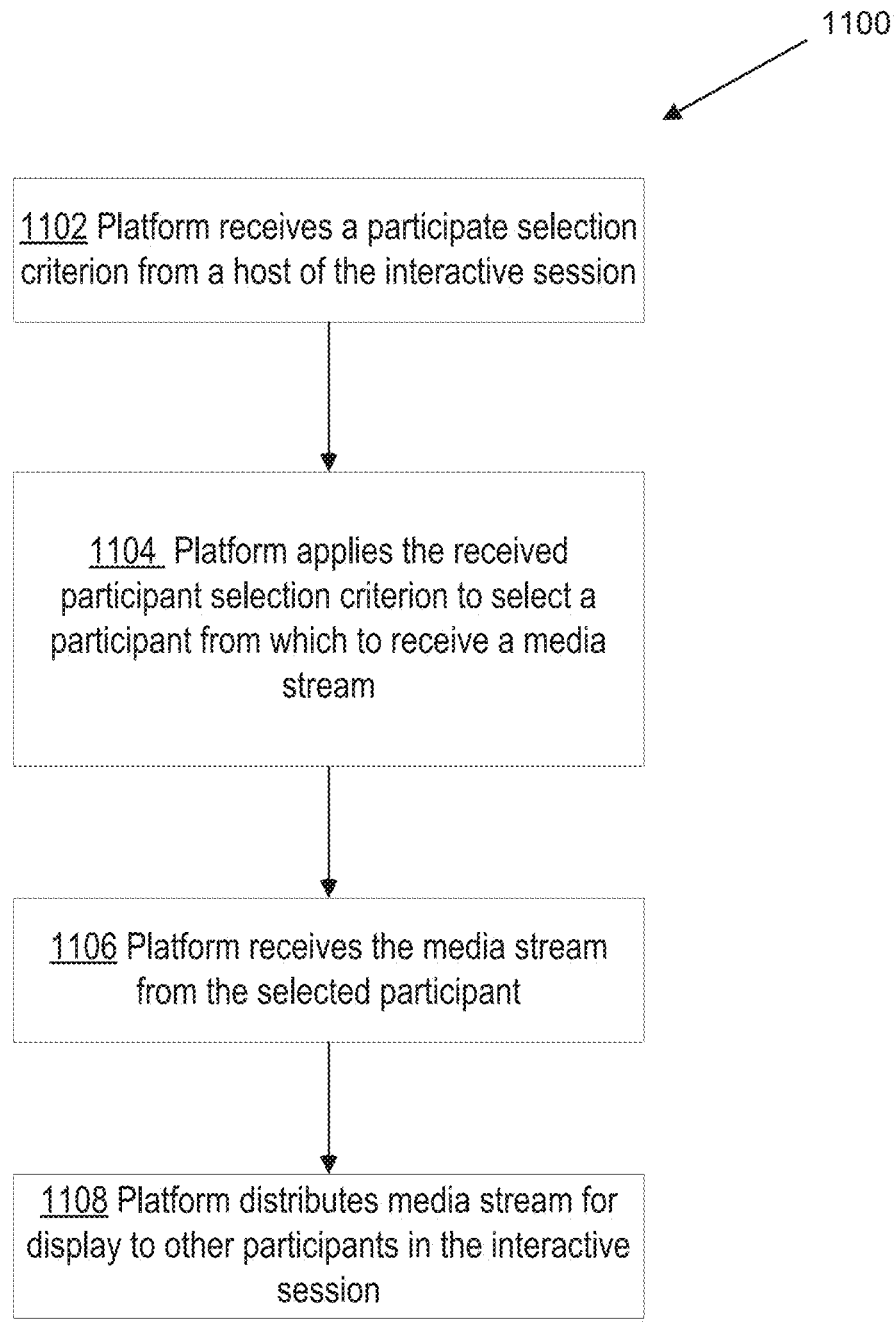
FIG. 11A shows a flow chart of an example process for selecting a participant that will interact with a host during an interaction session.

FIG. 11A is a flow chart of an example process 1100 for selecting a participant for interaction during an interactive session with a host. An interaction in this context may refer to receiving or broadcasting a media stream (e.g., a video question) from the selected participant, for example as described with respect to FIGS. 7A-E. In some embodiments, the process 1000 is performed by one or more computer systems operating as part of the platform 100 for facilitating a paced, synchronous interaction session.

At step 1102, the platform 100 receives a participant selection criterion (or participant selection criteria) from a host of an interactive session. A participant selection criterion can include pre-filtering, pre-selecting, pre-recording, geotagging, blacklisting, or any combination thereof. In some embodiments, the participant selection criterion is received as part of a request by the host to initiate an interaction session. The platform 100 may generate an interface accessible via a computing device (and, more specifically, via a computer program executing on the computing device) through which a host can initiate an interaction session. Further, such an interface may include interactive elements through which the host can define the participant selection criterion before initiating the interaction session. FIG. 12 shows example interfaces 1202a-b through which a host can provide input to define one or more participant selection criteria. For example, example interfaces 1202a-b include user-selectable options 1204a-b in the form of pull-down menus through which the host may select one or more categories of participant selection criteria (e.g., pre-filtering, pre-selecting, pre-recording, etc.) to apply to a given interaction session.

The platform 100 can identify a received participant selection criterion based on one or more inputs received via interfaces 1202a-b of FIG. 12. Moreover, at step 1104, the platform 100 can apply the received participant selection criterion to select a particular participant from which to receive a media stream during an interaction session. The media stream may be received from a computing device associated with the particular participant that is connected to the interactive session. The media stream can include live and/or pre-recorded media. Moreover, the media stream may include text, audio, images, video, metadata, or any combination thereof.

The ways in which various types of participant selection criteria are applied will be described in further detail below. At step 1106, the platform 100 receives the media stream from the particular participant, and at step 1108, the platform 100 distributes the media stream received from the particular participant to other participant(s) in the interactive session for display on their respective computing devices, for example as described with respect to FIGS. 7A-E. Said another way, the platform 100 can broadcast the media stream to other participant(s) for display on their respective computing devices.

Figure 11B:
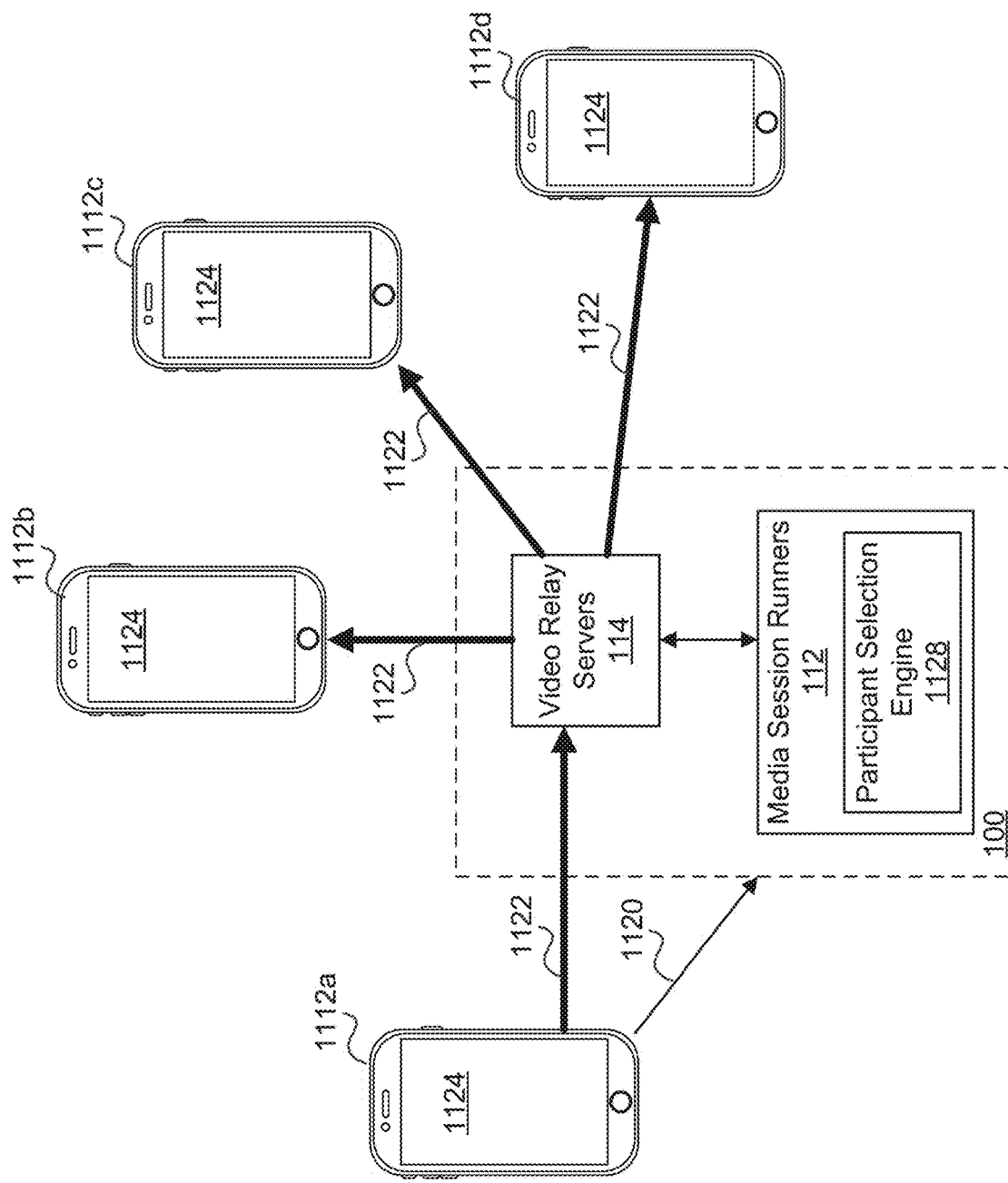
FIGS. 11B-D show a sequence of architectural flow diagrams that illustrate an example process for selecting a participant during an interaction session.
Figure 11C:
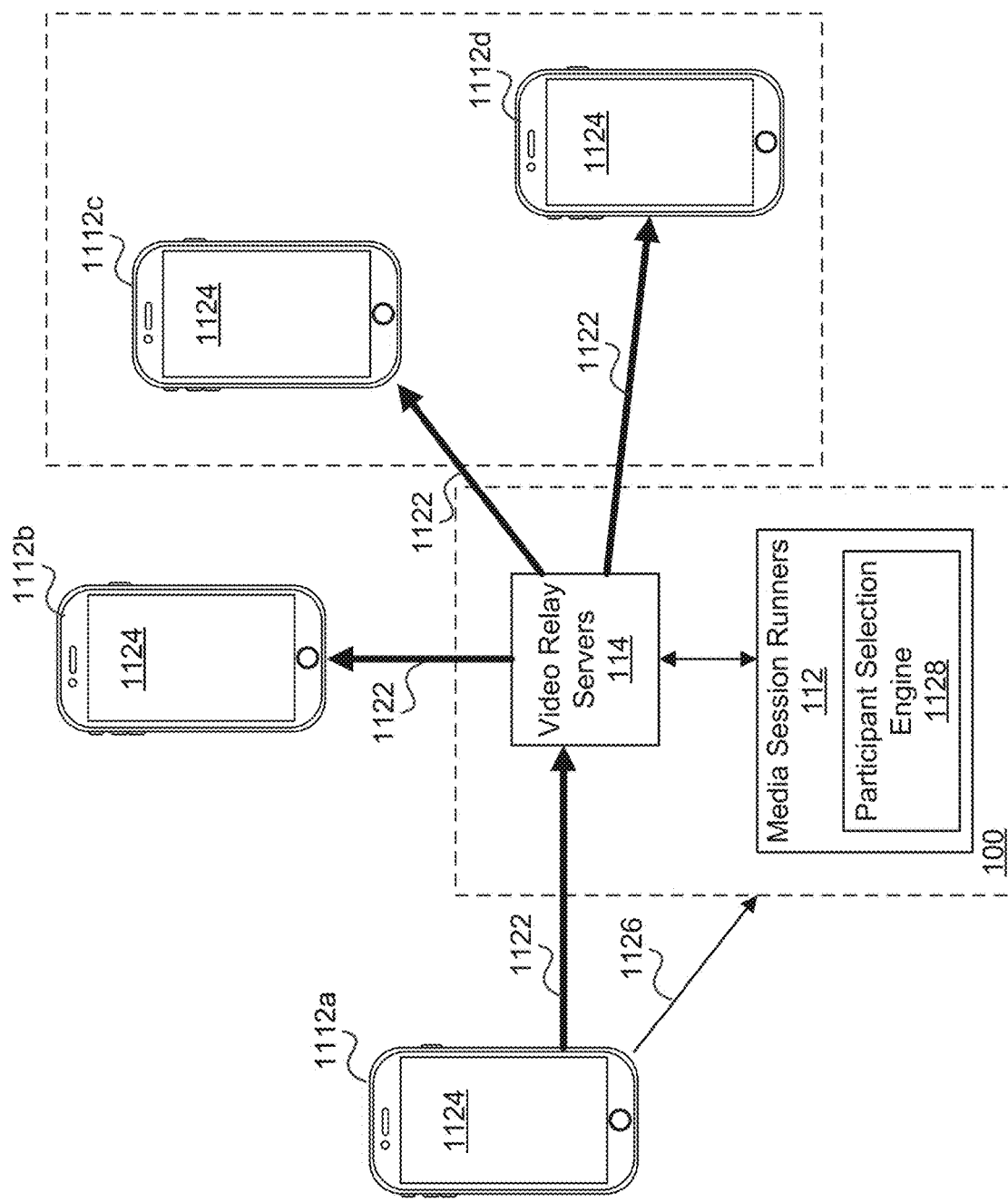
Figure 11D:
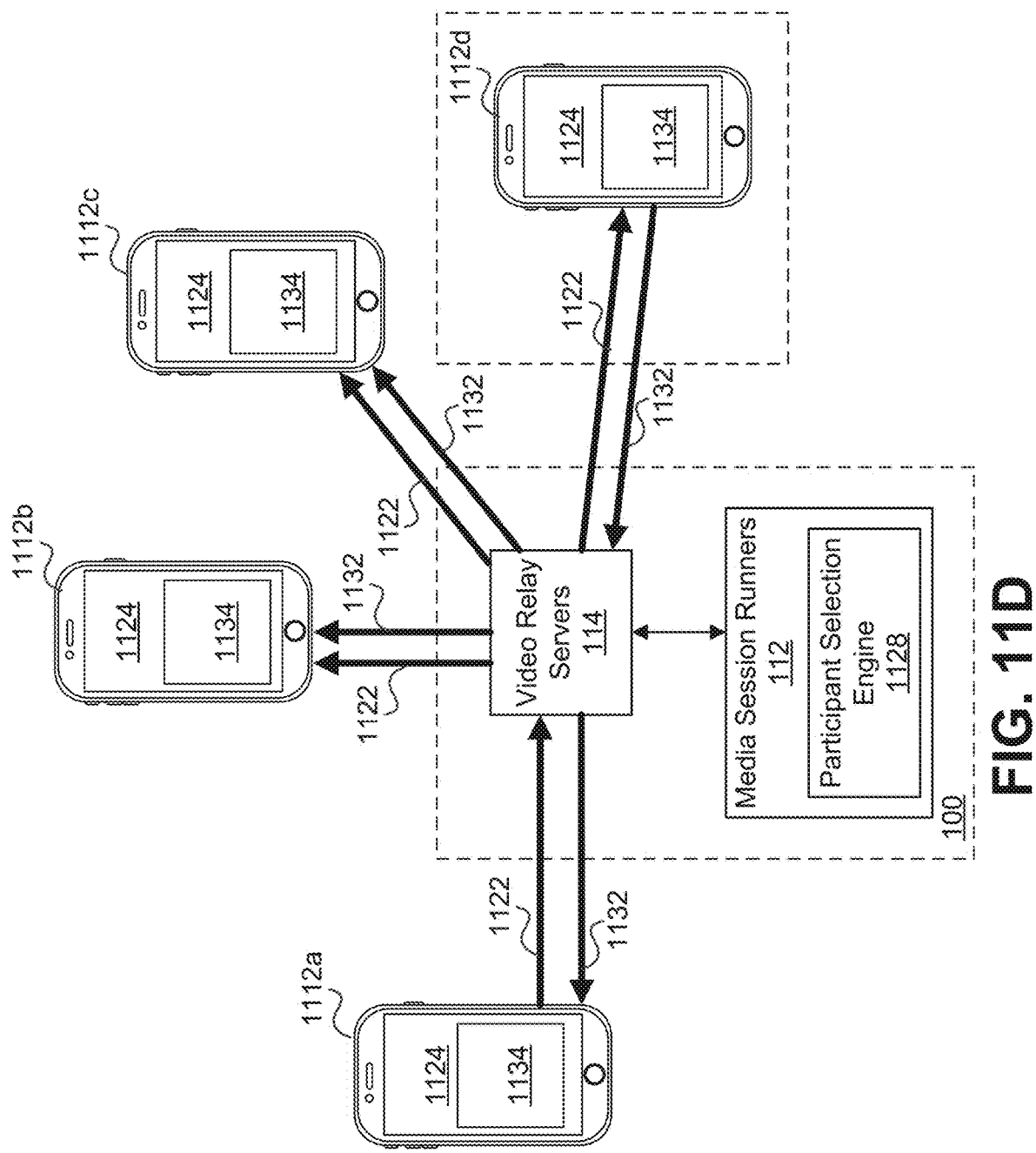

FIGS. 11B-D show a sequence of architectural flow diagrams that further illustrate processes for selecting a participant for interaction during a paced, synchronous interaction session. As shown in FIG. 11B, a host device 1112a may transmit a request 1120 to the platform 100 to initiate an interaction session with multiple participant devices 1112b-d. Note that the host device 1112a and the participant devices 1112b-d may be similar to devices 102a-c described with respect to FIG. 1. Further, platform 100 shown in FIG. 11B may be the same as platform 100 shown in FIG. 1, through certain components may not be shown for clarity. In some embodiments, the request 1120 includes a participant selection criterion, for example as previously described with respect to FIG. 11A.

In response to receiving the request 1120 from the host device 1112a, the platform 100 may initiate the interaction session between the host device 1112a and the multiple participant devices 112b-d. In an embodiment, the interactive session may include a first communication channel that facilitates the broadcast of a media stream 1122 from the host device 1112a to the multiple participant devices 1112b-d. The first communication channel may remain open throughout the interaction session, thereby enabling streaming from the host device 1112a to the multiple participant devices 1112b-d for the duration of the interaction session. The first communication channel may be provided via media session runners 112 through video relay servers 114. As used herein, the term "communication channel" can refer to any type of communicative connection over a network. For example, the first communication channel may represent a logical connection between the host device 1112a and the participant devices 112b-d over one or more physical media across one or more multiplexed networks. Note that, as shown in FIG. 11B, the media stream 1122 can be represented as a one-way stream of media data from the host device 1112a to the participant devices 1112b-d. In some embodiments, video relay servers 114 receive the media stream 1122 in the form of live video captured at the host device 1112a, replicate the media stream 1122 as necessary, and effectively broadcast the media stream 1122 to the multiple participant devices 1112b-d connected to the interaction session via the platform 100. At this stage, the participant devices 1112b-d may not be able to broadcast their own media streams to the host device 1112a or the other participant devices. Instead, the platform 100 may cause the host device 1112a and the participant devices 1112d-d to display the media stream 1112 as output 1124. In the case of video streamed in real time, the output 1124 could include live video of a host captured by the host device 1112a. In other words, as shown in FIG. 11B, the users of the participant devices 1112b-d can be participants (also referred to as "audience members") viewing the media stream 1122 from the user of the host device 1112a (i.e., the host). At this stage in the session, these participants may have limited or no ability to interact with the host using the host device 1112a or with other participants.

As shown in FIG. 11C, at any point during the interactive session, a host device 1112a may transmit a request 1126 to platform 100 to open the interactive session to audience participation. For example, as previously described with respect to FIGS. 7A-E, during an interactive session, a host may take questions from participants (i.e., "open the floor" to particular audience members). For example, the host may tap on a Q&A icon 704 as shown in FIG. 7A. In other words, the request by the host device 1112a is a request to open the interaction session to a second media stream from one of the multiple participant devices 1112b-d. In response to receiving the request, the platform 100 can apply the participant selection criterion to select one of the participant devices from which to receive the second media stream. Application of the participant selection criterion may be performed by a participant selection engine 1128 that is part of, or in communication with, the media session runner 112 for the interaction session, as shown in FIGS. 11B-D.

Application of specific types of participant selection criteria (e.g., pre-filtering, geotagging, etc.) is described in greater detail below. However, the process of selecting a participant from which to receive a media stream can take a few general forms. In some embodiments, depending on the participant selection criterion applied, a single participant device (e.g., participant device 1112d) may be automatically selected. In such embodiments, when a host presses the Q&A button 704 shown on an interface accessible on the host device 1112a, the platform 100 automatically initiates a second media stream from the particular participant device, without any additional input from the host via the host device 1112a or the selected participant via the selected participant device. In some embodiments, rather than automatically select a participant device, the platform 100 identifies a subset of participant devices that qualify for selection based on, for example, the participant selection criterion. For example, as shown in FIG. 11C, a participant selection engine 1128 can identify a subset of participant devices that qualify based on an applied participant selection criterion, as illustrated by the dotted line surrounding participant devices 1112c and 1112d.

Once a subset of qualified participant devices is identified, a participant from the subset may be selected using a number of methods. For example, the subset may be presented to a host at the host device 1112a with a prompt to input a selection of the participant from which to receive the second media stream. Alternatively, a selection process similar to that described above with respect to FIGS. 7A-E may be applied, in which a prompt is presented at each of the qualified participant devices (e.g., participant devices 1112c and 1112d) to initiate a media stream. The first qualified participant device from which a request is received is then selected to transmit a media stream. This can be accomplished by, for example, including a platform-synchronized timestamp in each request and comparing the timestamps of received requests to determine the first participant device to submit a request.

In response to selecting a participant device, the platform 100 can open a second communication channel that facilitates the broadcast of the second media stream from the selected participant device for a limited period of time during the interaction session. For example, as shown in FIG. 11D, a second communication channel has been opened enabling a media stream 1132 from the selected participant device 1112d (as indicated by the dotted line) to the host device 1112a and the other participant devices 1112b-d. Similar to media stream 1122, media stream 1132 can include text, audio, images, video, metadata, or any combination thereof. The second communication channel may be provided via media session runners 112 through video relay servers 114. Also similar to media stream 1122, the media stream 1132 can be represented in FIG. 11D as a one-way stream of media data from the selected participant device 1112d to the host device 1112a and the other participant devices 1112b-c. For example, video relay servers 114 can receive media stream 1132 in the form of live video captured by the selected participant device 1112d, replicate the media stream 1132 as necessary, and effectively broadcast the media stream 1132 to the host device 1112a and the other participant devices 1112b-c connected to the interaction session via the platform 100.

The media stream 1122 from the host device 1112a may persist for the duration of the interaction session. Accordingly, the concurrent media streams 1122 and 1132 may be synchronized for simultaneous presentation at the computing devices 1112a-d. For example, as shown in FIG. 11D, the platform 100 may cause the computing devices 1112a-d to display media stream 1112 as output 1124 and media stream 1132 as output 1134. For example, in the case of live streamed video, output 1124 could include live video of a host captured by the host device 1112a and output 1134 could include live video of a participant captured by the selected participant device 1112d. Output 1134 is presented as a frame within output 1124 at each computing device 1112a-d; however, those skilled in the art will recognize that the way in which the multiple media streams 1122 and 1132 are presented may dynamically change based on the type of individual viewing the interface (e.g., whether the individual is a host or participant). Thus, the arrangement of the media streams 1122 and 1132 could be different at each computing device. For example, as described with respect to FIGS. 7A-E, when a participant is given the floor to ask a question of the host, the output of her stream (e.g., media stream 1132) may be maximized relative to the output of the stream (e.g., media stream 1122) from the host device 1112a. Once the participant has finished asking her question and/or the media stream 1132 has been terminated, the output of the host stream 1122 may revert to a maximized state. Further, users at each computing device may be provided options to customize how the various streams are presented (e.g. options to resize and reposition windows).

Participant Selection Mechanism—Pre-Filtering

Figure 13:
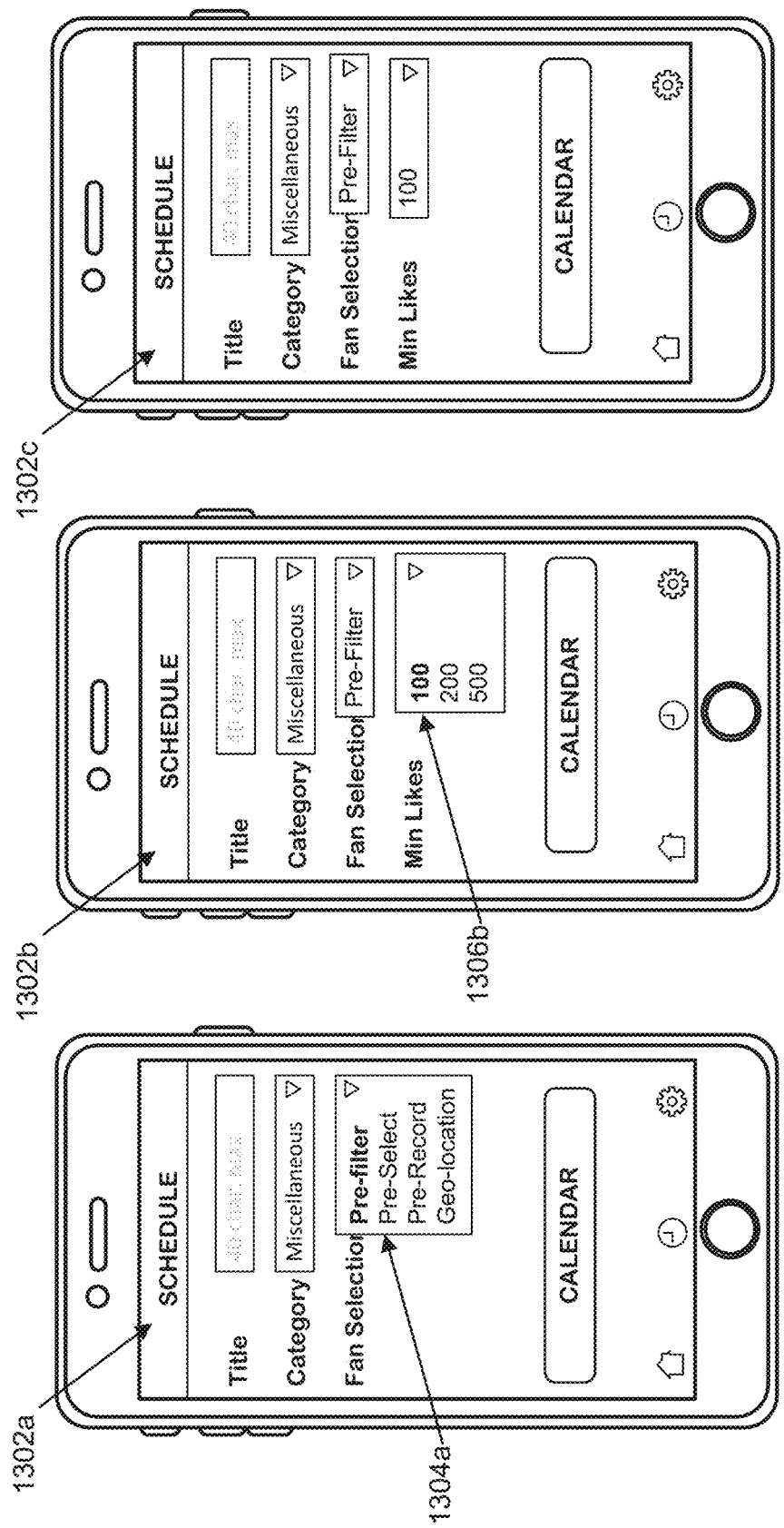
FIG. 13 shows a sequence of example interfaces for defining a participant selection criterion based on pre-filtered participants.

FIG. 13 shows a sequence of example interfaces 1302a-c that can be used to define a participant selection criterion based on pre-filtering. A host may access interface 1302a to request to initiate an interaction session. In some embodiments the request is to initiate the session immediately, while in other embodiments the request is to initiate the session at some future point in time. As shown in FIG. 13, interface 1302a may include an option 1304a through which the host can input a category of participant selection criterion to apply during the interaction session. For example, option 1304a is shown in interface 1302a as a pull-down menu listing multiple categories of participant selection criteria. In response to selecting "pre-filter," interface 1302b may be displayed to the host with an additional option 1306b to select a qualifier associated with the selected category of participant selection criteria. For example, in interface 1302b, option 1306b is presented as a pull-down menu that prompts the host to select a minimum number of likes that a given participant must have in order to be considered for selection. In some embodiments, participants in an interaction session can rate (e.g., "like") each other within or outside of the interaction session. Thus, participants can build notoriety, thereby becoming more trustworthy from the perspective of a host. As shown in interface 1302c, the host setting up the interaction session has selected "pre-filter" as the participant selection criterion with a minimum number of likes of 100 for a given participant to be eligible to be selected to interact with the host during the interaction session.

The example pre-filter selection criterion shown in interfaces 1302a-c based on a minimum number of likes as a qualifier is provided for illustrative purposes. In other embodiments, other qualifiers may be associated with a pre-filter selection criterion. A pre-filter selection criterion may be based on participant affiliations, qualifications, or characteristics. For example, only participants that are members of a host's fan club may be eligible for selection. As another example, only participants connected to a particular social media platform (e.g., Facebook) may qualify for selection. As another example, only participants in a certain age range (e.g., over 18) may qualify for selection. As another example, only participants employed by a certain employer may qualify for selection. Information regarding the characteristics of a participant may be gathered from the participant's platform account and/or the participant's other social media accounts. In some embodiments, a pre-filter selection criterion may include qualifiers based on the capabilities of the computing device and/or network used by each participant to access the interaction session. For example, a pre-filter selection criterion may include a minimum uplink bandwidth qualifier in order to support a seamless experience during the interaction session. It will be appreciated that a given pre-filter participant selection criterion may include more than one qualifier. For example, a host that submits a request (e.g., via interfaces 1302a-c) to initiate an interaction session may include a pre-selection criterion that requires participants have a minimum of 100 likes, a minimum uplink speed of 500 Kbps, and be over the age of 18.

A pre-filter participant selection criterion essentially defines a subset of the overall audience in a given interaction session from which the platform 100 may select for direct interaction with the host. For example, as previously described with respect to FIGS. 7A-E, during an interaction session, a host may take questions from participants (i.e., "open the floor" to audience members). Such action may be preceded by the host tapping a Q&A 704 on the interface of FIG. 7A. In response to the host "opening the floor," the platform 100 may select one or more participants in the interaction session from which to receive a media stream (e.g. a pre-recorded video message or a live video stream). If a pre-filter participant selection criterion exists for the interactive session, the platform 100 may apply that criterion in order to select a particular participant from which to receive the media stream.

In some embodiments, the platform 100 applies the pre-filter participant selection criterion to automatically select a particular participant that best meets the criterion. Oftentimes, a number of participants in a given interaction session may meet the pre-filter participant selection criterion, thereby establishing a subset of qualified participants. In such situations, the platform 100 may apply the selection mechanics described with respect to FIG. 7C in order to select a particular participant from the subset of qualified participants according to the pre-filter participant selection criterion. For example, consider again the scenario described above with respect to FIG. 7C. A video button 706 may be displayed to all qualified participants on their respective computing devices. Here, the video button 706 is displayed to the qualified participants with a message, "first user to tap video button can live stream for 15 seconds." Accordingly, the first of the qualified participants that transmits a request (e.g. by pressing the video button 706) is selected by the platform 100 and allowed to transmit a media stream for display to the host and any other participants in the interaction session. The media stream may be permitted to exist for a predetermined duration (e.g., 10 seconds, 15 seconds, or 30 seconds). The media stream may also be manually terminated in response to input by the selected participant, the host, or an administrator responsible for managing the platform 100.

Participant Selection Mechanism—Pre-Selection

Figure 14:
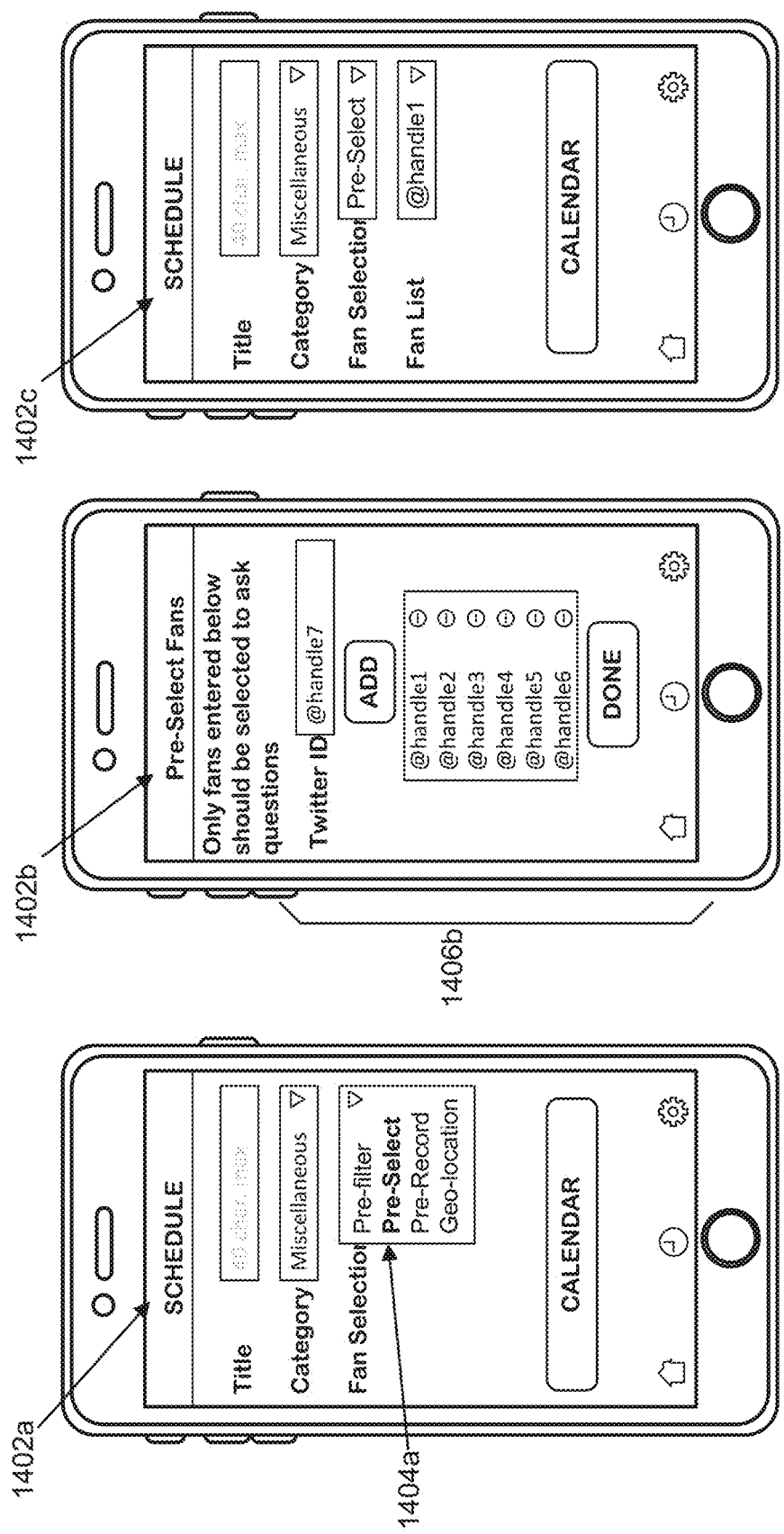
FIG. 14 shows a sequence of example interfaces for defining a participant selection criterion based on pre-selected participants.

FIG. 14 shows a sequence of example interfaces 1402*a-c* that can be used to define a participant selection criterion based on pre-selecting specific participants, also referred to herein as "pre-selection." A host may access interface 1402*a* to request to initiate an interaction session. In some embodiments the request is to initiate the interaction session immediately, while in other embodiments the request is to initiate the interaction session at some scheduled point in the future. As shown in FIG. 14, interface 1402*a* may include an option 1404*a* through which the host can input a category of participant selection criteria to apply during the interaction session. For example, option 1404*a* is shown in interface 1402*a* as a pull-down menu listing multiple categories of participant selection criteria. In response to selecting "pre-select," interface 1402*b* may be displayed to the host with an additional option 1406*b* to select a qualifier associated with the selected category of participant selection criteria. For example, in interface 1402*b*, option 1406*b* includes a text field through which a host can enter unique identifiers (e.g., Twitter usernames) associated with one or more participants. For example, a host may know of one or more trusted participants from which they would be comfortable fielding questions during an interaction session. These trusted participant(s) may be known to the host in the real world, have submitted questions in past sessions, etc. In response to entering a unique identifier (e.g. "@handle7"), the host may add the entered identifier by pressing the "add" button shown in interface 1402*b*. The entered identifier may then be added to a list of previously entered identifiers and displayed to the host (e.g., as shown at the list of identifiers including @handle1-@handle6) so that the host can inspect the list and make edits if necessary. Once the host is satisfied with the list of pre-selected identifiers, the host can press the "done" button and is presented with interface 1402*c* that includes the participant selection criterion. Similar interfaces may permit the host to manually create a list of unique identifiers corresponding to participants who the host would like to prevent from posing questions during an interaction session.

The example pre-selection criterion shown in interfaces 1402*a-c* based on social media identifiers entered into a text field is provided for illustrative purposes. In other embodiments, participants may be pre-selected using other mechanisms. For example, a host may be able to access a list of the top rated participants across the platform 100 (e.g. based on the number of "likes," questions submitted, sessions attended, etc.) or from past interactive sessions involving the host. Accordingly, interfaces similar to interfaces 1402*a-c* may allow a host to select from a pre-defined list of top rated participants to add to a participant selection criterion for a given interaction session.

Similar to pre-filtering, pre-selection as a participant selection criterion essentially defines a subset of the overall participants in a given interaction session from which the platform 100 may select for direct interaction with the host. Accordingly, similar interface mechanics as described with respect to FIGS. 7A-E may apply when selecting a particular participant from which to receive a media stream.

Participant Selection Mechanism—Pre-Recorded Messages

In certain situations, a host may not wish to take live questions during an interactive session. Instead, the host may opt to solicit a predetermined number of pre-recorded questions. The pre-recorded questions may include text, audio, images, video, metadata, or any combination thereof. More specifically, prior to the start of an interaction session, the platform 100 may solicit "n" number of pre-recorded questions from potential participants in the interaction session. The host can then review at least some of the pre-recorded questions, elect which pre-recorded question(s) to answer, and provide answer(s) to the elected pre-recorded question(s) during the interaction session.

Figure 15:
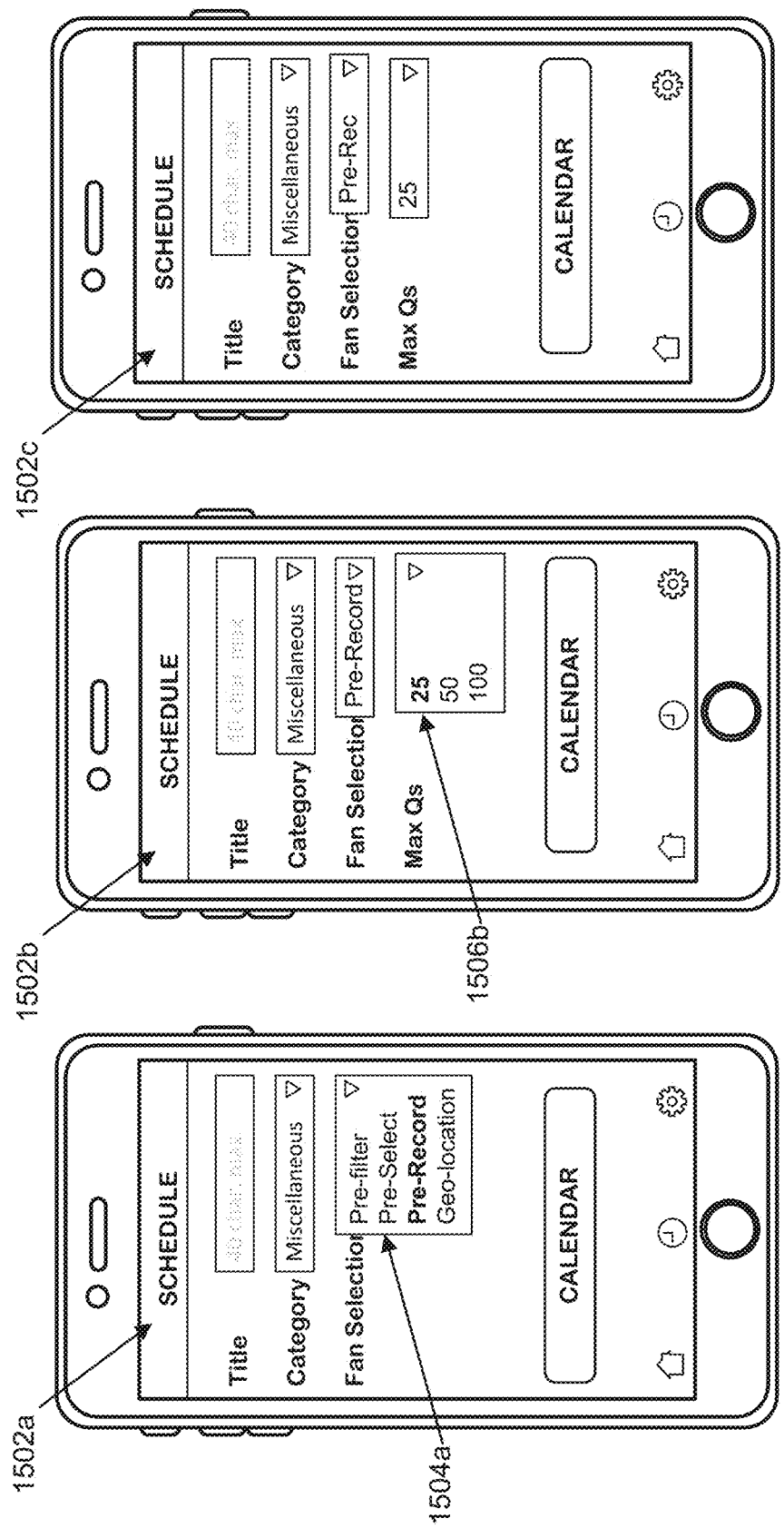
FIG. 15 shows a sequence of example interfaces for defining a participant selection criterion based on pre-recorded media.

FIG. 15 shows a sequence of example interfaces 1502*a-c* that can be used to define a participant selection criterion based on pre-recorded media, also referred to herein as "pre-record." A host may access interface 1502*a* to request to initiate an interaction session. In some embodiments the request is to initiate the interaction session immediately, while in other embodiments the request is to initiate the interaction session at some scheduled point in the future. As shown in FIG. 15, interface 1502*a* may include an option 1504*a* through which the host can input a category of participant selection criteria to apply during the interactive session. For example, option 1504*a* is shown in interface 1502*a* as a pull-down menu listing multiple categories of participant selection criteria. In response to selecting "pre-record," interface 1502*b* may be displayed to the host with an additional option 1506*b* to select a qualifier associated with the selected category of participant selection criteria. For example, in interface 1502*b*, option 1506*b* includes a pull-down menu that prompts the host to select the maximum number of pre-recorded messages to solicit from participants before and/or during an interaction session. As shown in interfaces 1502*b* and 1502*c*, the host has specified the platform 100 is to collect no more than 25 pre-recorded messages.

Note that a qualifier such as "Max Qs" may refer to the maximum number of pre-recorded messages that can be received from an approved pool of participants. The approved pool of participants may be established through the aforementioned pre-filtering and/or pre-selection techniques. Alternatively, any number of participants may submit a pre-recorded message, and the "Max Qs" qualifier may refer to the number of those pre-recorded messages that are then forwarded to the host for review.

For example, consider that 1,000 participants are signed up for an interaction session. A host may, via interfaces 1502*a-c*, input a participant selection criterion based on pre-recorded messages specifying the maximum number of messages at 25. While 100 of the 1,000 participants may submit a pre-recorded message that includes a question, the platform can automatically select 25 of the 100 questions (e.g., based on a participant selection criterion) to forward to the host for approval. For example, the platform may automatically select 25 of the 100 participants that best match other participant selection criteria (e.g. pre-filtering, pre-selecting, geo-targeting, etc.). If the host only approves 15 of the 25 pre-recorded messages provided for review, the platform may automatically forward additional un-selected messages from the pool of 100 to the host user for approval until a total of 25 messages are approved or the pool of 100 messages is depleted. Upon being approved, a question may be placed in a pool of approved pre-recorded messages.

Although not shown in FIG. 15, a host may be prompted to enter other qualifiers to the participant selection criterion based on pre-recording. For example, a host user may specify that pre-recorded messages be at least a certain length (e.g., at least 3 seconds), no more than a certain length (e.g., at most 15 seconds), a certain quality (e.g., have a minimum resolution, framerate, bit rate, etc.), a certain format (e.g., MPEG-4), in a certain language (e.g., English or Spanish), etc.

Figure 16:
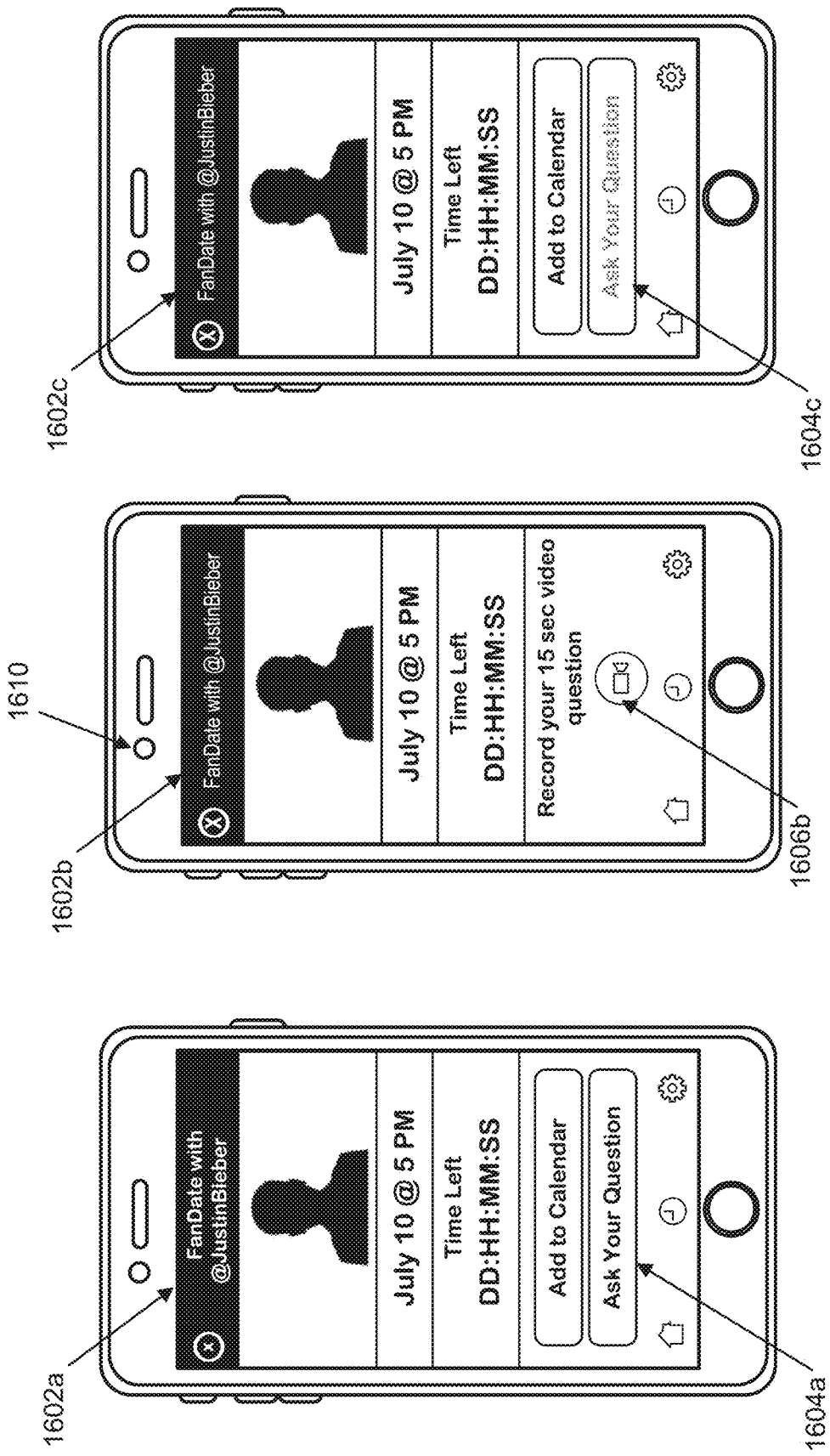
FIG. 16 shows a sequence of example interfaces for pre-recording a message to be streamed during an interaction session.

FIG. 16 shows a sequence of example interfaces 1602a-c that can be used by a participant to pre-record a message for inclusion in an interaction session to which a pre-record participant selection criterion has been applied. Interface 1602a depicts a screenshot of a start page for an interaction session (here with Justin Bieber). Participants may view the start page shown at interface 1602a on their computing device before the interaction session is initiated. For example, the start page may include information regarding the interaction session including a title, the host involved in the session, a category, sponsorship information, and a countdown to the start time of the session. The start page may further include advertisements, previews for other upcoming sessions, media clips from previous sessions, media clips related to the host, etc. The start page may also include an option 1604 to pre-record a message. For example, option 1604a is shown in interface 1602 as a button 1604a labeled "Ask Your Question." In response to selecting the button 1604a, a participant may be presented with interface 1602b through which she can record her message. For example, interface 1602b may include camera button 1606b that, when pressed, causes the participant's computing device to record video via an associated camera. The camera may be, for example, an integrated front-facing camera 1610 or an integrated rear-facing camera (not shown). The recorded video may then be transmitted by the participant's computing device to a video relay server (e.g., video relay server 114 of FIG. 1) before being forwarded to the host for pre-approval before the interactive session. In some embodiments, the pre-recorded video is restricted in length. For example, as shown in interface 1602b, a participant may be limited to recording a video question that is no more than 15 seconds in length. Note that the length of the pre-recorded media may be set based on a qualifier associated with the participant selection criterion that is entered via interfaces 1502a-c of FIG. 15.

As shown in interface 1602c, option 1604a to pre-record a message may be unavailable to the participant in some situations. Here, for example, an unavailable button 1604c is shown in which the label is grayed out. In other embodiments, option 1604a may be missing from interface 1602c entirely. The option to pre-record a message may be unavailable for a number of reasons. For example, the max number of pre-recorded messages (e.g., as set via interfaces 1502a-c of FIG. 15) may have already been reached by the time that the participant accesses interfaces 1602a-c. As another example, the participant may not qualify to submit a pre-recorded message because she does not qualify under another participant selection criterion (e.g. pre-filtering, pre-selecting, etc.). For example, a participant accessing interface 1602c may be on a blacklist, and thus ineligible to submit pre-recorded messages.

Before or during an interactive session, the platform 100 may present selected pre-recorded messages for the host to review, evaluate, and select for inclusion in the interaction session. For example, as shown in FIG. 7A, a host can press a "Q&A" button 704 and be presented with a list of selected and/or pre-approved message(s) from participant(s). In response to the host selecting one of these messages, the selected message may be streamed from a corresponding participant's computing device or a video relay server to the computing devices of other participant users in the interactive session.

Participant Selection Mechanism—Geo-Targeting

Interacting with certain communities of participants could be important for certain hosts to further their cause. Such a participant selection mechanism may be referred to as "geo-targeting." A classic example of the geo-targeting participant selection mechanism is in politics, wherein a politician may wish to address questions posed by members of a certain community (e.g., a town, city, or state), even though the politician is not physically present in the certain community. This type of interaction may be described as a virtual town hall meeting.

Figure 17:
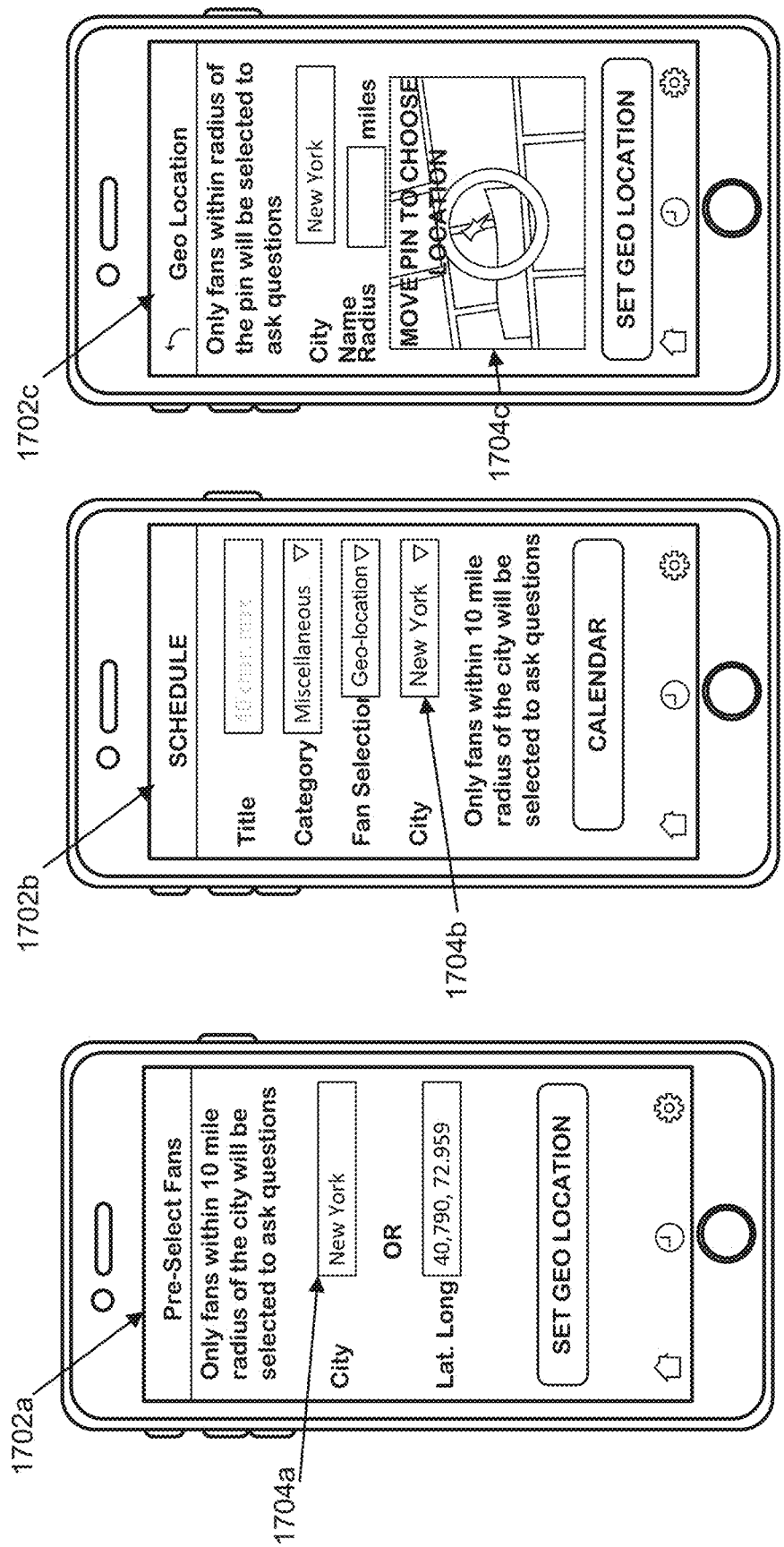
FIG. 17 shows a series of example interfaces for defining a participant selection criterion based on the geographical location of participants.

FIG. 17 shows a series of example interfaces 1702a-c that can be used to define a participant selection criterion based on the geographical location of participants. As shown in interfaces 1702a-c, a host may be presented with a number of options to set a geographical location as a participant selection criterion. For example, as shown in interface 1702a, a host may be presented with an option 1704a in the form of a text box in which to specify a location (e.g., by entering a location identifier such as a city name, zip code, or set of coordinates). Similarly, as shown in interface 1702b, a host may be presented with an option 1704b in the form of a pull-down menu to select one or more of a pre-defined set of locations (e.g., New York). As anther example, as shown in interface 1702c, a host may be presented with an interactive map to select or "pin" a particular geographical location to set the participant selection criterion. In each of these options, the participant selection criterion may define the participants located within a threshold distance of the selected location as eligible to stream media from their computing devices. The threshold distance may be automatically set by the platform 100. For example, while interfaces 1702a and 1702b allow a host to select a location, the platform 100 may set the threshold distance to be 10 miles from the selected location. Alternatively, the host may be presented with an option to manually identify a radius to be measured from the selected location on which to base the participant selection criterion. Interface 1702c, for example, includes an editable text box within which the host can specify the desired radius.

Before and/or during an interaction session, participant selection criterion based on geo-targeting may be applied by the platform 100. More specifically, upon receiving location data from computing devices used to access the interaction session by participants, the platform 100 can determine which computing devices (and thus which participants) satisfy the participant selection criterion. For example, many modern mobile devices include means for detecting the location of the mobile device (e.g., via Global Positioning System (GPS) receivers, accelerometers, computer network localization modules, etc.). Upon signing into a platform account, a participant's computing device may transmit a geographical location to the platform 100. The geographical location may be used by the platform 100 to apply a geo-targeting participant selection criterion by comparing the location of the participant's computing device with an area/location defined by the participant selection criterion. If the location of the participant's computing device falls within a threshold distance of the area/location identified by the host, then the participant may be eligible to stream media to the host and other participants in the interaction session.

Participant Selection Mechanism—Blacklisting

A host might want to completely eliminate the possibility of certain individuals being selected to stream media (e.g., ask questions in a live video feed). Blacklisting such individuals at the platform level may ensure that these individuals are never selected during any of the host's interaction sessions. In some embodiments, individuals are blacklisted in a process that is similar to the process of defining a pre-selection participant selection criterion as described with respect to FIG. 14. In other words, a host may enter, via an interface similar to interface 1402b of FIG. 14, one or more unique identifiers associated with the individuals with whom the host does not wish to interact. Examples of unique identifiers include platform account identifiers, social media account identifiers, correspondence identifiers (e.g., telephone numbers and email addresses), etc. These individuals may have caused trouble during a past session, have a particularly low peer rating (e.g., a small number of "likes"), etc. Alternatively, these individuals may have been blacklisted by other hosts during previous sessions. For example, when a host accesses an interface similar to interface 1402b of FIG. 14 to define a blacklist, the host may be prompted to select from those individuals that are currently blacklisted at a platform level. Similar to pre-selection, a host may blacklist certain individuals by entering a unique identifier that corresponds to that individual.

To provide a greater degree of control over an interaction session, a host may have the option to terminate a participant's stream of media (e.g., a live or pre-recorded video feed) at any time. For example, an interface viewable by the host may include a button that, upon selection, causes the participant's media stream to be terminated. In some embodiments, the act of selecting the button to terminate the media stream initiated by the participant may automatically add that participant to a blacklist. As noted above, the host can then select a "Q&A" button to cause the platform 100 to automatically select the next participant from whom to receive a media stream (e.g. another live or pre-recorded video feed).

Participant Notoriety

Figure 18:
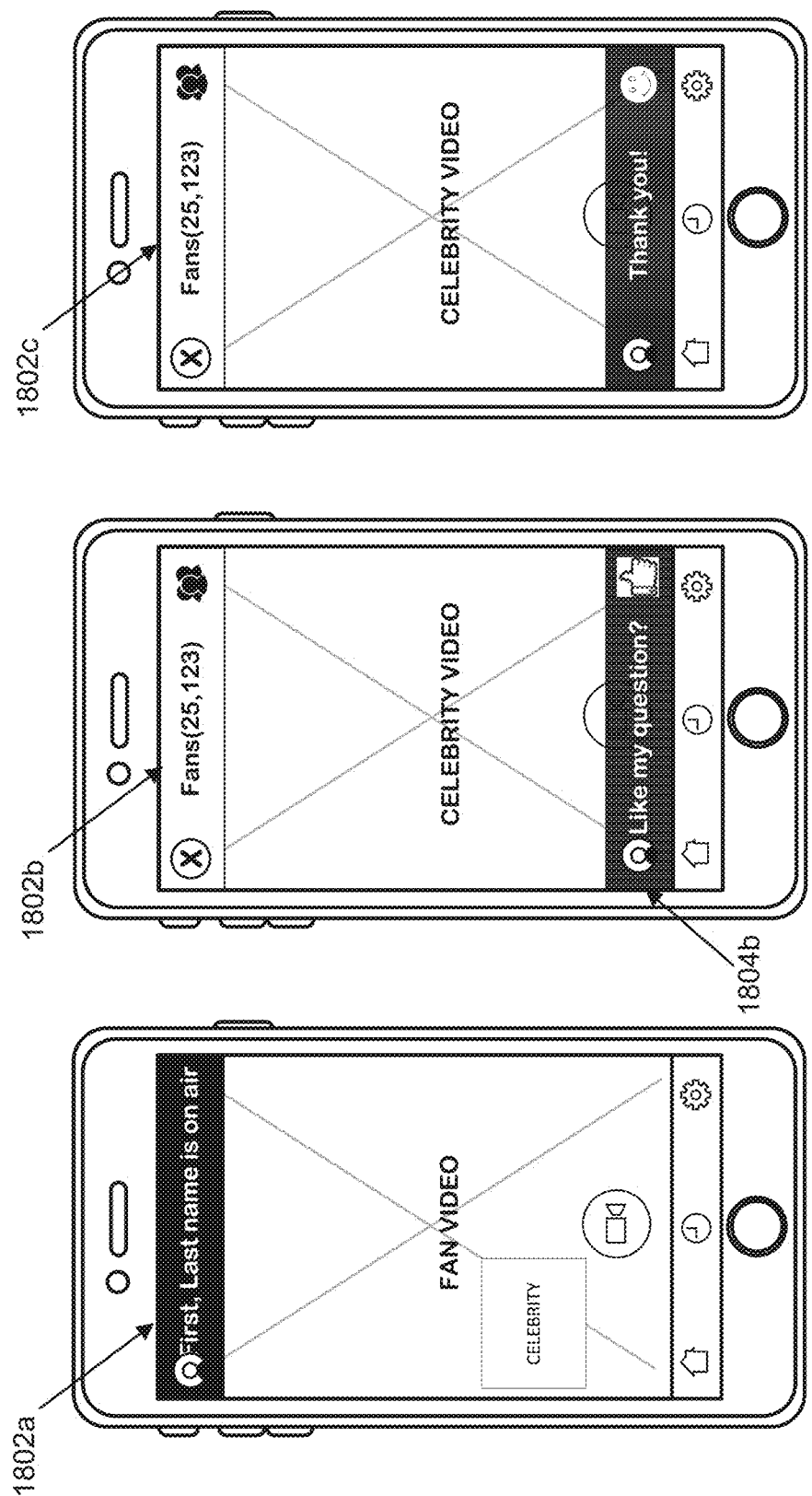
FIG. 18 shows a sequence of example interfaces receiving participant ratings.

As discussed previously, participants can build notoriety through gathering "likes" from other participants and hosts during interaction sessions. FIG. 18 shows a sequence of example interfaces 1802a-c that can be used to gather participant ratings. These participant ratings may be in the form of "likes" from other participants in an interaction session. For example, interfaces 1802a-c may be from the perspective of a participant other than the host or the selected participant being reviewed. Generally, the selected participant is responsible for initiating a media stream that is broadcast to the host and other participants, each of whom may rate the selected participant. The media stream could include, for example, a live video feed in which the selected participant poses a question to the host. As shown FIG. 18, a media stream received from the selected participant may be displayed to another participant via interface 1802a for a predetermined amount of time (e.g., 10 seconds, 15 seconds, or 30 seconds) or until a host terminates the media stream. In response to the media stream ending, the participant viewing interface 1802b may be presented with an option 1804b to rate the question posed to the host and/or the selected participant who posed the question. For example, option 1804b shown in interface 1802b askes the participant if she liked the question asked in the media stream. In response to receiving an input (e.g., indicative of liking the question or declining to like the question), the participant may be presented with interface 1802c.

Figure 19:
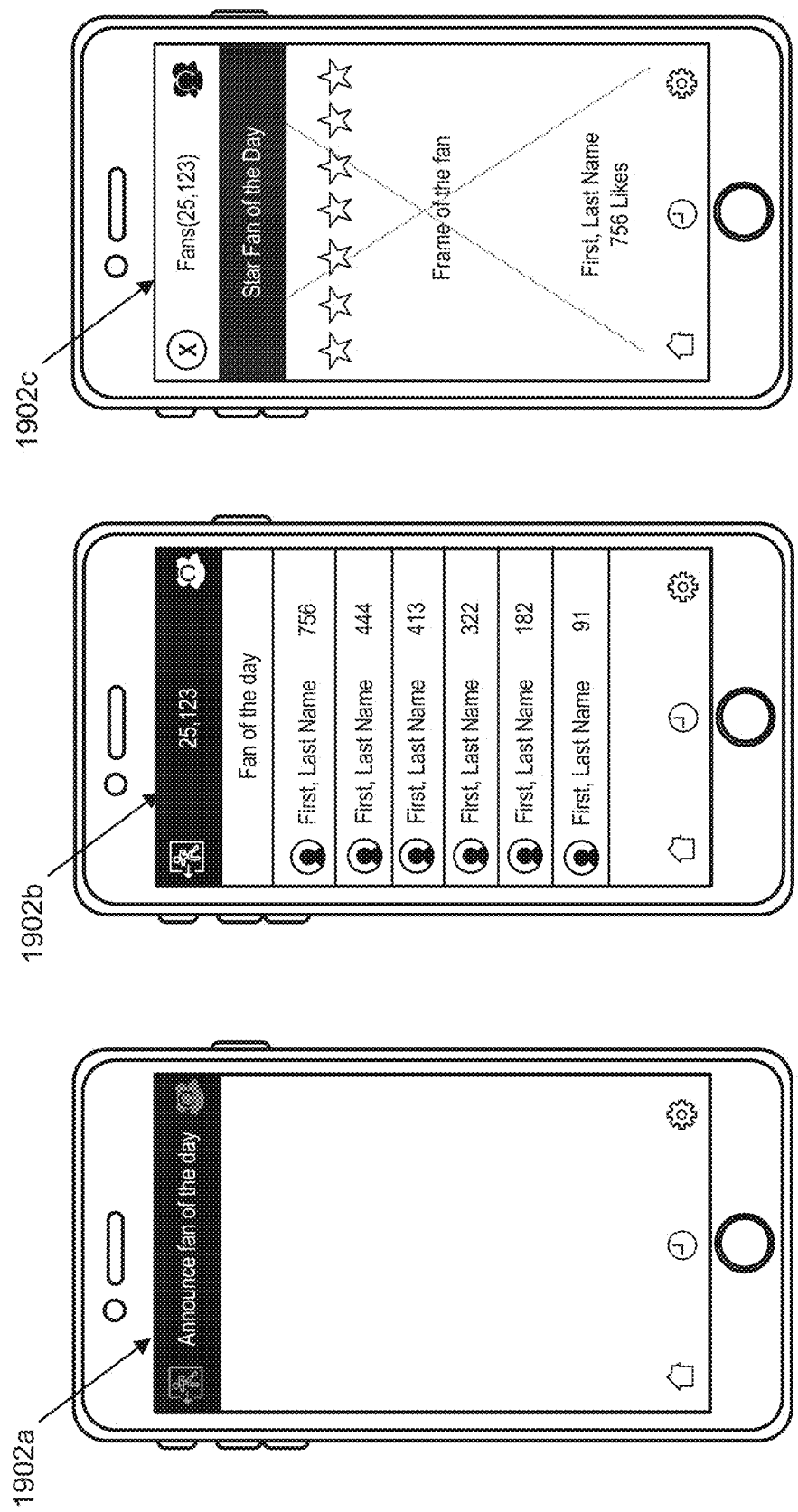
FIG. 19 shows a sequence of example interfaces for announcing top rated participants before, during, or following an interaction session.

FIG. 19 shows a sequence of example interfaces 1902a-c that can be used to announce the top rated participants during or following an interaction session. For example, interface 1902a may provide an option to a host to announce a participant leaderboard to the participants in the interaction session. The option shown in interface 1902a can be presented to the host during the interaction session. Additionally or alternatively, the option shown in interface 1902a can be presented to the host at the conclusion of the interaction session. In response to an input by the host electing to announce a particular participant as the "fan of the day," interface 1902b may present a leaderboard that includes a ranked list of the participants involved in the interaction session. The ranked list may be ordered based on the number of likes received from other participants, a rating provided by the host, etc. The leaderboard shown in interface 1902b can be presented to all participants in the interaction session or only to the host. In some embodiments, the host is able to select one or more of the participants included in the leaderboard shown in interface 1902b as the "fan of the day." In response to the selection, interface 1902c may be presented to the participants to announce the "fan of the day." The announcement in interface 1902c can include information on the selected participant(s) (e.g., a name, photo, number of likes, etc.). Moreover, interface 1902c may present some type of celebratory animation or video.

Pre-Recorded Social Media Sessions

Figure 26:
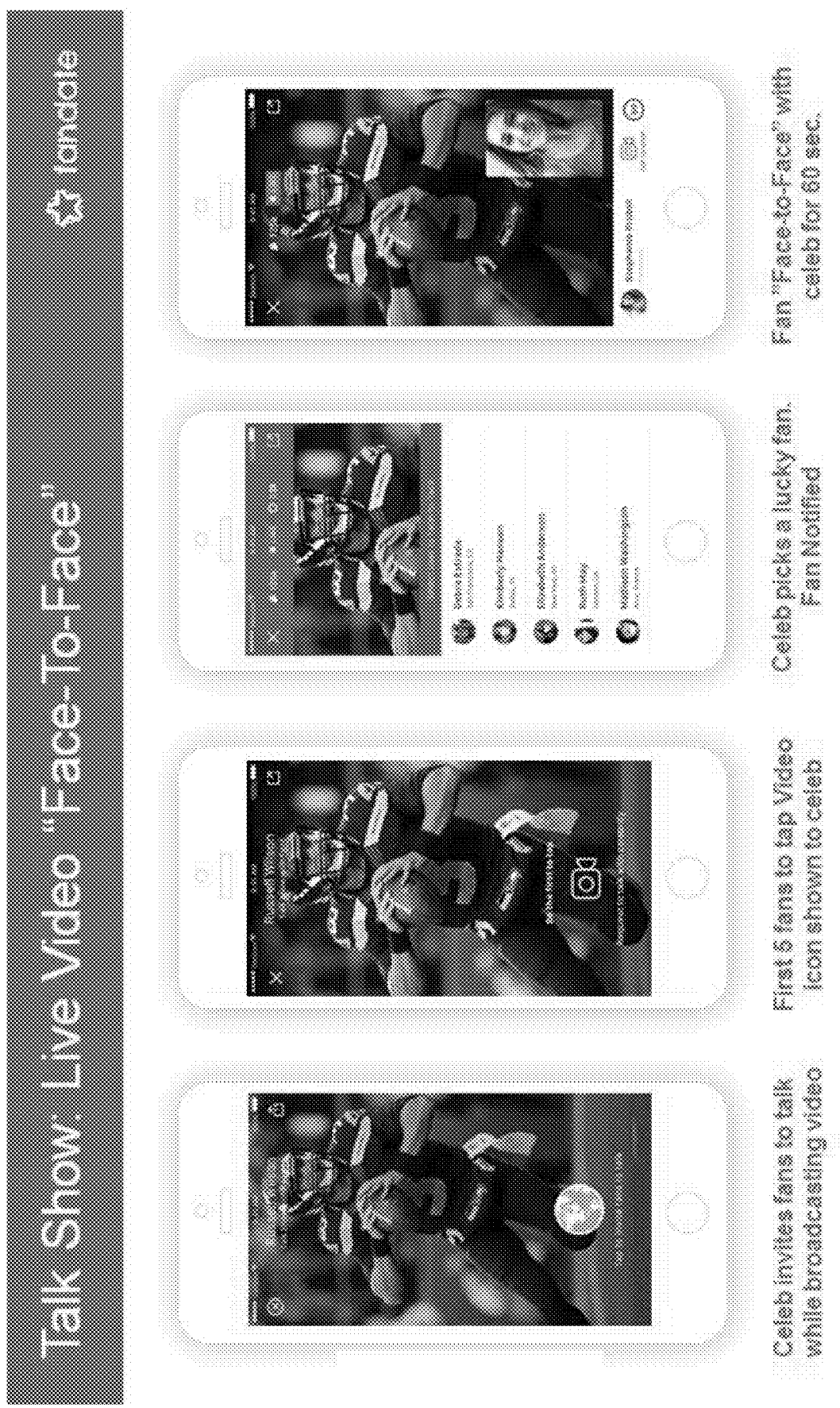
FIG. 26 shows features of a platform for streaming interaction session that enable live face-to-face sessions.

FIG. 20 shows some exemplary features of an interaction management platform that is able to monetize interaction sessions between hosts and participants. The platform may be platform 100 of FIG. 1. In some embodiments the interaction sessions include at least one live feed, while in other embodiments the interactive sessions include pre-recorded media. In an embodiment where the interactive session includes pre-recorded media, the technology enables a host (also referred to as a "communicator") to interact with participants (also referred to as "audience members") during what appears to be a live streaming session. The host may be a celebrity, in which case the participants are likely fans of the celebrity. In some embodiments, the platform enables interactive, face-to-face sessions via live video feeds. FIG. 26 shows example interfaces for streaming interaction sessions that enable live face-to-face interactions to occur between hosts and participants. Because these interactions could be facilitated by the FanDate™ platform or the Vydeo™ platform, the interactive session may be referred to a FanDate™ session or a Vydeo™ session.

Figure 21:
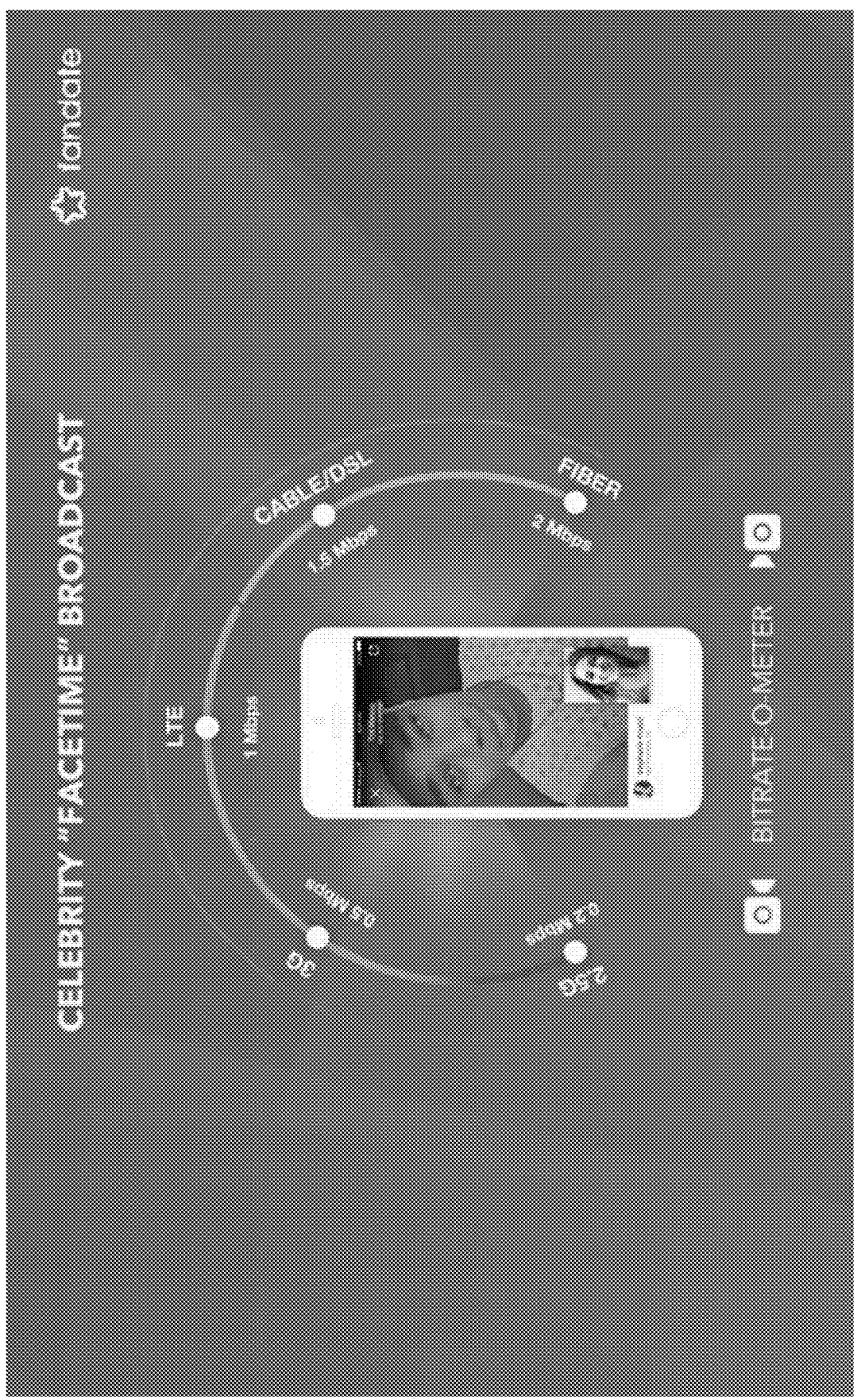
FIG. 21 shows ranges of bandwidths supported by a platform for streaming interaction sessions.

FIG. 21 shows ranges of bandwidths that may be supported by the platform configured to facilitate the streaming of interaction sessions. As noted above, these interactive sessions can include live media that is streamed in real time or pre-recorded media that is streamed at a scheduled time. Thus, at a schedule time, the platform may stream pre-recorded media followed by an advertisement. In such instances, the participants may be under the impression that they are watching a live video feed including the host. The platform can dynamically optimize the media being streamed to each participant, for example, by varying the streaming bitrate based on the bandwidth available to the computing device corresponding to each participant.

A computer program installed on the computing device can monitor the available bandwidth, and then send the bandwidth data to the platform, which determines the appropriate streaming bitrate based on the available bandwidth. In some embodiments, the media feed is dynamically adjusted (e.g., by varying the resolution) to achieve the desired bitrate. In other embodiments, the media is pre-converted to various resolutions with various bitrate requirements, and the platform selects from among the various resolutions to obtain media that can be effectively sent using the available bandwidth. The platform can dynamically vary the bitrate (e.g., by switching between the various resolutions) as the available bandwidth changes. Additionally or alternatively, the platform can dynamically optimize/customize the bitrate sent to each participant based on the technical capabilities of the communication channel initiated by each participant's computing device, such as the available bandwidth. In some embodiments, the platform is able to dynamically transcode media to support bandwidths from 100 kilobits per second to 2 megabits per second.

Figure 22:
FIG. 22 shows session management features of a platform for streaming interaction sessions.

FIG. 22 shows session management features of the platform configured to facilitate the streaming of interaction sessions hosted by a host. As noted above, the host may be a celebrity or an individual that acts on the celebrity's behalf, such as an agent, manager, friend, family member, etc. Thus, the host may be an individual who manages the interaction session on behalf of a celebrity with whom participants wish to interact. For example, an agent could log into the platform to announce to fans that the celebrity will have an interaction session at an upcoming point in time. The agent can then schedule the interaction session by specifying a date and time.

To more easily publicize information about interaction sessions, the host may sign into the platform using a platform account and/or a social media account. In some embodiments, the platform account is synced with one or more social media accounts belonging to the host. Thus, the host may be able to easily post information about interaction sessions to Facebook, Twitter, etc., directly from the interfaces generated by the platform.

Figure 24:
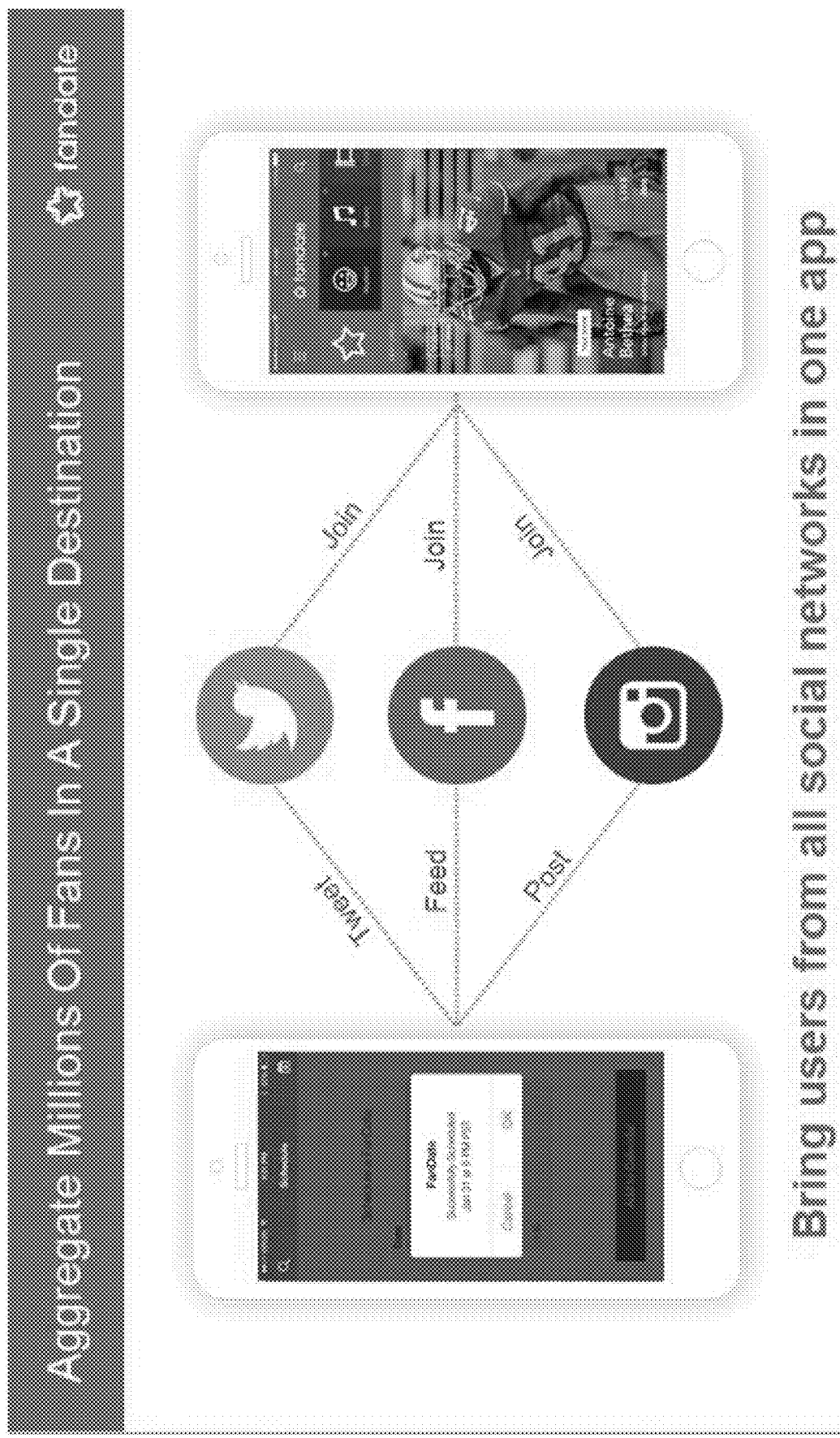
FIG. 24 shows features of a platform for streaming interaction sessions that enable aggregation of participants.

FIG. 24 illustrates how the platform can enable aggregation of participants via various social media services. More specifically, the platform can post an announcement regarding an interaction session to one or more social media services, such as Facebook, Instagram, Twitter, etc. For example, if the host responsible for hosting an interaction session has synced her social media accounts with a platform account maintained by the platform, then the platform can readily cause the host's social media accounts to post information related to scheduled interaction sessions. In some embodiments, the platform simultaneously posts information related to scheduled interaction sessions to all social media accounts belonging to the host. Such action ensures that potential participants can be attracted from various social media services.

Posts may announce the date/time of upcoming interactive sessions, prompt individuals to observe past interactive sessions, ask individuals to submit questions for an upcoming interaction session, etc. Moreover, the post may include a link where an individual can register for the interactive session, submit questions, etc. Registration may prompt the platform to characterize the individual as a participant likely to attend the interaction session.

Figure 23:
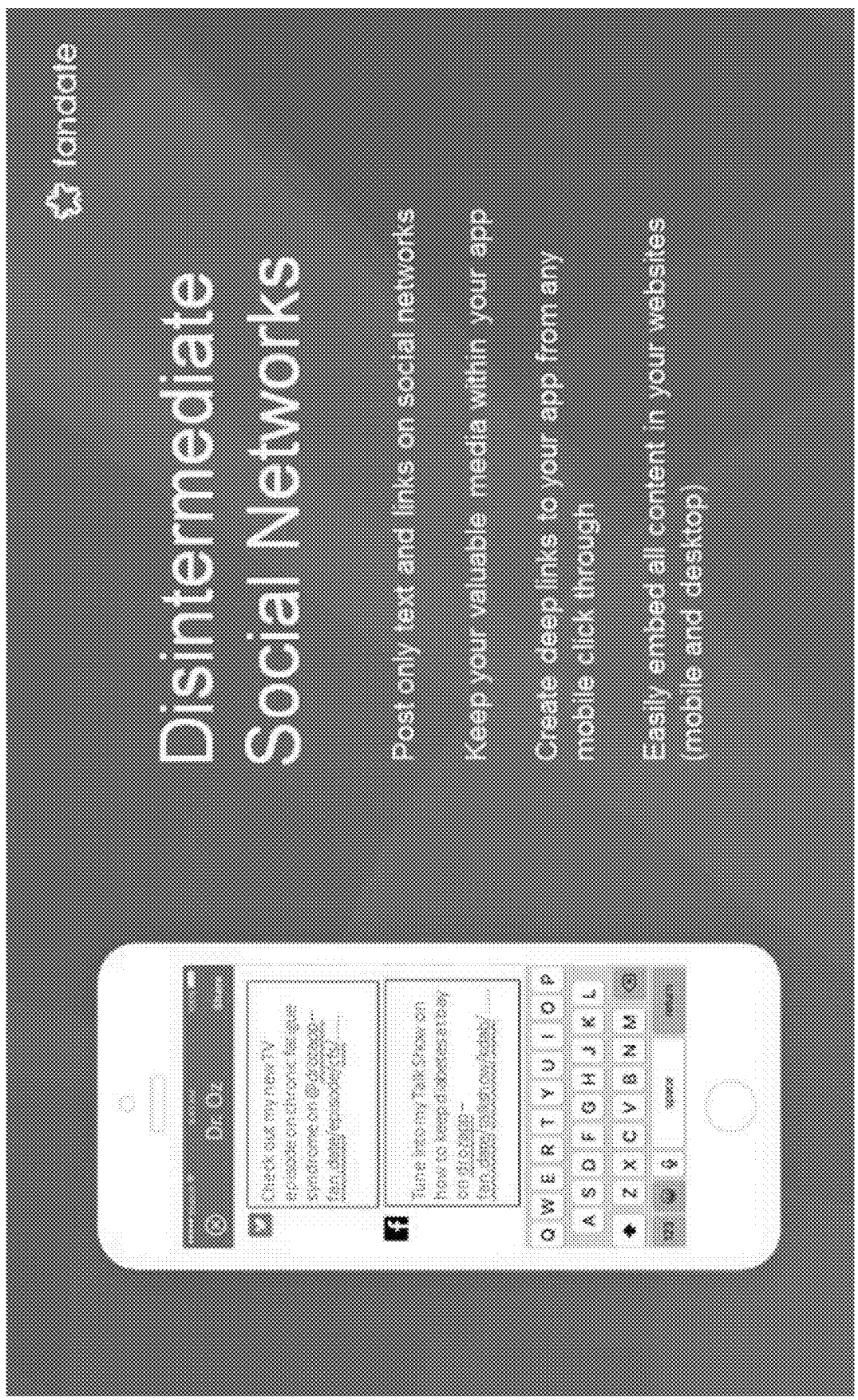
FIG. 23 shows disintermediate social network features of a platform for streaming interaction sessions.

FIG. 23 shows several disintermediate social network features of the platform. When an individual clicks a link posted on a social media service, the individual is taken outside of the social media service where the link was posted. Instead, the individual is guided to interface(s) that are generated by the platform. Such action eliminates or disintermediates the social media service from the interaction session facilitated by the platform. The individual may be asked whether she would like to install a computer program or navigate to a website to register for the interactive session. If the individual elects to install the computer program on a computing device (e.g., a mobile phone, tablet, or personal computer), then the computer program is installed and the individual is prompted to create an account for the platform (also referred to as a "platform account"). In some embodiments, the individual may also be prompted to associate other information (e.g., phone number, email address, payment information) with the platform account. If the individual elects to access the website, the website may appear in a web browser. Thereafter, the individual can create a platform account as described above. The individual can then log in to her platform account, where she is able to register for the interactive session described on the social media service. The individual may also be permitted to input additional information, such as payment information, contact information (e.g., phone number and email address), etc. The platform may provide a calendar event for any calendar tools that reside on the individual's computing device to remind the individual of the event. The individual could also review questions submitted by other individuals for the interactive session, as well as vote for those questions that she likes. The questions that receive the most votes may rise to the top of a list of questions to be posed during the interactive session.

Figure 25:
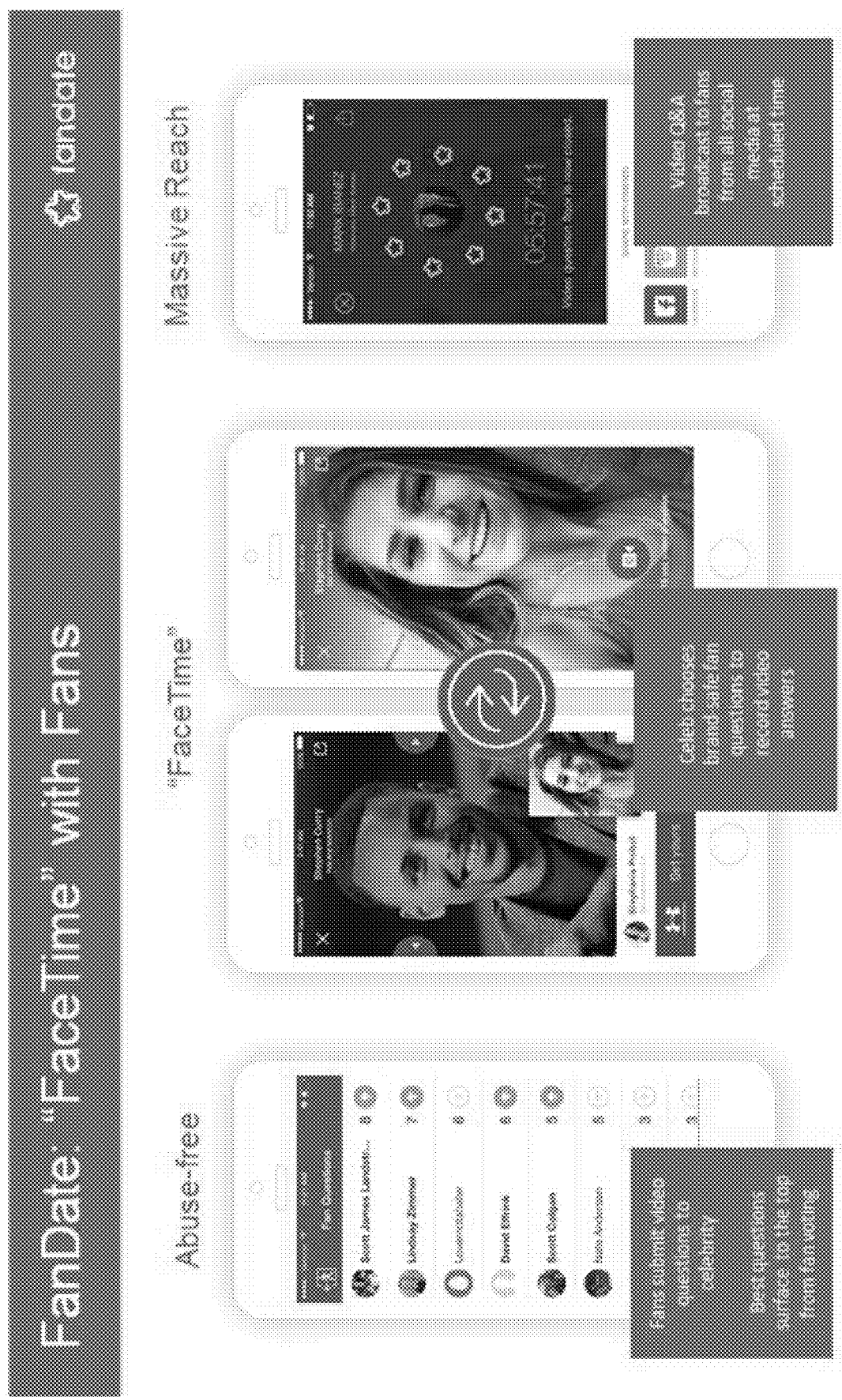
FIG. 25 shows features of a platform for streaming interaction sessions that enable streaming of pre-recorded sessions.

FIG. 25 illustrates how a platform can facilitate interaction sessions in which participants pose questions to a host. In some embodiments the participants pose questions in real time via a live media feed, while in other embodiments the participants record questions that are subsequently posed to the host. Thus, each participant may be able to record and submit a question for the interaction session. Because a participant who submits a question wants her question to be viewed by the host, she may contact her friends to encourage them to vote for the question. Such action will not only raise the participant's question in a list of questions that is ranked by popularity, but will also generate knowledge of (and excitement for) the upcoming interaction session amongst the participant's group of friends. The host, meanwhile, can log into the platform and review questions submitted by participants. Generally, these questions are sorted into a list based on the number of votes received from other participants. The sorted list enables the host to readily select several questions that participants are interested in posing.

The host (or some other individual, such as an agent) can also pre-screen these questions to filter out those questions that are likely to damage the host's reputation, lead to awkward interactions, etc. Following the pre-screening process, the host can select one or more questions to answer. The host can, at her convenience, log into the platform and navigate to the sorted list of questions. If the host is a celebrity, then these questions may be pre-screened the celebrity's agent or another individual. In some instances, the host may submit a request to initiate the interaction session, but the platform reports that network connectivity is inadequate. Because the interactive session need not include live feeds (i.e., need not be live streamed in real time), the host can simply stop the interaction session and move to another location with better network connectivity. The host can then once again initiate the interaction session, where she begins to answer the pre-recorded questions. The interaction session can also be recorded by the platform and stored for future broadcast. The host or another individual may log into the platform following the interaction session, review the recorded session, determine whether the session is safe for release, make any necessary edits, and schedule the session for future broadcast. In some embodiments the entirety of the recorded session is scheduled for future broadcast, while in other embodiments only a portion of the recorded interactive session is scheduled for future broadcast.

Figure 30:
FIG. 30 shows features of a platform for streaming interaction sessions that enable the addition of advertising to an interaction session.

FIG. 30 shows features of the platform that enable the addition of advertisements to an interaction session. A host or some other individual (e.g., an administrator responsible for managing the platform) can arrange for an advertisement to be streamed in association with the interaction session. Advertisements may be shown before, during, or after an interaction session, regardless of whether the session includes live streamed media broadcast in real time or pre-recorded media broadcast following review, post-production, etc. At certain points in time prior to the interaction session, the platform may notify participants who have registered for the interaction session that the interaction session will be starting. For example, the platform may send text messages, emails, push notifications, etc.

Figure 28:
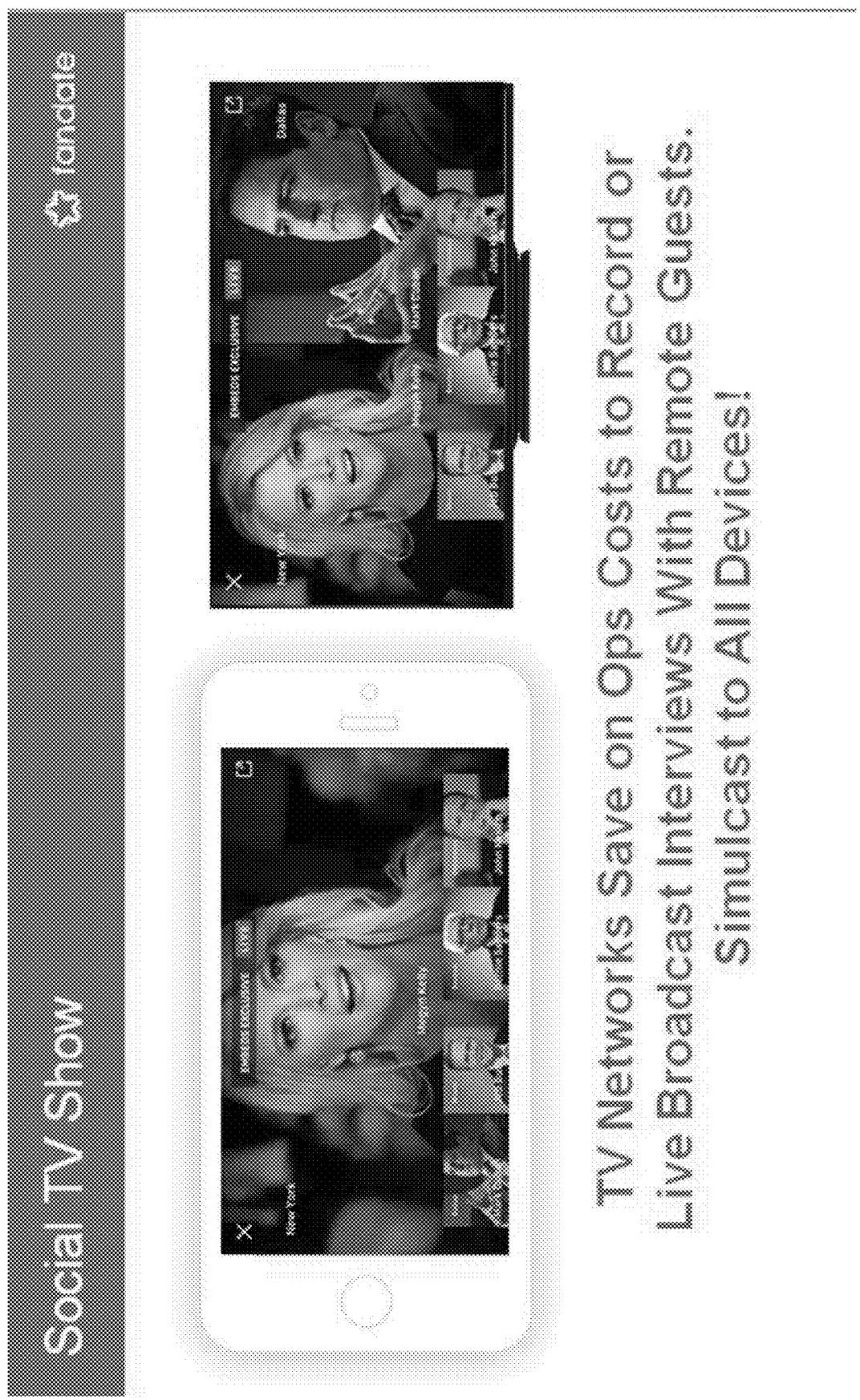
FIG. 28 shows features of a platform for streaming interaction sessions that enable social television shows.

FIG. 28 shows features of a platform for broadcasting an interaction session involving a host and one or more participants. For example, the platform may enable the interactive session to be broadcast as a television show. In some embodiments, media content transmitted by the platform, such as audio and visual (AV) digital data for the interaction session, is sent to an entertainment platform (also referred to as a "television broadcaster"). Examples of entertainment platforms include ABC (American Broadcasting Company), CNN, Netflix, VH1, MTV, Nick Jr., etc. Upon receiving the media content, the entertainment platform can broadcast the interaction session via their own platform. The media content can be streamed to the entertainment platform by the platform in various ways. For example, if the media includes AV digital data, then the platform may encode the media content as MPEG-4. The encoded media content can then be transmitted to the entertainment platform, and the entertainment platform can broadcast the media to viewers. In some embodiments the entertainment platform streams the media content as it is received from the platform, while in other embodiments the entertainment platform stores the media content for future broadcast. The entertainment platform can cause the media content to be broadcast via network television, cable television, the Internet, or any other available suitable medium.

Figure 27:
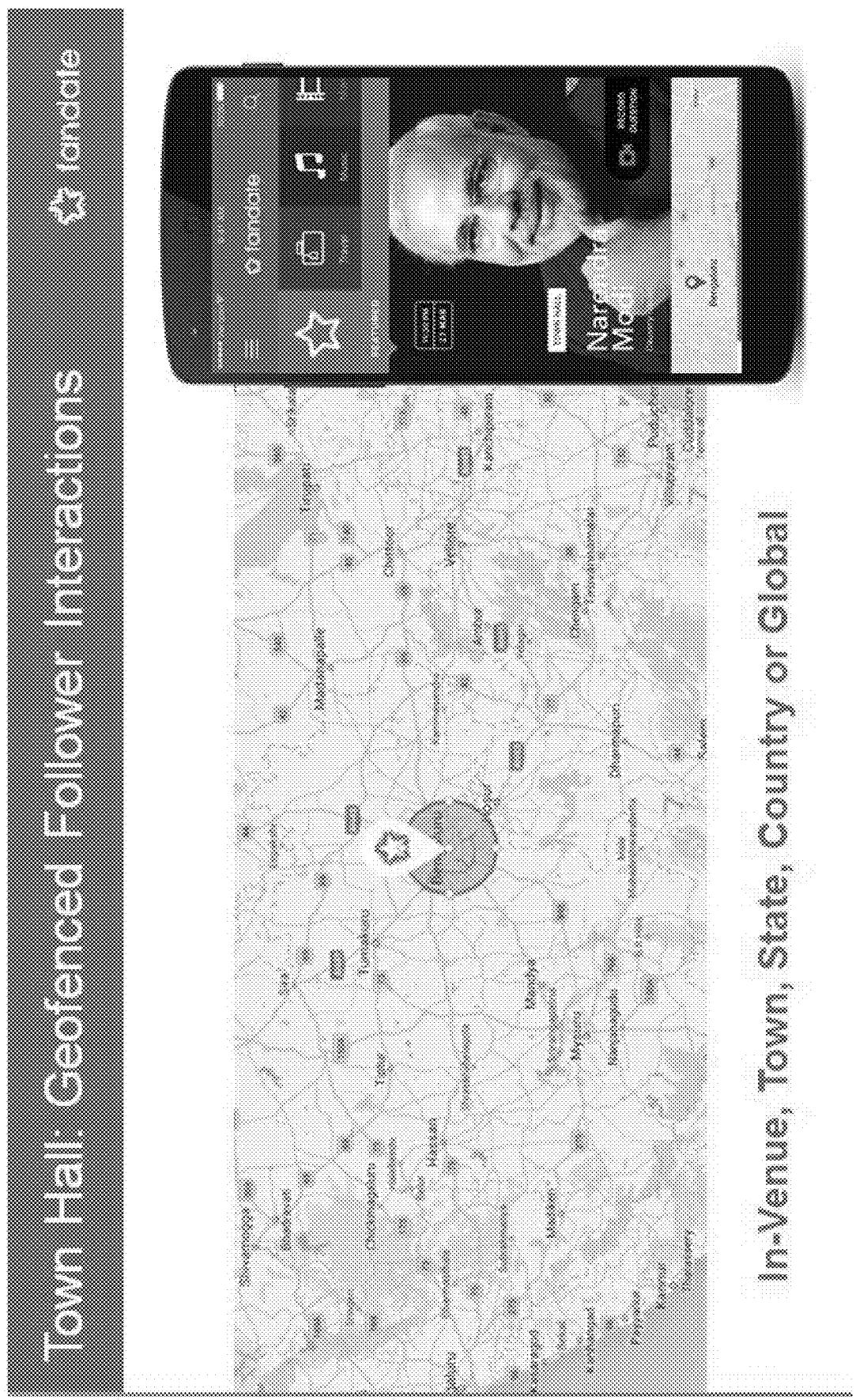
FIG. 27 shows features of a platform for streaming interaction sessions that enable geofence-restricted interactions.

FIG. 27 shows features of the platform that enable geofenced interactions. In some embodiments, the platform restricts viewing to those participants within a geofence. A "geofence" is a virtual geographic boundary that is defined/enforced by a location-sensing technology that enables the platform to trigger a response when a computing device enters or leaves the bounded area. Examples of location-sensing technologies include Global Positioning System (GPS) technology, Radio Frequency Identification (RFID) technology, etc. Participants that are determined to be within the geofence (e.g., by the platform or the computer program installed on the corresponding computing devices) are permitted to join the interaction session, while participants that are not within the geofence are not permitted to join the interaction session.

Figure 29:
FIG. 29 shows features of a platform for streaming interaction sessions that enable integrated sponsorship and ecommerce opportunities.

FIG. 29 shows features of the platform that enable integrated sponsorship and online stores (also referred to as "electronic commerce stores" or "e-commerce stores"). At the end of an interaction session, the platform may present one or more advertisements to participants involved in the interaction session. Additionally or alternatively, the platform may present participants an opportunity to visit an e-commerce store, where the participants can purchase products offered for sale by the host involved in the interaction session. Thus, the participants may leave the interaction session quite happy about their experience, as well as their purchase(s).

The host may also be quite happy because she has been able to largely avoid participant interactions involving behavioral incidents. For example, in some embodiments, when the host does interact with a participant exhibiting a behavioral issue, the host can quickly disconnect the participant and continue the interaction session. In other embodiments, rather than appear live at the scheduled time, the host can simply record an interaction session that appears to be live to participants. In such embodiments, the host can also record interactive sessions at her convenience without the risk of embarrassing herself during a live broadcast. The host user is also happy because she is able to disintermediate the interaction session from any social media services, thereby enabling the host to directly profit from the participant interactions rather than the social media services. If the host is a celebrity, then the host can also generate additional fans via the interaction sessions and additional revenue based on advertisements, product sales, etc. If the host is a team leader, then the host is also happy because she is able to increase productivity, cohesiveness, etc., by connecting with members of the team in a more seamless manner.

Figure 31A:
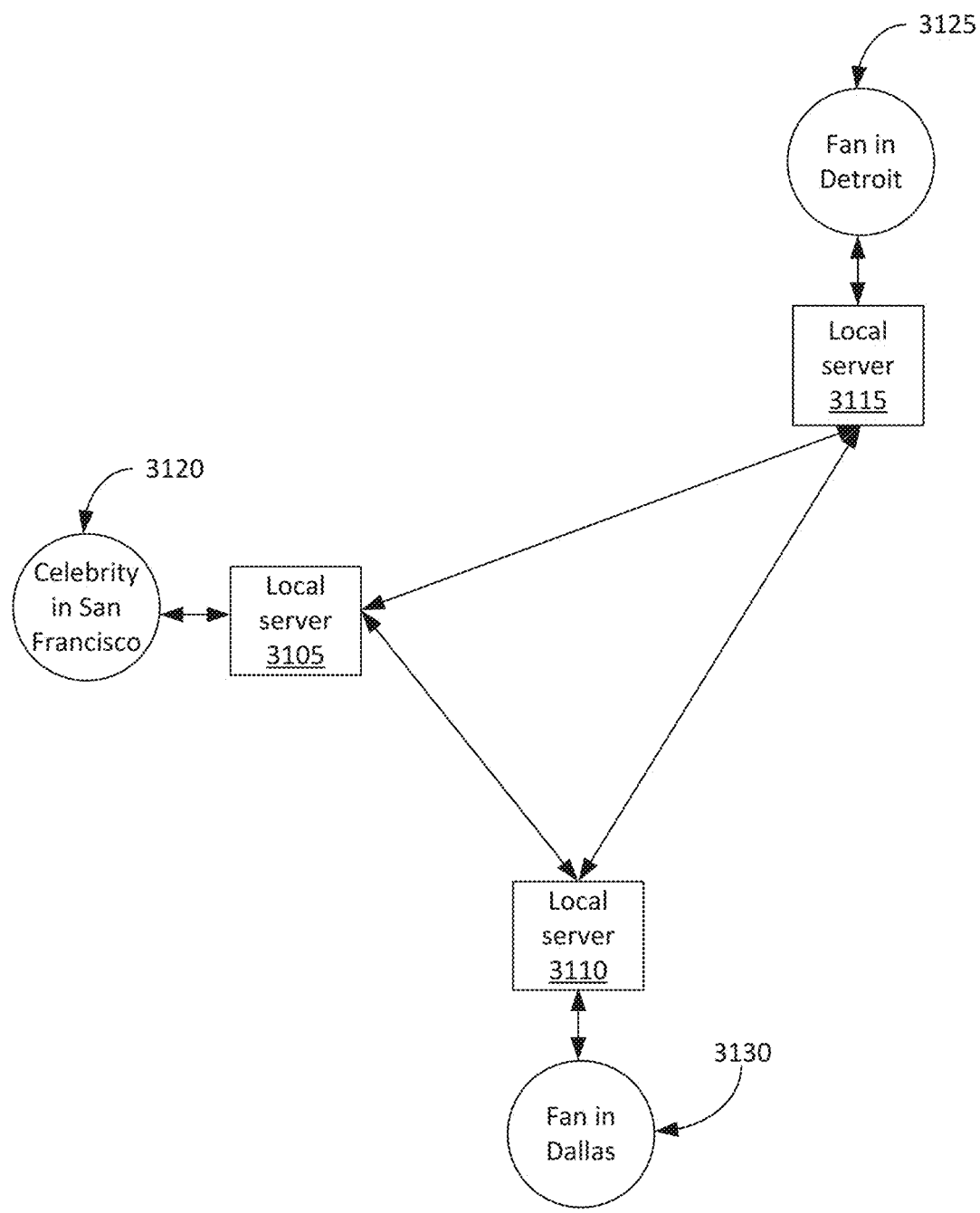
FIG. 31A is a generalized block diagram illustrating the architecture of a platform that facilitates distribution of an interaction session to participants.
Figure 31B:
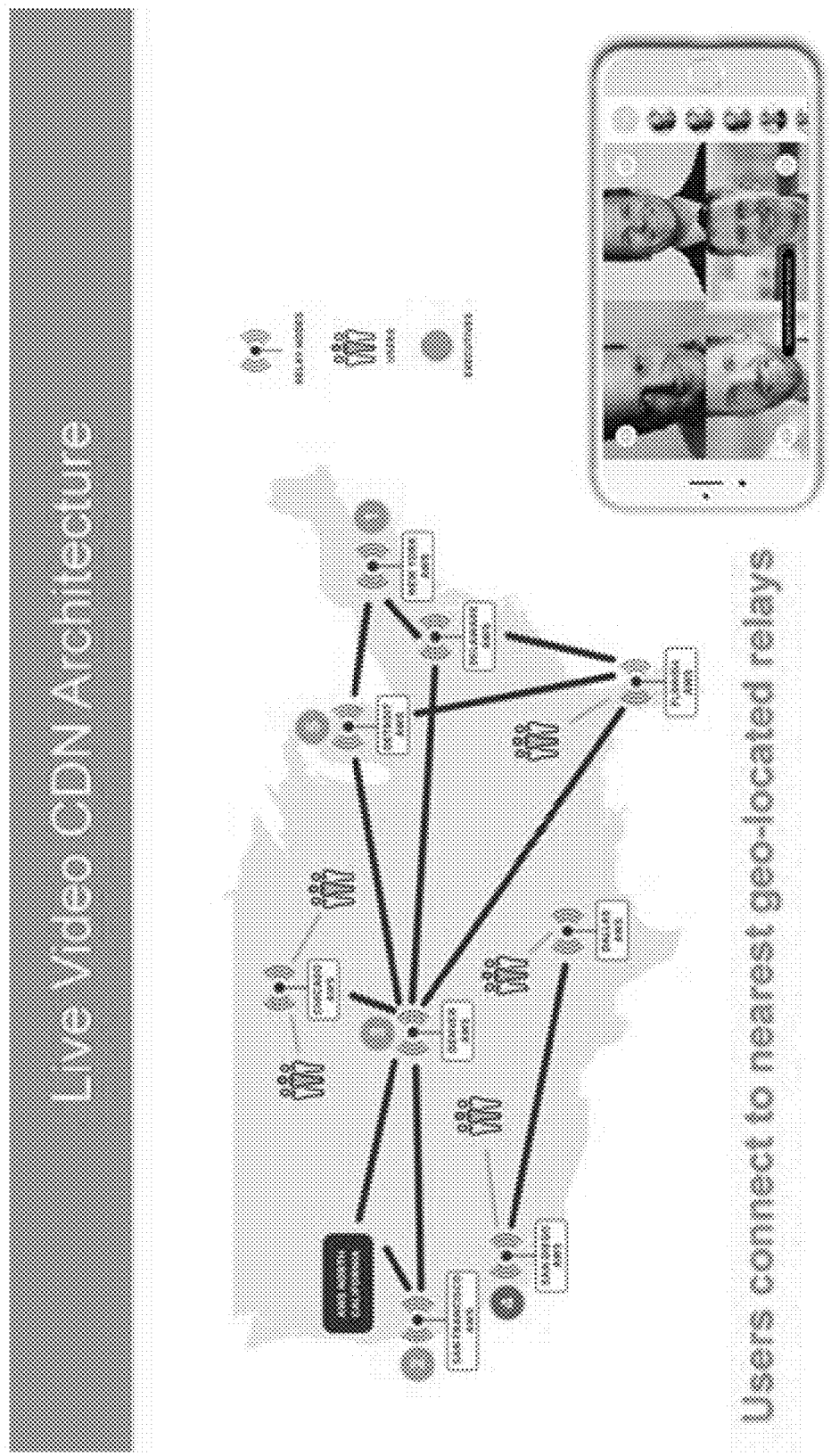
FIG. 31B is a generalized block diagram illustrating another example architecture of a platform that facilitates the distribution of an interaction session to participants.
Figure 31C:
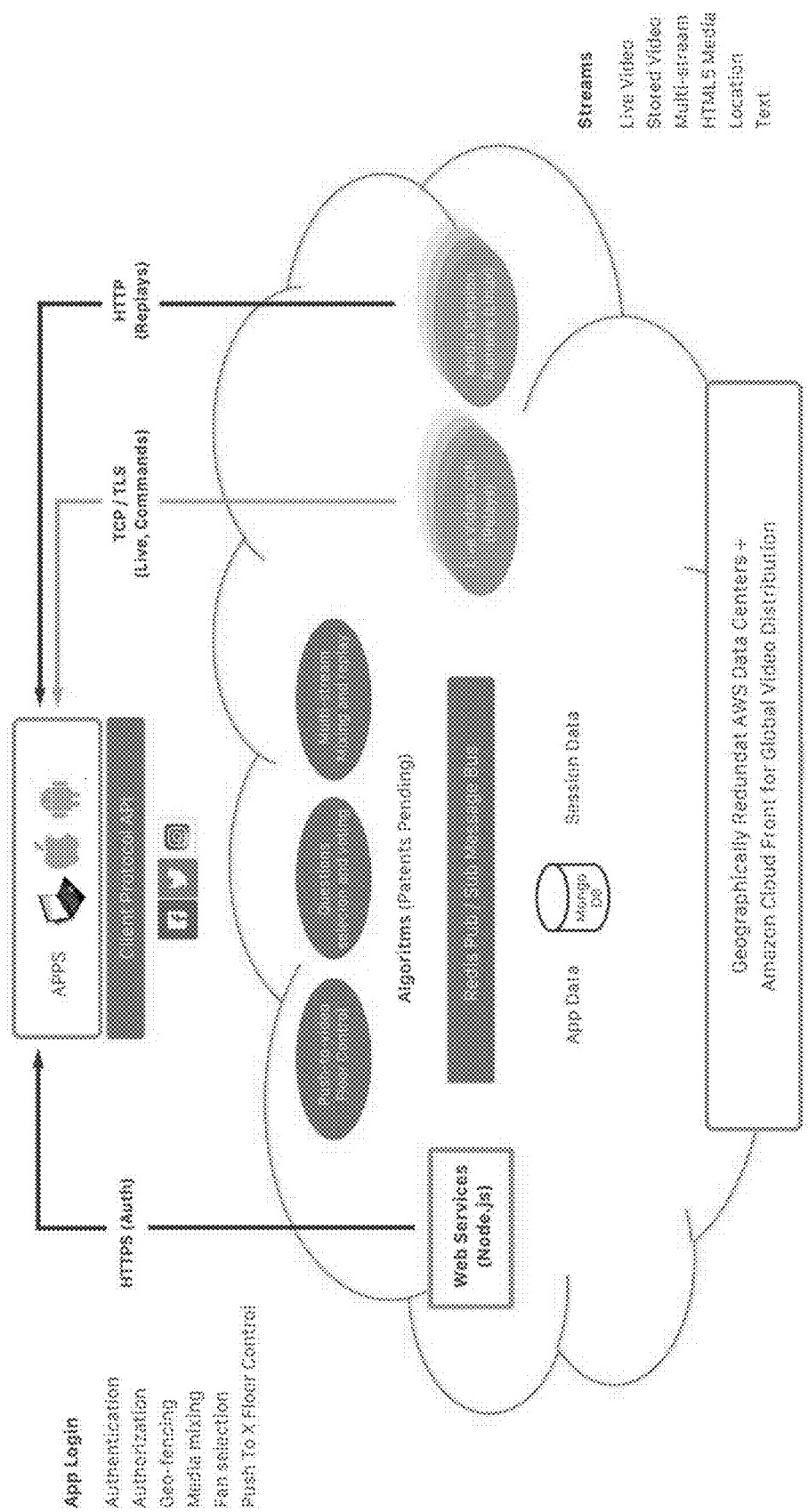
FIG. 31C is a generalized flow diagram that illustrates how these platform may be highly scalable.

FIG. 31A is a generalized block diagram illustrating an example architecture of a platform that facilitates the distribution of an interaction session to participants. FIG. 31B is a generalized block diagram illustrating another example architecture of a platform that facilitates the distribution of an interaction session to participants. FIG. 31C, meanwhile, is a generalized flow diagram that illustrates how these platform may be highly scalable. In embodiments where the entire interactive session is pre-recorded, the media file(s) can be pre-distributed to local servers prior to the interaction session.

For example, a host 3120 (here, a celebrity) located in San Francisco may pre-record her interactive session, which is stored at local computer server 3105. Local computer server 3105 is the computer server located nearest to the host 3120. The platform may determine the location of the computer device operated by the host 3120, and then identify the nearest computer server based on the determined location. Such action may be facilitated by a computer program residing on the computing device operated by the host 3120 that examines the location as estimated by a location-sensing technology. Examples of location-sensing technologies include GPS technology, RFID technology, etc. Upon determining that the local computer server 3105 is the computer server located closest to the host 3120, the platform can establish a communication channel between the local computer server 3105 and the computing device of the host 3120. As the host 3120 records her interactive session, any media captured by the computing device can be streamed to the local computer server 3105, where the media can be stored for future broadcast. Any or all of the computer servers 3105-3115 can be cloud servers, such as those offered by Amazon Web Services™ (AWS).

In some embodiments, the media stored on the local computer server 3105 may undergo post-processing. For example, if the host 3120 is a celebrity, then the some other individual (e.g., the celebrity's agent, manager, etc.) may review the media, edit the media (e.g., by removing certain segments, adding effects, etc.), and direct the platform to use the media for a scheduled interaction session. The platform can then pre-populate the media at computer servers distributed throughout a geographical area, such as the United States. Here, for example, the platform caches the media file(s) stored in local computer server 3105 at local computer server 3115 and local computer server 3110 in preparation for the interaction session. As each participant logs into the platform for the interaction session, the platform may determine the location of the computing device used by each participant, and then identify the computer server located closest to each computing device. As noted above, such action may be facilitated by a computer program residing on each computing device that examines the location as estimated by the computing device.

Here, for example, the platform has determined that participant 3130 is located near local computer server 3110, while participant 3125 is located near local computer server 3115. Rather than stream the media file(s) for the interaction session from a single location, each local computer server can stream the media file(s) to all participants that are determined to be located in close proximity. Said another way, each participant may receive the media file(s) from whichever local computer server is located closest to the participant. Here, for example, the media file(s) are cached at local computer server 3110, and local computer server 3110 can stream the locally cached copies of the media file(s) to participant 3130. The media file(s) are also cached at local computer server 3115, and local computer server 3115 can stream the locally cached copies of the media file(s) to participant 3125.

Participant Selection Mechanisms—Use Cases for Live Streamed Social Media Sessions FIG. 20 shows features of a platform for monetizing interaction sessions involving a host and one or more participants. The interaction sessions can be live or pre-recorded. In an embodiment where the interaction session is live, the platform enables a host (e.g., a celebrity or team leader) to select a participant (e.g., a fan or team member) to interact with during a live streamed social media session. In order to avoid embarrassing interactions, hosts often desire to interact with "safe" participants during live streamed social media sessions.

For some hosts, a "safe" participant is an audience member in a live streamed social media session whose hardware and network environment have sufficient technical capabilities (e.g., a network connection bandwidth above a certain threshold, a network bandwidth able to support a certain frame rate, a certain version of computer program, a certain type of operating system, a camera resolution above a certain threshold, etc.), who is from (or not from) a certain geographical area, who plans to ask a question that will not damage the host's brand or reputation, who is not abusive, and who has been authenticated (e.g., via a social networking service, email text message, etc.), etc. Other hosts may have different requirements for an audience member to be deemed a "safe" participant, such as combination of the preceding requirements. Thus, hosts could specify whether a "safe" participant must satisfy one or more of these requirements in addition to, or instead of, other requirement(s) not described here.

FIG. 22 shows session management features of a platform for streaming interaction sessions. In an example, a host logs into the platform to announce to participants that she will be involved in an interaction session at a predetermined time on a predetermined date. The host or some other individual (e.g., an agent, manager, or administrator) may enter the date and time of the scheduled session.

FIG. 24 shows features of the platform that enable aggregation of participants. The platform can post an announcement of an upcoming interaction session to various social media services, such as the Facebook, Instagram, Twitter, etc. More specifically, the platform may cause an appropriate social media account associated with the host to post the announcement to each social media service. The post announces the interaction session, and prompts potential participants to register for the interaction session. In some embodiments, the post includes a link that, upon selection by a participant, directs the participant to the platform where she can register for the interaction session.

FIG. 23 shows disintermediate social network features of the platform for streaming interaction sessions. When a participant clicks a link included in an announcement posted to a social media service, she is taken outside of the social media service where the link was posted. Such action eliminates or disintermediates the social media service from the interaction session. The participant may be asked whether she would like to install a computer program on the computing device used to access the social media service or navigate to a website to register for the interaction session. If the participant elects to install the computer program on her compute device, the computer program is installed and the participant is able to create an account for the platform (also referred to as a "platform account"). The computer program may also prompt the participant to associate her phone number, email address, etc., with the platform account. If the participant elects to navigate to the website, the website appears and the participant is able to create a platform account. The website may also prompt the participant to associate her phone number, email address, etc. with the platform account. The participant can then log into her account, where she is able to register for interaction sessions. The platform may also provide a calendar event for the calendar tool residing on the participant's computing device. The calendar event serves as a reminder of the session.

At certain times prior to the scheduled interaction session, the platform can notify participants who have registered for the session of the start time of the session. For example, the platform may send notifications as text messages, email messages, push notifications, etc. The host can log into the platform before the scheduled date and time, and then prepare for the interaction session. in some embodiments, the host taps or selects a pre-check icon upon logging in, and the platform performs certain technical checks responsive to determining that the pre-check icon has been selected. Various tests may be performed as part of the technical checks. For example, the platform may check the network connectivity to the host's computing device to ensure connectivity is adequate to support live streaming. At the scheduled data and time, the host can initiate the interaction session via the platform.

FIG. 21 shows several ranges of bandwidths that may be supported by the platform for streaming interaction sessions. As the platform streams video content to participants (e.g., in a live feed), the platform can dynamically optimize the video content being streamed to each participant. For example, the platform may vary the bitrate of the video content based on the bandwidth available to the computing device operated by each participant. A computer program installed on each participant's computing device can monitor available bandwidth, and then send the bandwidth data to the platform, which determines the bitrate based on the available bandwidth. In some embodiments, the video content is dynamically adjusted, such as by varying the resolution, to achieve the desired bitrate. The platform can dynamically vary the bitrate, for example, by optimizing/customizing the bitrate sent to each participant based on the technical capabilities of the network connection to each participant's computing device.

FIG. 26 shows features of the platform that enable live face-to-face interaction sessions. After initiating an interaction session, a host can invite participants to submit questions. In an example, about 1,000 participants submit questions to be posed to the host. Before the host is ready to interact with the participants, the platform can evaluate these 1,000 participants to determine which should be deemed "safe." As part of the evaluation, the platform may evaluate the connectivity bandwidth of the computing device used by each participant, and then filter out those computing devices (and thus participants) with inadequate connectivity bandwidth. The platform may also evaluate the version of a computer program that is communicatively coupled to the platform and installed on the computing device, and then filter out those computing devices (and thus participants) with obsolete versions of the computer program.

The platform may check the behavior history of these participants to filter out those participants who have any past history of misbehavior. The platform may also determine the location of these participants, such as via the participants' user profiles, by doing a reverse IP address lookup, etc., and then filter out those participants that do not meet the geographical restriction(s) imposed by the host. The platform may also evaluate whether these participants are real, such as by inspecting the participants' social media accounts, and then filter out those participants that the evaluation indicates may be fake.

When the host is ready to interact with the participants, she can tap or select an icon displayed on her computing device and a pre-screened set of participants (e.g., 10 or 20 participants) can be selected that best meet the "safe" criteria. These participants may be notified that they have been selected by the platform, and the first participant to respond by tapping an icon displayed on her computing device could be presented to the host for review. The host can quickly review the question(s) submitted by the participant and determines whether she wishes to answer the question(s) posed by the participant. If the host opts to initiate a face-to-face interaction with the participant, a session is initiated between the host and the participant. All participants involved in the interaction session (e.g., all 100,000 audience members) may be able to see a video feed including the host and a video feed including the participant. The participant can ask her question, and the host can respond accordingly.

After responding to the question posed by the first participant, the host may indicate that she is ready for another question. For example, the host may select an icon displayed on her computing device that indicates she would like to receive another question. Thereafter, the platform may identify a second pre-screened set of participants that meet the "safe" criteria. Once again, these participants may be notified that they have been selected by the platform, and the first participant to respond by tapping an icon displayed on her computing device could be presented to the host for review. The host can quickly review the question(s) submitted by the participant. If the host opts to initiate a face-to-face interaction with the participant, a session is initiated between the host and the participant. Here, however, the fan begins to exhibit to exhibit a behavioral issue. In such instances, the host can simply select an icon displayed by her computing device. Such action may cause the participant to be disconnected from the session. The instance of poor behavior may be associated with the participant's user profile maintained by the platform, so that the participant will not be selected for any future interaction sessions. In some embodiments, the interaction management platform has a broadcast delay of 7 seconds, 10 seconds, 15 seconds, etc. In such embodiments, when the host opts to disconnect a poorly behaving participant, the previous seven seconds of buffered media are not streamed, so that no other participants are able to observe the behavioral incident.

FIG. 28 shows features of the platform that enable a social television show. In some embodiments, video content broadcast by the platform is sent to an entertainment platform to enable the entertainment platform to broadcast the interaction session. The entertainment platform can stream the video content as it is received, or the entertainment platform can store the video content for later broadcast. The entertainment platform can cause the video content to be broadcast via network television, cable television, the Internet, or any other available suitable medium.

FIG. 27 shows features of the platform that enables geofence-restricted interactions between hosts and participants. In some embodiments, the platform restricts viewing to those participants within a geofence. Similarly, the platform may restrict participating (e.g., asking questions, providing answers, etc.) to those participants within a geofence. Thus, participants that are determined to be within the geofence may be permitted to join the interaction session, while participants that are not within the geofence may not be permitted to join the interaction session.

FIG. 30 shows features of the platform that enable the addition of advertisements to an interaction session. The host, via the platform, can also pre-select an advertisement to play before, during, or after the interactive session. Then, at the chosen time, the interaction management platform can stream the selected advertisement. FIG. 29 shows features of the platform that enable integrated sponsorship and e-commerce stores. The interaction management platform can also make the participants aware that the host has an e-commerce store with products available for sale. Participants may visit the online store directly from the interaction management platform, where the participants can purchase products offered for sale by the host. Thus, participants may leave the interactive session quite happy about their experience, as well as their purchase(s).

The host may also be quite happy because she has been able to largely avoid participant interactions involving behavioral incidents. Moreover, when the host does interact with a participant exhibiting a behavioral issue, the host can quickly disconnect the participant and continue the interactive session. If the host is a celebrity, then the host is also happy because she is able to generate additional fans via the interactive sessions and additional revenue based on advertisements, product sales, etc. If the host is a team leader, then the host is also happy because she is able to increase productivity, cohesiveness, etc., by connecting with members of the team in a more seamless manner.

FIG. 31 is a generalized block diagram illustrating the architecture of a platform that facilitates the transmission of an interaction session to participants. In an embodiment where the interaction session is live streamed, the interaction session is streamed from the computing device of a host 3120 (here, a celebrity), who is located in San Francisco. The platform, such as via a computer program that resides on the computing device of host 3120, determines the location of the host's computing device, such as via GPS, RFID, or another location-sensing technology. The platform determines that local computer server 3105 is the computer server located closest to host 3120, and then establishes a communication channel between local computer server 3105 and the computing device of host 3120. As host 3120 records her session, the video content is streamed from her computing device to local computer server 3105. From local computer server 3105, the video content is streamed to computer servers located throughout the geographical area of the broadcast, such as local computer server 3115 for participants in the Detroit area and local computer server 3110 for participants in the Dallas area. Any or all of computer servers 3105-3115 can be cloud servers, such as those offered by Amazon Web Services (AWS).

As each participant logs into the platform for the interaction session, the platform, such as via a computer program that resides on the computing device of each participant, determines the location of each participant's computing device. The platform can then determine which computer server is located closest to each participant's computing device. Here, for example, the platform has determined participant 3130 is located near local computer server 3110 and participant 3125 is near local computer server 3115. As local computer server 3105 streams the video content, local computer servers 3115 and 3110 receive the video content, and, in turn, stream the video content to those participant(s) that each local computer server supports. In some embodiments, each local computer server dynamically optimizes the video content sent to each participant's computing device, as previously discussed.

At the point in the interaction session where a participant is selected to interact with the host 3120, the platform faces a synchronization challenge (in addition to the typical challenge of synchronizing audio and video when streaming video content). The platform now needs to synchronize two separate video feeds, a first video feed generated by the host's computing device and a second video feed generated by the participant's computing device. When the platform initiates the video feed from the computing device of participant 3130 to the computing device of host 3120, the computing device of participant 3130 streams the video content to local computer server 3110. Before streaming video content from the participant 3130, the platform may discover the technical capabilities the computing device of participant 3130, such as the technical features of the computing device, the network connectivity capabilities between the computing device and local computer server 3110, etc. As the computing device of participant 3130 streams the video content, the computer program residing on the computing device may send various information (e.g., timestamp information) regarding the live feed to assist with synchronization. The live feed from the computing device of participant 3130 to local computer server 3110 can be dynamically optimized, much like the live feed from the local computer servers to each participant's computing device.

In order to facilitate real-time streaming of multiple live feeds, the platform may transmits each live feed with little or no latency, such as by avoiding latency caused by buffering or caching the streamed media content. In some embodiments, the platform utilizes raw transmission control protocol (TCP) to avoid latency. By utilizing technology that enables the platform to stream with little or no latency, the platform can transcode the video content in real time, as well as send the video content real time, with very little buffering or caching occurring.

When the raw TCP data is received by local computer server 3105, the local computer server 3105 may forward the raw TCP data to the computing device of host 3120. application computer program associated with the platform residing on the computing device of the host 3120 receives the video content streamed by the computing device of participant 3130, and then synchronizes the received video content with the video content generated by the computing device of host 3120. After synchronizing the two live video feeds, the computer program can display the two live video feeds so that the host can see the interaction with the participant on her computing device. Local computer server 3105 further streams the two live video feeds to local computer servers 3110 and 3115, which in turn stream the live video feeds to the participant-operated computing devices that each local computer server supports. Computer programs associated with the platform that reside on the participant-operated computing devices synchronize the live video feeds, and then display the live video feeds for the participants to view, such that all of the participants and the host are able to observe a properly synchronized interactive discussion between the participant and the host.

Pre-Screening by Television Producers

Figure 32:
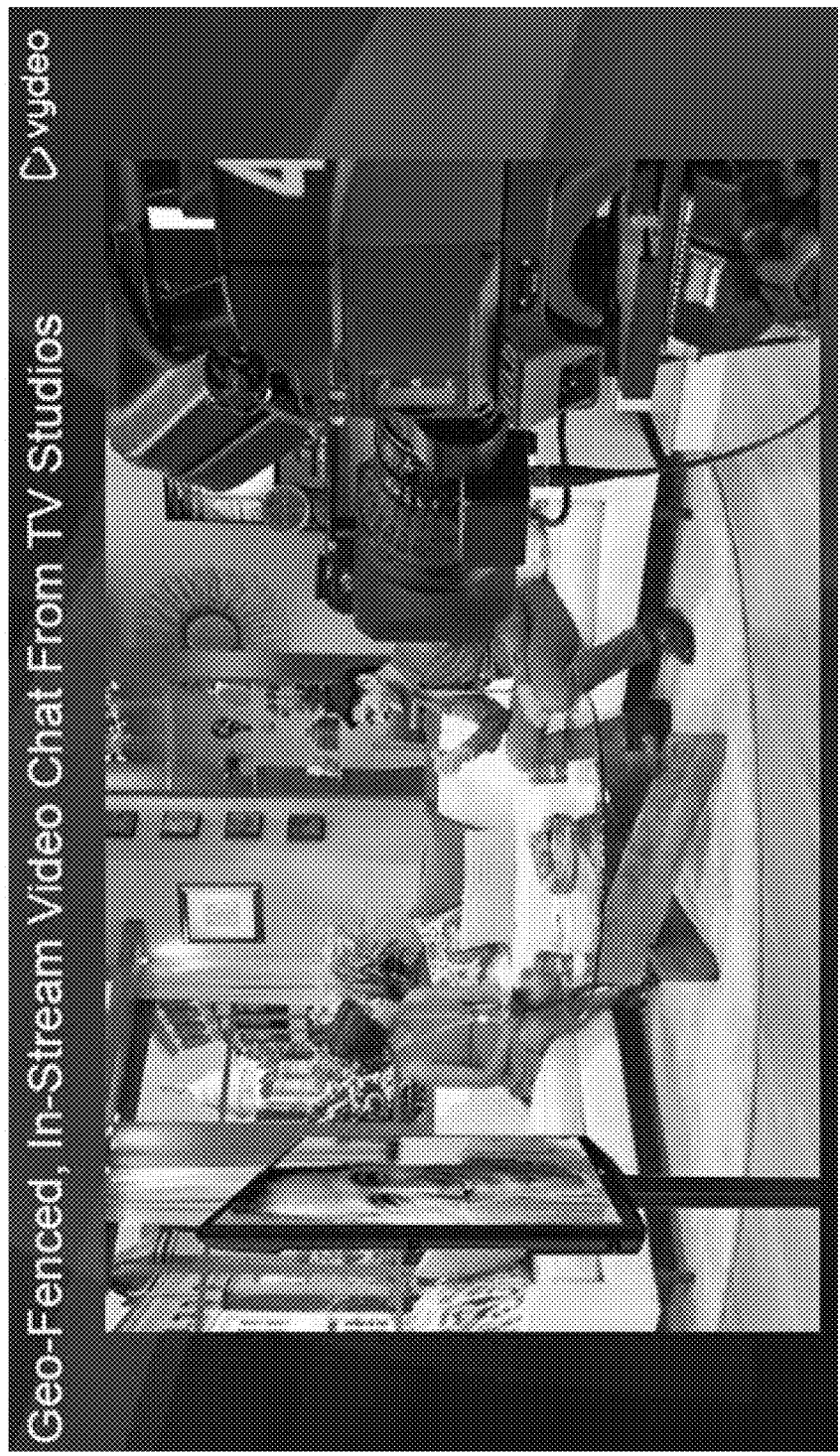
FIG. 32 shows some exemplary features of an interaction management platform that is able to facilitate the broadcast of interaction sessions between hosts and participants.

FIG. 32 shows some exemplary features of an interaction management platform that is able to facilitate the broadcast of interaction sessions between hosts and participants. Here, for example, the interaction session involves two hosts and a series of participants interested in interacting with one of the two hosts. As noted above, the interaction session can be live or pre-recorded. In an embodiment where the interaction session is live, the platform enables a host (e.g., a celebrity or team leader) to select a participant (e.g., a fan or team member) to interact with during a live streamed social media session. In order to avoid embarrassing interactions, hosts often desire to interact with "safe" participants during live streamed social media sessions. A participant may be deemed to be "safe" during a pre-screening process that must be completed before the participant is allowed to interact with the host(s).

One type of interaction session is a geo-fenced, live-streamed video chat including the host(s) and the participant(s). In such embodiments, participants may be pre-screened by the host(s) or some other individual. For example, if the interaction session will be broadcast by a broadcast television network, then the participants may be pre-screened by a television producer who is conducting the interaction session from the television studio.

Figure 33:
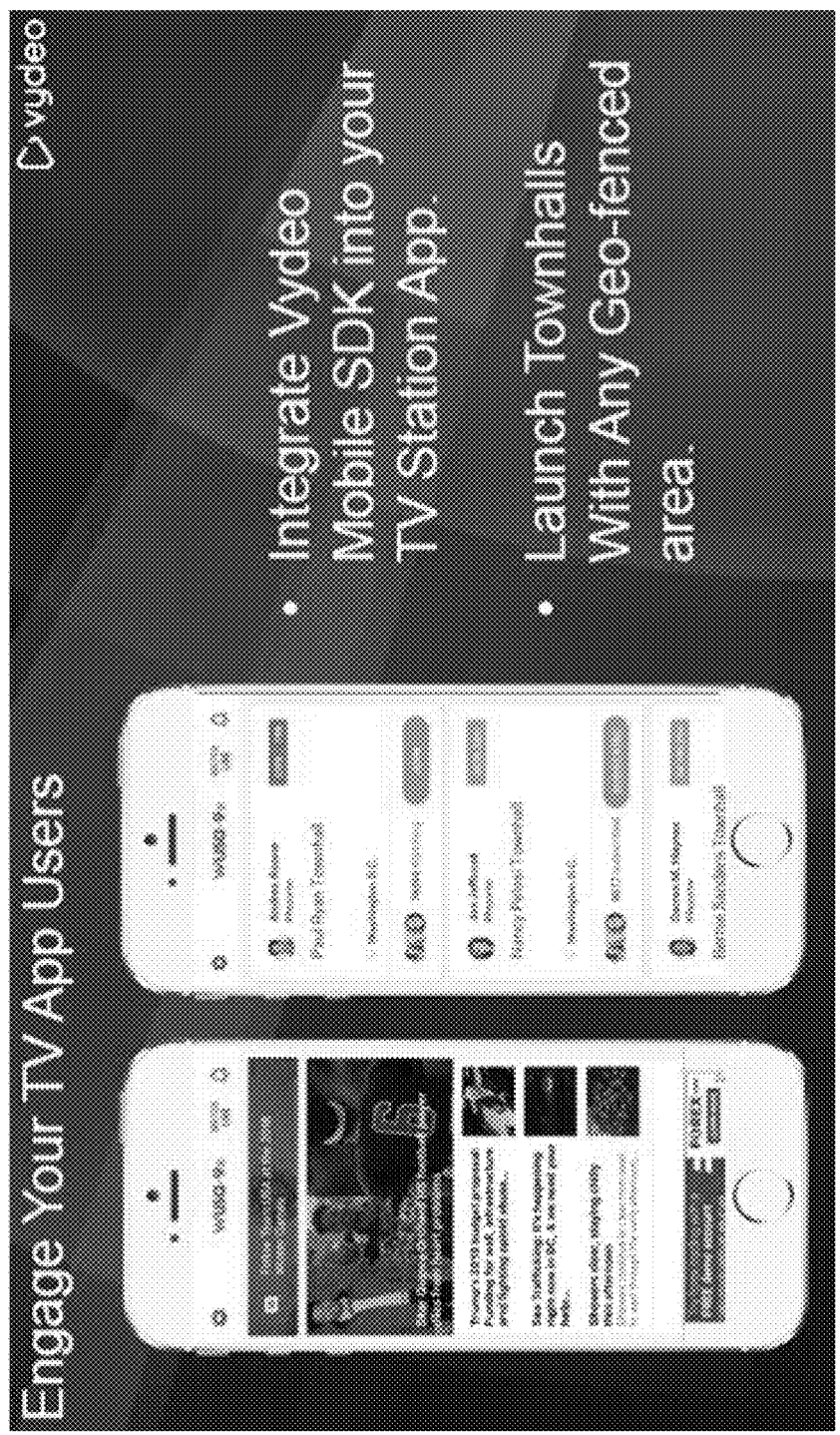
FIG. 33 shows features of the platform that enable participants to view interaction sessions via a computer program.

FIG. 33 shows features of the platform that enable participants to view interaction sessions via a computer program. Here, for example, the computer program is a mobile application associated with the broadcast television network (also referred to as a "TV Station application"). The TV Station application may be integrated with the platform via a software development kit (SDK), which allows the TV Station application to communicate with the platform responsible for supporting the computer programs described above. Some embodiments of the TV Station application enable users (e.g., hosts) to launch virtual town halls that are restricted to a certain geo-fenced area.

Figure 34:
FIG. 34 illustrates how a user (here, a television producer) can create a virtual town hall that is limited to Washington, D.C.

FIG. 34 illustrates how a user (here, a television producer) can create a virtual town hall that is limited to Washington, D.C. When the television producer creates the virtual town hall, the television producer can specify various criteria. For example, the television producer may define the geo-fenced area in which participants must be located. As another example, the television producer may specify whether the virtual town hall should begin immediately or at a future point in time (e.g., by providing a date and time). While embodiments may be described in the context of television producers, those skilled in the art will recognize that other individuals (e.g., hosts) could perform similar tasks.

Figure 35:
FIG. 35 illustrates how virtual town halls conducted through a computer program connected to the platform can be shared through other electronic distribution channels.

FIG. 35 illustrates how virtual town halls conducted through a computer program connected to the platform (e.g., the TV Station application) can be shared through other electronic distribution channels. For example, other users of the computer program may be notified that the virtual town hall is occurring (e.g., via push notifications). As another example, the virtual town hall may be posted to one or more social media platforms (e.g., Facebook, Twitter, etc.) for review.

Figure 36:
FIG. 36 illustrates how participants located within the geo-fenced area can participant in the interaction session.

FIG. 36 illustrates how participants located within the geo-fenced area can participant in the interaction session. More specifically, these participants can join the interaction session, and then submit requests to interact with the host(s). Upon being selected, a participant can interact with the host(s) (e.g., by asking a question). This interaction can be streamed for broadcast by the television broadcaster. In some embodiments, only those individuals located within the geo-fenced area are able to observe the interaction session. In other embodiments, all individuals are able to observe the interaction session, though only those individuals within the geo-fenced area are allowed to participate.

Figure 37:
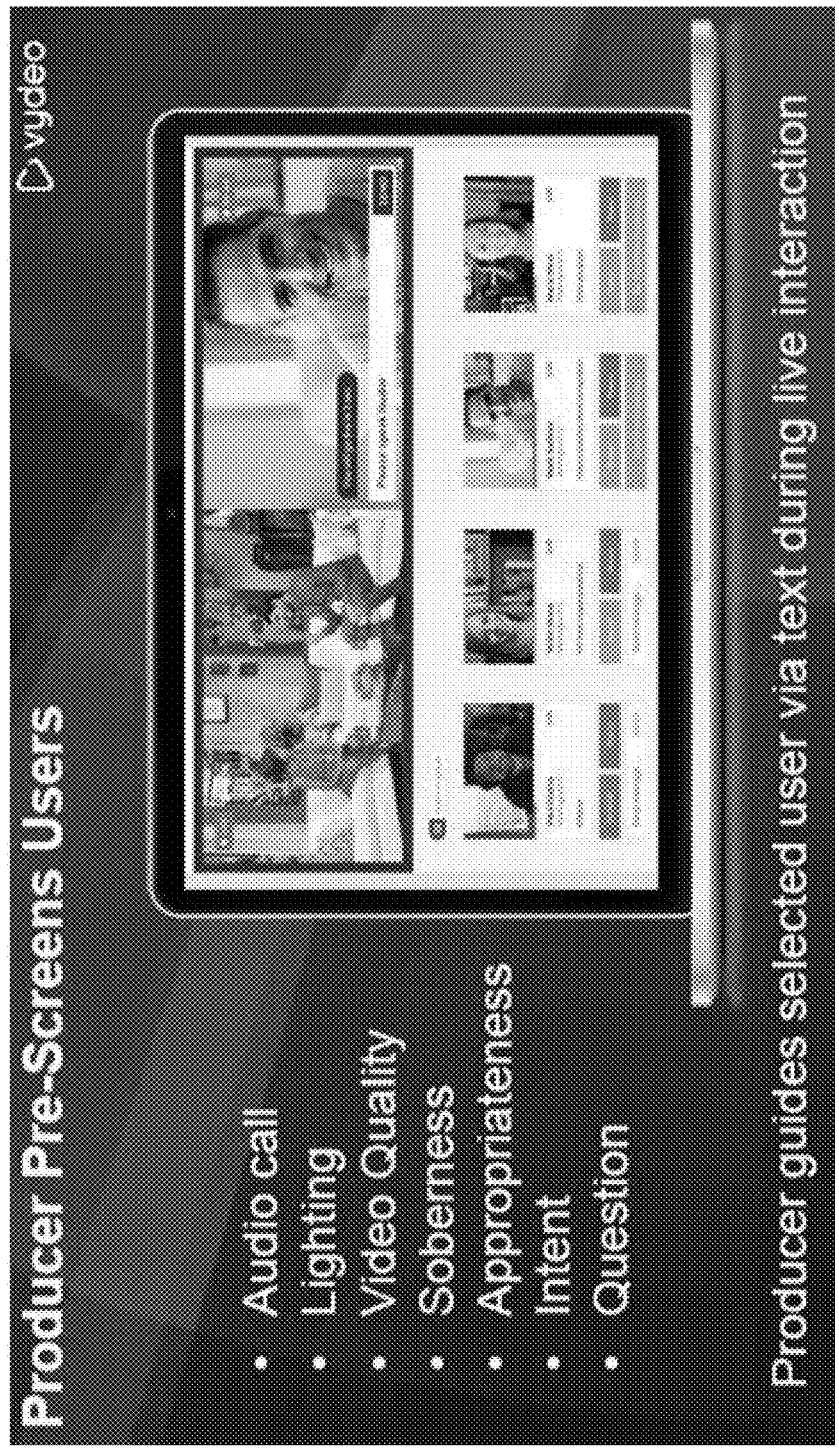
FIG. 37 illustrates how a television producer can pre-screen participants before the participants are allowed to interact with the host(s).

FIG. 37 illustrates how a television producer can pre-screen participants before the participants are allowed to interact with the host(s). Generally, a participant begins by streaming video that can be observed by the television producer. The television producer can then pre-screen the participant by initiating an audio/video call from a dashboard accessible through a computer program (e.g., the TV Station application or the other computer programs described above). Initiating the audio/video call through the dashboard permits the television producer to examine soberness, lighting, audio/video quality, appropriateness of the question/answer to be uttered, receptiveness to initiate a conversation with the host(s), intent, etc. Any combination of these factors may influence whether the television producer approves the participant.

Figure 38:
FIG. 38 shows features of the platform that enable a live interaction session to be conducted in near real time.

FIG. 38 shows features of the platform that enable a live interaction session to be conducted in near real time. A host may initially initiate a video chat with a participant. Media content captured by the host's computing device and the participant's computing device can then be broadcast to other computing devices. In some embodiments, the platform has a broadcast delay of 7 seconds, 10 seconds, 15 seconds, etc. In such embodiments, participants who are observing the interaction session may be shown a feed that is time-shifted. Thus, if the host opts to disconnect a poorly behaving participant, other participants may not be able to observe the behavioral incident. These delays may be seamlessly created through the use of advertisements.

Figure 39:
FIG. 39 shows features of the platform that enable hosts to participant in interaction sessions without fear of being involved in abusive interactions.

FIG. 39 shows features of the platform that enable hosts to participant in interaction sessions without fear of being involved in abusive interactions. When a host is ready to interact with participants, she can request that at least one participant be selected. The host can quickly review question(s) submitted by the participant(s) and determine whether she wishes to answer the question(s). If the host opts to initiate a face-to-face interaction with a participant, a session is initiated between the host and the participant. However, in some instances, the participant may begin to exhibit a behavioral issue. In such instances, the host can simply select an icon displayed by her computing device. Such action may cause the participant to be disconnected from the session.

The instance of poor behavior may be associated with the participant's user profile maintained by the platform, so that the participant will not be selected for any future interaction sessions. Moreover, if the feed is time-shifted, the platform can simply remove the content including the abusive interaction. Thus ensures that other participants cannot see the abusive interaction.

Figure 40:
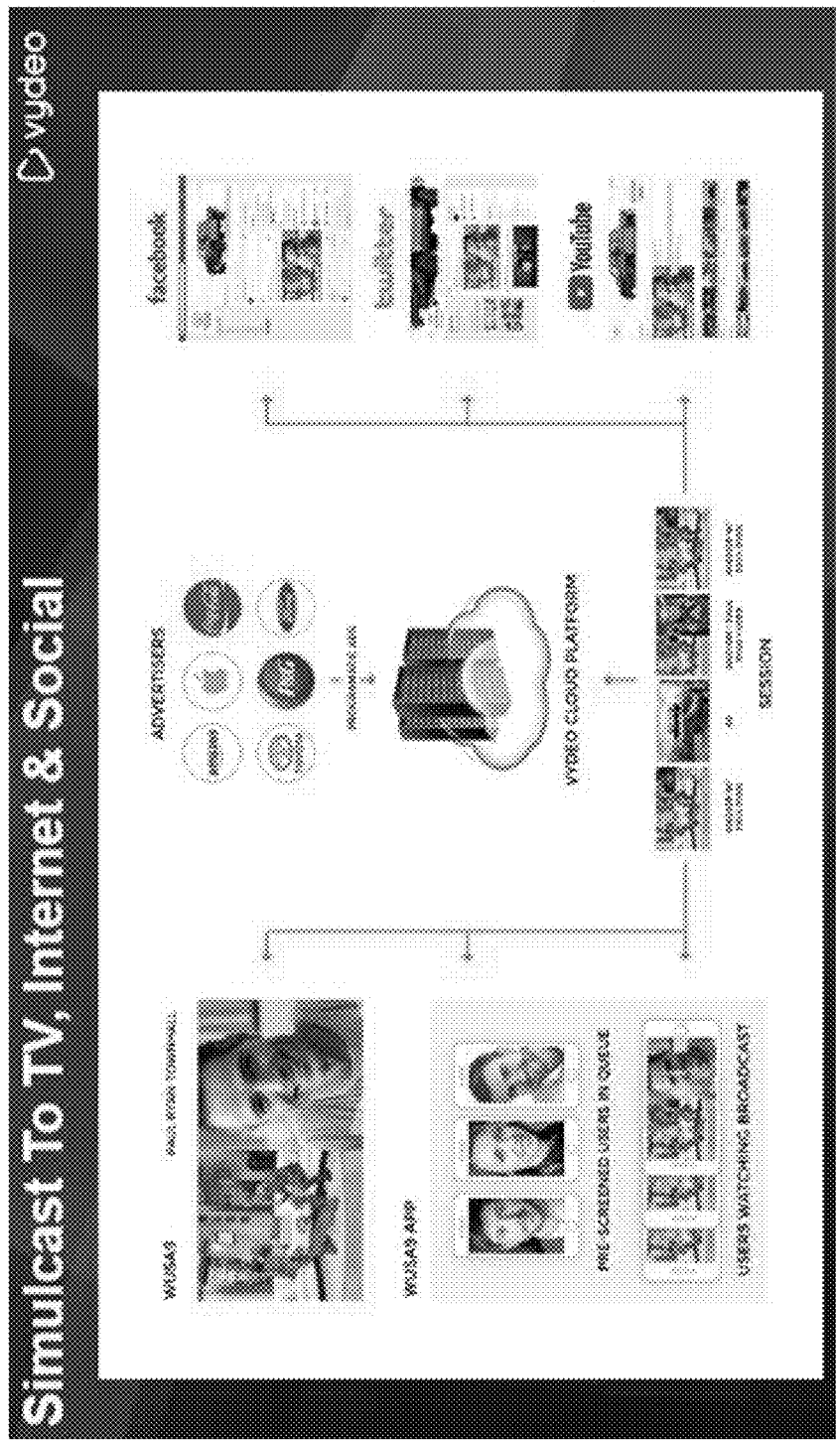
FIG. 40 illustrates how interaction sessions can be simulcast via broadcast television, the Internet, and social media platform(s).

FIG. 40 illustrates how interaction sessions can be simulcast via broadcast television, the Internet, and social media platform(s). The underlying architecture of the platform may be similar to that described above with respect to FIGS. 31A-B. However, some embodiments of the platform permit participants to observe an interaction session via social media platforms (e.g., Facebook, Twitter, and YouTube), broadcast television, and directly through a computer program associated with the platform.

Processing System

Figure 41:
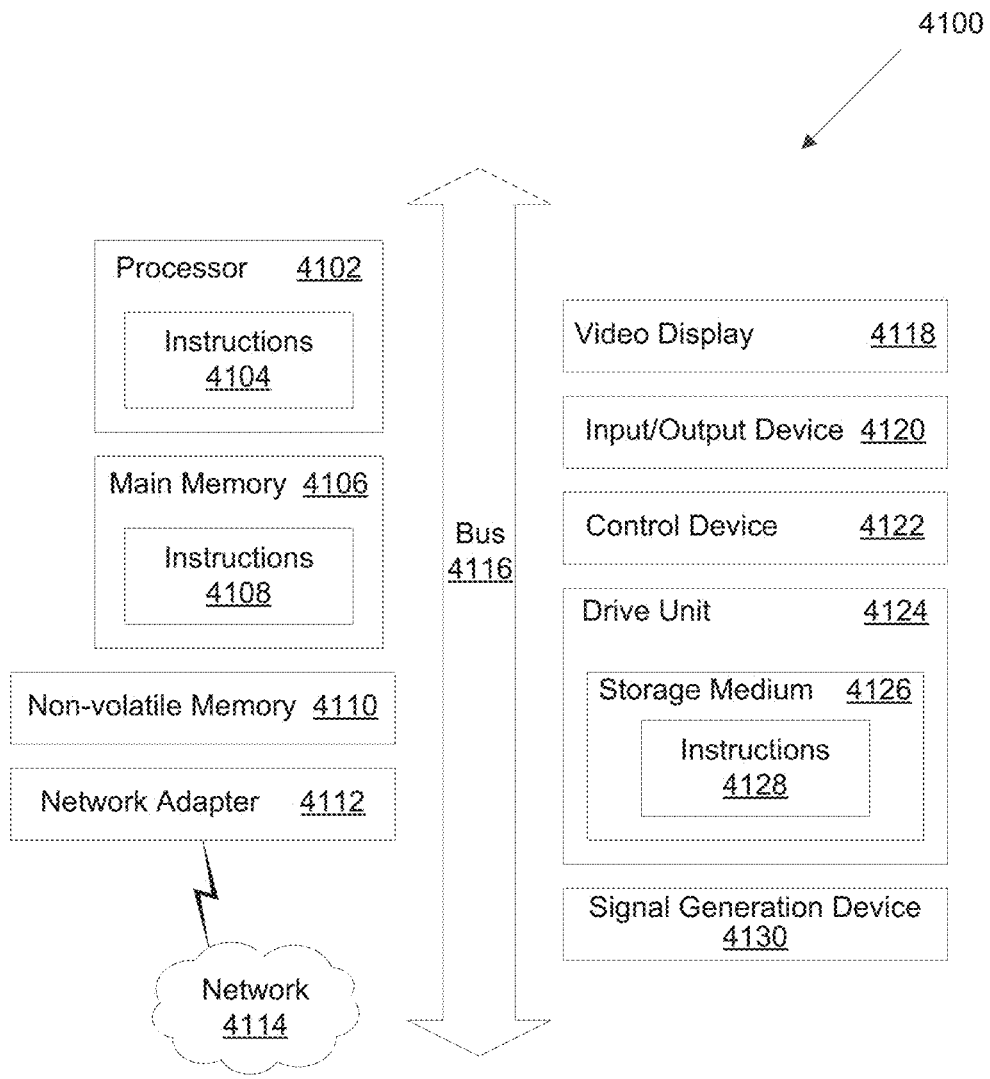
FIG. 41 is a block diagram illustrating an example of a processing system in which at least some operations described herein can be implemented.

FIG. 41 is a block diagram illustrating an example of a processing system 4100 in which at least some operations described herein can be implemented. For example, some components of the processing system 4100 may be hosted on a computing device that includes a diabetes management platform (e.g., diabetes management platform 102 of FIG. 1).

The processing system 4100 may include one or more central processing units ("processors") 4102, main memory 4106, non-volatile memory 4110, network adapter 4112 (e.g., network interface), video display 4118, input/output devices 4120, control device 4122 (e.g., keyboard and pointing devices), drive unit 4124 including a storage medium 4126, and signal generation device 4130 that are communicatively connected to a bus 4116. The bus 4116 is illustrated as an abstraction that represents one or more physical buses and/or point-to-point connections that are connected by appropriate bridges, adapters, or controllers. The bus 4116, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The processing system 4100 may share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 4100.

While the main memory 4106, non-volatile memory 4110, and storage medium 4126 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 4128. The term "machine-readable medium" and "storage medium" shall also be taken to include any medium that is capable of storing, encoding, or carrying a set of instructions for execution by the processing system 4100.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 4104, 4108, 4128) set at various times in various memory and storage devices in a computing device. When read and executed by the one or more processors 4102, the instruction(s) cause the processing system 4100 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 4110, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 4112 enables the processing system 4100 to mediate data in a network 4114 with an entity that is external to the processing system 4100 through any communication protocol supported by the processing system 4100 and the external entity. The network adapter 4112 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 4112 may include a firewall that governs and/or manages permission to access/proxy data in a computer network, and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A system comprising:
   a data storage facility that is comprised of multiple computer servers located at different geographical locations; and
   an interaction management platform that is configured to:
      receive input indicative of a geofence defining a geographic boundary for an interactive session,
         wherein only users of the interactive management platform that are located within the geofence are permitted to submit questions during the interactive session;
      identify a first user located within the geofence;
      generate a first interface that is accessible to the first user on a first computing device;
      receive, from the first computing device, a first live feed in which the first user audibly utters a question to be answered by a second user;
      generate a second interface that is accessible to the second user on a second computing device;
      receive, from the second computing device, a second live feed in which the second user audibly utters a response to the question posed by the first user;
      convert the first and second live feeds into an MPEG-4 format;
      create a media compilation from the first and second live feeds that is augmented with data retrieved from the data storage facility; and
      forward, via a network, the media compilation to an entertainment platform for simulcast via a broadcast network.

2. The system of claim 1, wherein the interaction management platform is further configured to:
   receive, from the first computing device, second input indicative of a request to initiate the first live feed;

in response to receiving the second input,
 cause the first computing device to initiate recording of the first user;
receive, from the first computing device, third input indicative of a request to terminate the first live feed; and
in response to receiving the third input,
 cause the first computing device to terminate recording of the first user.

3. The system of claim 2, wherein the third input is generated by the first user device responsive to a determination that
 a specified period of time has expired,
 no audio signals have been recognized in the first live feed within a certain time interval, or
 a manual termination request has been received at the first interface.

4. The system of claim 1, wherein the entertainment platform is configured to simultaneously broadcast the media compilation to multiple computing devices associated with multiple viewers.

5. The system of claim 1, wherein the first and second computing devices are communicatively coupled to the interaction management platform via an application programming interface (API) that is executed by a computer program running on each computing device.

6. The system of claim 1, wherein the interaction management platform is further configured to:
 store the media compilation in each computer server of the data storage facility for future broadcast.

7. The system of claim 1, wherein the first user is one of multiple users able to access the first interface to record audibly uttered questions to be answered by the second user, and wherein the interaction management platform receives each recorded question at whichever of the multiple computer servers is located nearest the corresponding user.

8. The system of claim 1, wherein the interaction management platform is integrated with a computer program through which the entertainment platform broadcasts the media compilation via a software development kit.

9. The system of claim 1, wherein the data retrieved from the data storage facility is representative of information related to the first user or the second user.

10. The system of claim 1, wherein the data retrieved from the data storage facility is representative of an advertisement.

11. The system of claim 1, wherein the input is received from the second computing device associated with the second user.

12. The system of claim 1, wherein the first live feed is received by whichever of the multiple servers is located nearest the first user, and wherein the second live feed is received by whichever of the multiple servers is located nearest the second user.

13. A system comprising:
 a data storage facility that is comprised of multiple computer servers located at different geographical locations; and
 an interaction management platform implemented on the data storage facility, wherein the interaction management platform is configured to:
  generate a first interface that is accessible to a host via a first computing device,
  receive, from the first computing device at whichever of the multiple computer servers is located nearest the first computing device, input provided through the first interface that is indicative of a geofence defining a geographic boundary for an interactive session,
   wherein only participants located within the geofence are permitted to interact with the host during the interactive session,
  identify a participant located within the geofence,
  generate a second interface that is accessible to the participant via a second computing device,
  receive, from the second computing device at whichever of the multiple computer servers is located nearest the second computing device, a first media file in which the participant audibly utters a question to be answered by the host,
  cause display of information representative of the question on the first interface,
  receive, from the first computing device at whichever of the multiple computer servers is located nearest the first computing device, a second media file in which the host answers the question posed by the participant, and
  forward, via a network, the first and second media files to an entertainment platform for simulcast via a broadcast network.

\* \* \* \* \*